US 9,404,465 B2

(12) United States Patent  
Koenen et al.

(10) Patent No.: US 9,404,465 B2  
(45) Date of Patent: Aug. 2, 2016

(54) STARTING BATTERY FOR AN INTERNAL COMBUSTION ENGINE

(71) Applicant: Briggs & Stratton Corporation, Wauwatosa, WI (US)

(72) Inventors: Robert Koenen, Pewaukee, WI (US); Matthew Markowski, Wauwatosa, WI (US); Michael Meyer, Sussex, WI (US); James Nommensen, Oak Creek, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 14/986,403

(22) Filed: Dec. 31, 2015

(65) Prior Publication Data

US 2016/0115933 A1  Apr. 28, 2016

Related U.S. Application Data

(63) Continuation of application No. 14/822,700, filed on Aug. 10, 2015, now Pat. No. 9,228,556, which is a continuation of application No. 14/309,602, filed on Jun. 19, 2014, now Pat. No. 9,127,658, which is a (Continued)

(51) Int. Cl.  
*F02N 11/14* (2006.01)  
*F02N 11/08* (2006.01)  
(Continued)

(52) U.S. Cl.  
CPC .......... *F02N 11/0862* (2013.01); *F02N 11/101* (2013.01); *F02N 11/14* (2013.01); *H01M 10/0525* (2013.01); *H01M 2220/20* (2013.01)

(58) Field of Classification Search  
CPC ..... F02N 11/00; F02N 11/04; F02N 11/0803; F02N 11/0862; F02N 11/101; F02N 15/00; F02N 15/006; F02N 3/02; H01M 10/052; B60R 25/04; B60R 25/045  
USPC ......................................... 123/179.28, 198 D  
See application file for complete search history.

(56) References Cited

U.S. PATENT DOCUMENTS 3,536,051 A  10/1970  Hamman  
3,569,726 A   3/1971  Reid et al.  
(Continued)

FOREIGN PATENT DOCUMENTS

CN  101734147 A  6/2010  
CN  102171061 A  8/2011  
(Continued)

OTHER PUBLICATIONS

International Preliminary Report on Patentability, PCT/US2014/043232, Briggs & Stratton Corporation, 6 pages (Dec. 30, 2015).

(Continued)

*Primary Examiner* — Hieu T Vo  
*Assistant Examiner* — Arnold Castro  
(74) *Attorney, Agent, or Firm* — Foley & Lardner LLP

(57) ABSTRACT

A starting battery for use with an electric starting system includes a starter motor and a battery receiver. The starting battery includes a lithium-ion battery cell, two voltage output terminals, and an enable terminal. The voltage output terminals of the starting battery are configured to connect to two voltage output terminals of the battery receiver to complete a circuit between the lithium-ion battery cell and the starter motor when the starting battery is attached to the battery receiver. The enable terminal of the starting battery is configured to connect to an enable terminal of the battery receiver to receive an enable signal to the starting battery to allow the starting battery to provide power to the starter motor to start an internal combustion engine.

20 Claims, 49 Drawing Sheets

Related U.S. Application Data continuation-in-part of application No. 13/692,739, filed on Dec. 3, 2012, now Pat. No. 8,857,138, which is a continuation-in-part of application No. 13/289,613, filed on Nov. 4, 2011, now Pat. No. 8,733,072, said application No. 14/309,602 is a continuation-in-part of application No. 13/913,326, filed on Jun. 7, 2013, which is a continuation-in-part of application No. PCT/US2013/035623, filed on Apr. 8, 2013, which is a continuation-in-part of application No. 13/692,739, filed on Dec. 3, 2012, now Pat. No. 8,857,138, said application No. 14/309,602 is a continuation-in-part of application No. 14/260,206, filed on Apr. 23, 2014, now Pat. No. 9,220,192, which is a continuation of application No. 13/289,613, filed on Nov. 4, 2011, now Pat. No. 8,733,072.

(60) Provisional application No. 61/837,539, filed on Jun. 20, 2013, provisional application No. 61/892,346, filed on Oct. 17, 2013, provisional application No. 61/657,607, filed on Jun. 8, 2012, provisional application No. 61/625,437, filed on Apr. 17, 2012.

(51) Int. Cl.
*H01M 10/0525* (2010.01)
*F02N 11/10* (2006.01)

(56) References Cited

U.S. PATENT DOCUMENTS

| | | | |
|---|---|---|---|
| 3,888,325 A | 6/1975 | Reinbeck | |
| 4,870,811 A | 10/1989 | Steele | |
| 4,882,896 A | 11/1989 | Wilcox | |
| 5,042,439 A | 8/1991 | Tholl et al. | |
| 5,085,043 A | 2/1992 | Hess et al. | |
| 5,186,142 A | 2/1993 | Brunelli et al. | |
| 5,208,525 A | 5/1993 | Lopic et al. | |
| 5,406,778 A | 4/1995 | Lamb et al. | |
| 5,442,901 A | 8/1995 | Niemela et al. | |
| 5,606,851 A | 3/1997 | Bruener et al. | |
| 5,784,868 A | 7/1998 | Wadzinski et al. | |
| 5,895,728 A * | 4/1999 | Walker | H01M 2/0202 429/160 |
| 5,906,088 A | 5/1999 | Inui et al. | |
| 5,910,091 A | 6/1999 | Iida et al. | |
| RE36,250 E | 7/1999 | Hess et al. | |
| 5,934,053 A | 8/1999 | Fillman et al. | |
| 5,937,623 A | 8/1999 | Wolf | |
| 6,077,186 A | 6/2000 | Kojima et al. | |
| 6,078,015 A | 6/2000 | Martinez | |
| 6,160,373 A | 12/2000 | Dunn et al. | |
| 6,220,005 B1 | 4/2001 | Plamper et al. | |
| 6,230,678 B1 | 5/2001 | Gracyalny et al. | |
| 6,260,529 B1 | 7/2001 | Gracyalny et al. | |
| 6,263,852 B1 | 7/2001 | Gracyalny et al. | |
| 6,265,091 B1 * | 7/2001 | Pierson | H01M 2/10 320/104 |
| 6,311,663 B2 | 11/2001 | Gracyalny et al. | |
| 6,325,036 B1 | 12/2001 | Gracyalny et al. | |
| 6,386,169 B1 | 5/2002 | Gracyalny et al. | |
| 6,404,078 B1 | 6/2002 | Thomas et al. | |
| 6,464,052 B1 | 10/2002 | Hsiao | |
| 6,523,334 B1 | 2/2003 | Dettmann | |
| 6,571,542 B1 | 6/2003 | Fillman et al. | |
| 6,595,176 B2 | 7/2003 | Poehlman et al. | |
| 6,615,787 B2 | 9/2003 | Gracyalny | |
| 6,622,683 B2 | 9/2003 | Gracyalny et al. | |
| 6,647,942 B2 | 11/2003 | Poehlman et al. | |
| 6,666,008 B2 | 12/2003 | Iida et al. | |
| 6,751,936 B2 | 6/2004 | Kucera et al. | |
| 6,758,030 B2 | 7/2004 | Dettmann | |
| 6,806,680 B2 * | 10/2004 | Zeiler | H02J 7/1415 320/107 |
| 6,826,895 B2 | 12/2004 | Iida et al. | |
| 6,924,620 B2 * | 8/2005 | Santana, Jr. | B25F 5/02 320/114 |
| 7,007,446 B2 | 3/2006 | Dettmann | |
| 7,128,037 B2 | 10/2006 | Tumback et al. | |
| 7,148,580 B2 * | 12/2006 | Sodemann | F02N 11/12 290/1 A |
| 7,180,200 B2 | 2/2007 | Walter et al. | |
| 7,309,928 B2 | 12/2007 | Grant et al. | |
| 7,434,642 B2 | 10/2008 | Dettmann | |
| 7,479,754 B2 | 1/2009 | Lucas et al. | |
| 7,525,287 B2 | 4/2009 | Miyashita et al. | |
| 7,540,132 B2 | 6/2009 | Shimada et al. | |
| 7,677,017 B2 | 3/2010 | Holby | |
| 7,687,926 B2 | 3/2010 | Grant et al. | |
| 7,728,534 B2 | 6/2010 | Lucas et al. | |
| 7,782,626 B2 | 8/2010 | Buck et al. | |
| 7,989,969 B2 | 8/2011 | Grant et al. | |
| 8,159,078 B2 | 4/2012 | Usselman et al. | |
| 8,171,907 B2 | 5/2012 | Koenen et al. | |
| 8,201,652 B2 | 6/2012 | Ito et al. | |
| 8,425,203 B2 | 4/2013 | Gardner et al. | |
| 8,485,796 B2 | 7/2013 | Gilpatrick | |
| 8,733,072 B2 | 5/2014 | Hansen et al. | |
| 8,857,138 B2 | 10/2014 | Hansen et al. | |
| 2004/0012204 A1 | 1/2004 | Walter et al. | |
| 2004/0257038 A1 | 12/2004 | Johnson et al. | |
| 2006/0027253 A1 | 2/2006 | Kaiser | |
| 2006/0170218 A1 | 8/2006 | Grant et al. | |
| 2006/0245941 A1 | 11/2006 | Sharp | |
| 2007/0020592 A1 | 1/2007 | Cornale | |
| 2007/0240892 A1 | 10/2007 | Brotto et al. | |
| 2008/0079264 A1 | 4/2008 | Serdynski et al. | |
| 2008/0120955 A1 | 5/2008 | Lucas et al. | |
| 2008/0223012 A1 | 9/2008 | Rosa et al. | |
| 2008/0231144 A1 | 9/2008 | Grant et al. | |
| 2008/0289309 A1 | 11/2008 | Gust et al. | |
| 2009/0064957 A1 | 3/2009 | Grybush | |
| 2009/0223475 A1 | 9/2009 | Wilson et al. | |
| 2009/0223541 A1 | 9/2009 | Gardner et al. | |
| 2009/0255502 A1 | 10/2009 | Cook | |
| 2009/0278509 A1 | 11/2009 | Boyles et al. | |
| 2009/0284022 A1 | 11/2009 | Usselman et al. | |
| 2009/0295169 A1 | 12/2009 | Usselman et al. | |
| 2011/0073189 A1 | 3/2011 | Elbert et al. | |
| 2011/0126790 A1 * | 6/2011 | Vacek | F02N 11/00 123/179.28 |
| 2011/0180287 A1 | 7/2011 | Stenzel | |
| 2011/0247849 A1 * | 10/2011 | Heinzen | B25F 5/00 173/171 |
| 2013/0092745 A1 | 4/2013 | Karp | |
| 2013/0111864 A1 | 5/2013 | Hansen et al. | |
| 2014/0230393 A1 | 8/2014 | Hansen et al. | |
| 2014/0299089 A1 | 10/2014 | Koenen et al. | |
| 2015/0318521 A1 * | 11/2015 | Zeiler | H01M 10/0525 320/107 |

FOREIGN PATENT DOCUMENTS

| | | |
|---|---|---|
| CN | 102390248 A | 3/2012 |
| EP | 2 332 768 | 6/2011 |
| GB | 2 442 345 | 4/2008 |
| JP | 2006-263628 A | 10/2006 |

OTHER PUBLICATIONS

English-language machine translation of CN 102390248, Tianjin Qingyuan Electric Vehicle (Mar. 28, 2012).
"Ryobi TouchStart Straight Shaft String Trimmer", http://www.youtube.com/watch?feature=endscreen&NR=1&v=qgpCdihrss0, uploaded to YouTube Apr. 27, 2011, 1 page.
"Ryobi® TouchStart", http://www.youtube.com/watch?v=BpyOxL9IG88&noredirect=1, uploaded to YouTube Feb. 24, 2010, 1 page.
"How to Start Ryobi Touch Start™ Petrol Line Trimmer and Brush Cutter," http://www.youtube.com/watch?v=tjAtHunBemM&feature=related, uploaded to YouTube Dec. 9, 2011, 1 page.

(56) References Cited

OTHER PUBLICATIONS

Briggs & Stratton Service and Repair Instructions for Single Cylinder 4-Cycle Engines, Section 7B, Electric Starter Systems, Jan. 1990, 8 pages.
International Preliminary Report on Patentability for International Application No. PCT/US2013/0623, mail date Oct. 30, 2014, 13 pages.
International Search Report and Written Opinion for PCT Application No. PCT/US2014/043232, dated Sep. 30, 2014, 9 pages.
International Search Report and Written Opinion regarding PCT/US2013/035623, mail date Sep. 10, 2013, 19 pages.
Machine Translation of JP2006263628A, dated Oct. 5, 2006, 4 pages.
Partial Search Report for International Application No. PCT/US2013/035623, mail date Jul. 10, 2013, 2 pages.

\* cited by examiner

STARTING BATTERY FOR AN INTERNAL COMBUSTION ENGINE

CROSS-REFERENCE TO RELATED PATENT APPLICATIONS

This is a continuation of U.S. application Ser. No. 14/822,700, filed Aug. 10, 2015, which is a continuation of U.S. application Ser. No. 14/309,602, filed Jun. 19, 2014, now U.S. Pat. No. 9,127,658, all of which are incorporated herein by reference in their entireties. U.S. application Ser. No. 14/309,602 claims the benefit of U.S. Provisional Application No. 61/837,539, filed Jun. 20, 2013 and the benefit of U.S. Provisional Application No. 61/892,346, filed Oct. 17, 2013, and is a continuation-in-part of U.S. application Ser. No. 13/692,739, filed Dec. 3, 2012, now U.S. Pat. No. 8,857,138, which is a continuation-in-part of U.S. application Ser. No. 13/289,613, filed Nov. 4, 2011, now U.S. Pat. No. 8,733,072, all of which are incorporated herein by reference in their entireties. U.S. application Ser. No. 14/309,602 is a continuation-in-part of U.S. application Ser. No. 13/913,326, filed Jun. 7, 2013, which claims the benefit of U.S. Provisional Application No. 61/657,607, filed Jun. 8, 2012, and is a continuation-in-part of International Application No. PCT/US2013/035623, filed Apr. 8, 2013, which claims the benefit of U.S. Provisional Application No. 61/625,437, filed Apr. 17, 2012, and is a continuation-in-part of U.S. application Ser. No. 13/692,739, filed Dec. 3, 2012, now U.S. Pat. No. 8,857,138, all of which are incorporated herein by reference in their entireties. U.S. application Ser. No. 14/309,602 is a continuation-in-part of U.S. application Ser. No. 14/260,206, filed Apr. 23, 2014, which is a continuation of U.S. application Ser. No. 13/289,613, filed Nov. 4, 2011, now U.S. Pat. No. 8,733,072, all of which are incorporated herein by reference in their entireties.

BACKGROUND

The present invention generally relates to internal combustion engines including electric starting systems and outdoor power equipment powered by such engines, such as lawn mowers, snow throwers, portable generators, etc. More specifically, the present invention relates to small internal combustion engines including electric starting systems powered by a removable, rechargeable lithium-ion battery.

Outdoor power equipment includes lawn mowers, riding tractors, snow throwers, pressure washers, portable generators, tillers, log splitters, zero-turn radius mowers, walk-behind mowers, riding mowers, industrial vehicles such as forklifts, utility vehicles, etc. Outdoor power equipment may, for example use an internal combustion engine to drive an implement, such as a rotary blade of a lawn mower, a pump of a pressure washer, the auger a snowthrower, the alternator of a generator, and/or a drivetrain of the outdoor power equipment.

Many pieces of outdoor power equipment include engines that are manually started with a recoil starter. To start the engine, the user must manually pull a recoil starter rope.

Other pieces of outdoor power equipment include electric starting systems in which a starter motor powered by a battery starts the engine. Typically, such electric starting systems also include a user-actuated starter switch (e.g., a pushbutton or key switch) and a starter solenoid. The starter solenoid is the connection between a low current circuit including the starter switch and a high current circuit including the starter motor. To start the engine, the user actuates the starter switch, causing the starter solenoid to close so that the battery provides starting current to the starting motor to start the engine.

The battery is a lead-acid battery. The battery is secured to the outdoor power equipment separate from the engine. For example, the battery may be secured to a mounting plate or deck of a lawn-mower or a pressure washer or to the frame of a riding lawn mower or a portable generator. The housing of the battery is secured to the outdoor power equipment by fasteners that require tools (e.g., a wrench or socket) to attach the battery to the outdoor power equipment and to remove or loosen the fasteners so the battery can be removed from the outdoor power equipment. Also, the battery includes a pair of terminals to which electrical leads are attached. Tools are also required to attach and remove the electrical leads to the terminals. Lead-acid batteries are filled with a liquid electrolyte, typically a mixture of water and sulfuric acid. The electrolyte is corrosive. Lead-acid batteries are temperature sensitive, which may result in the engine having difficulty starting or not starting at all in cold weather. Also, a lead-acid battery will run down with the passage of time and not be able to provide power (i.e., lose charge or become completely discharged). A lead-acid battery may need to be replaced seasonally, removed from the outdoor power equipment and stored inside, or otherwise maintained or serviced by a user.

SUMMARY

One embodiment of the invention relates to a starting battery for use with an electric starting system including a starter motor and a battery receiver. The starting battery includes a lithium-ion battery cell, two voltage output terminals, and an enable terminal. The voltage output terminals are configured to connect to two voltage output terminals of the battery receiver to complete a circuit between the lithium-ion battery cell and the starter motor when the starting battery is attached to the battery receiver. The enable terminal is configured to connect to an enable terminal of the battery receiver to receive an enable signal to the starting battery to allow the starting battery to provide power to the starter motor to start an internal combustion engine.

Another embodiment of the invention relates to an electric starting system for an internal combustion engine including a rechargeable lithium-ion battery including two voltage output terminals and an enable terminal, a battery receiver including a battery receptacle configured to receive the lithium-ion battery, two voltage output terminals, and an enable terminal, and a starter motor configured to start the internal combustion engine. The voltage output terminals of the lithium-ion battery and the battery receiver are configured to connect to complete a circuit between the lithium-ion battery cell and the starter motor when the lithium-ion battery is attached to the battery receptacle. The enable terminal of the lithium-ion battery must be connected with the enable terminal of the battery receiver to receive an enable signal to the lithium-ion battery to allow the lithium-ion battery to provide power to the starter motor to start the internal combustion engine.

Alternative exemplary embodiments relate to other features and combinations of features as may be generally recited in the claims.

BRIEF DESCRIPTION OF THE DRAWINGS

The disclosure will become more fully understood from the following detailed description when taken in conjunction with the accompanying figures.

DETAILED DESCRIPTION

Figure 1:
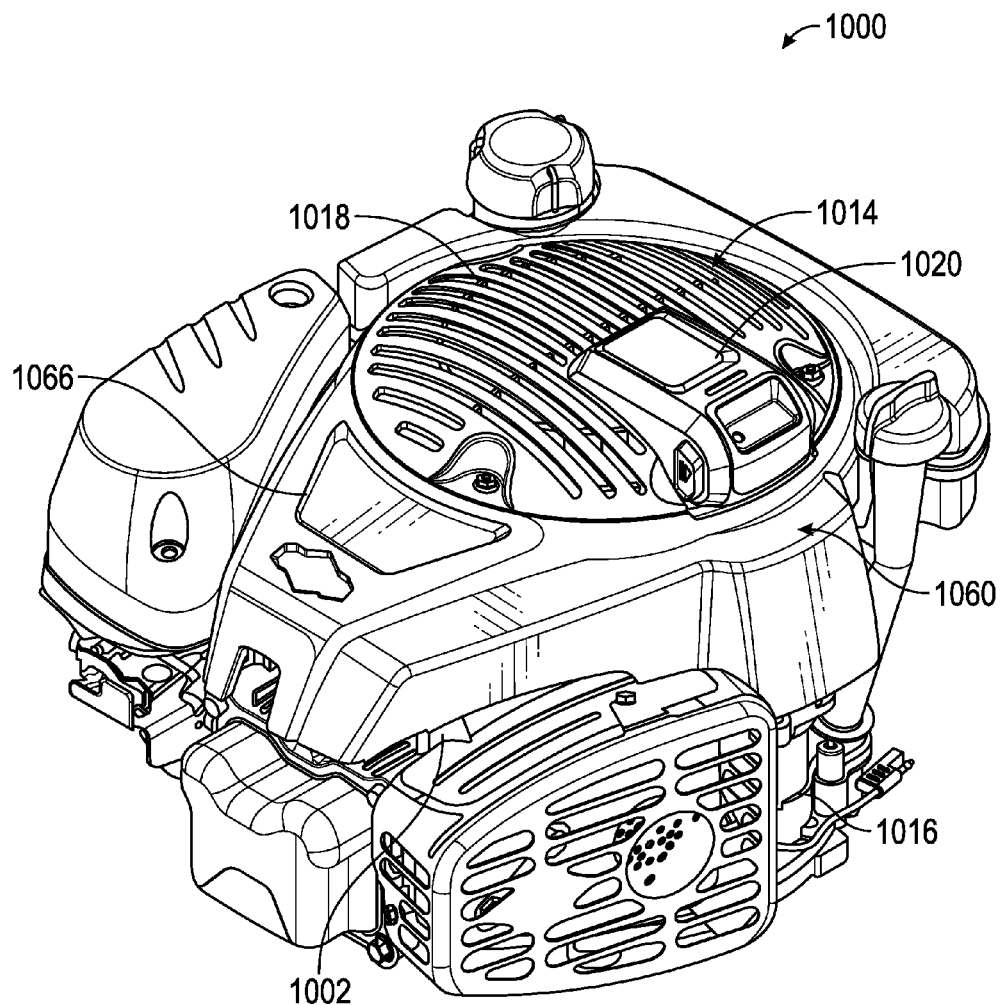
FIG. 1 is a perspective view of an internal combustion engine including an electric starting system powered by a lithium-ion battery, according to an exemplary embodiment of the invention.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Internal combustion engines including electric starting systems powered by a removable, rechargeable lithium-ion battery, as described herein, provide numerous advantages over engines that are manually started and engines including electric start systems powered by a lead-acid battery. Electric starting systems eliminate the need for a manual recoil starter and the need for the user to pull the starter rope to start the engine. Using a removable, rechargeable lithium-ion battery to power the electric starting system eliminates many of the hassles, inconveniences, and shortcomings of systems powered by the lead-acid batteries. As described herein, the lithium-ion battery is removable from a battery receiver without the use of tools. The relatively lightweight lithium-ion battery is easily attached to and removed from the battery receiver by hand. This is greatly simplified from the process of removing a lead-acid battery from a piece of outdoor power equipment. A user must safely disconnect the electrical leads connected to the terminals of the lead-acid battery, which requires the use of tools. The lead-acid battery must then be removed from its mounting location, typically a frame, plate, or other mounting location separate from the engine. This also requires the use of tools. In several preferred embodiments, the battery receiver is a component of the engine itself so the lithium-ion battery is mounted to the engine, rather than a location remote from the engine like a lead-acid battery would be. Systems using lead-acid batteries may have the lead-acid battery covered or otherwise out of sight (e.g., under the seat of a riding tractor), requiring the user to remove or move components to access the lead-battery, another step which may require the use of tools. The ease of removing the lithium-ion battery makes it easier to limit the battery's exposure to cold temperatures than a lead-acid battery (e.g., on a piece of outdoor power equipment stored in a garage during winter). A user can easily remove the lithium-ion battery and store it in a heated location (e.g., inside the user's home), or keep a second lithium-ion battery in a heated location so that the second lithium-ion battery is available for use if cold temperatures are affecting the operation of the first lithium-ion battery. Disconnecting, removing, reinstalling, and reconnecting a lead-acid battery using tools in similar cold weather operating conditions is a burdensome task not done by a typical user. Also, for pieces of outdoor power equipment used seasonally (e.g., lawn mowers and pressure washers in warm months and snow throwers in cold months), a lead-acid battery may be run down, dead, or otherwise at a level of charge insufficient to start the engine after a season of not being used (e.g., starting a lawn mower for the first time after winter). A user can either store the lithium-ion battery indoors on the battery charger, keeping it both charged and at an appropriate operating temperature or easily remove the lithium-ion battery from the battery receiver without the use of tools, quickly recharge it in the battery charger, and reattach it to the battery receiver without the use of tools to power the electric starting system and start the engine of the outdoor power equipment.

The lithium-ion battery described herein recharges quickly even when completely depleted of charge. In tests, a lithium-ion battery as described herein completely depleted of charge was charged for one minute and was able to provide power sufficient to twice start the engine to which it was subsequently attached. The lithium-ion battery as described herein can be fully charged in sixty minutes and at full charge can provide fifty starts or more of an engine. The lithium-ion battery as described herein is able to provide more than ten starts of an engine after ten minutes of charging.

The lithium-ion battery described herein eliminates concerns related to the corrosive electrolyte of a lead-acid battery, simplifying handling of the battery by the user.

The ability to install the lithium-ion battery without the use of tools and including the battery receiver as a component of the engine itself simplifies assembly of the engine into a piece of outdoor power equipment by an original equipment manufacturer ("OEM"). There is no need for the OEM to use tools to attach the lithium-ion battery to the outdoor power equipment, unlike with a lead-acid battery, and also no need to use tools to connect electrical leads to the terminals of the battery. Also, fewer parts may be required. For example, the wiring harness including the electrical leads attached to the lead-acid battery may be eliminated or simplified in its design and/or routing.

The ease of removing and recharging the lithium-ion battery as described herein also increases end-user comfort with outdoor power equipment not including a manual starting system (e.g., a recoil starter). Because the lithium-ion battery is easily removed without tools and quickly recharged to a charge state sufficient to start the engine, the end user can be confident in being able to start the engine in most circumstances (e.g., absent any issues with the starting system and other engine components other than a dead battery). In preferred embodiments, the lithium-ion battery described herein includes a display that visually indicates to the user the battery's level of charge. An electrical starting system powered by a lead-acid battery that is not able to start the engine can be incredibly frustrating for the end user (e.g, because the lead-acid battery has insufficient charge to start the engine). There is no quick and easy way to determine the level of charge in the lead-acid battery and, if necessary, no quick and easy way to replace or recharge the lead-acid battery. A depleted lead-acid battery needs to be disconnected from the electrical leads with tools, removed from the outdoor power equipment with tools, and be properly disposed of. The end user then must acquire a new lead-acid battery, almost certainly needing to take a trip to the store to do so, install the new lead-acid battery with tools, and connect the electrical leads to the new lead-acid battery with tools.

Figure 2:
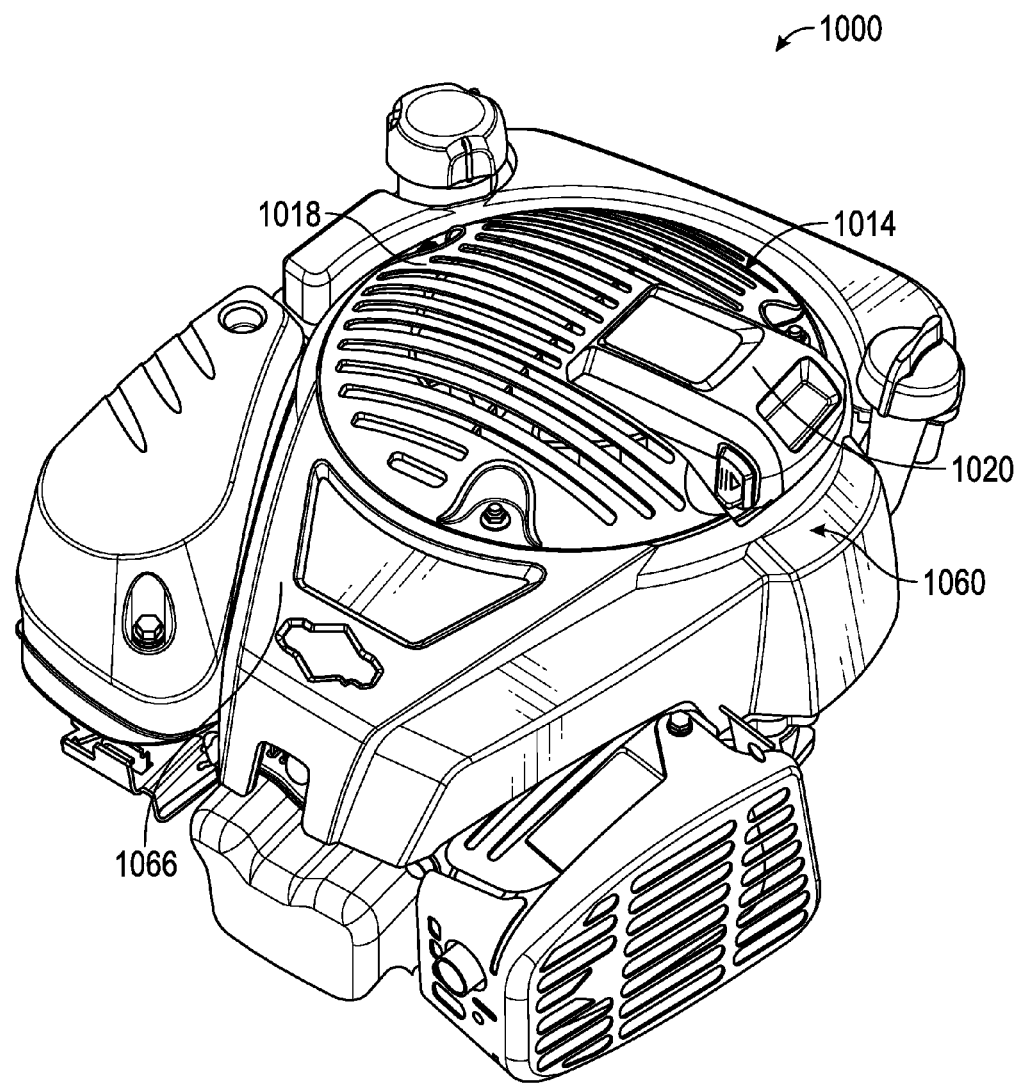
FIG. 2 is a perspective view of the engine of FIG. 1.
Figure 2A:
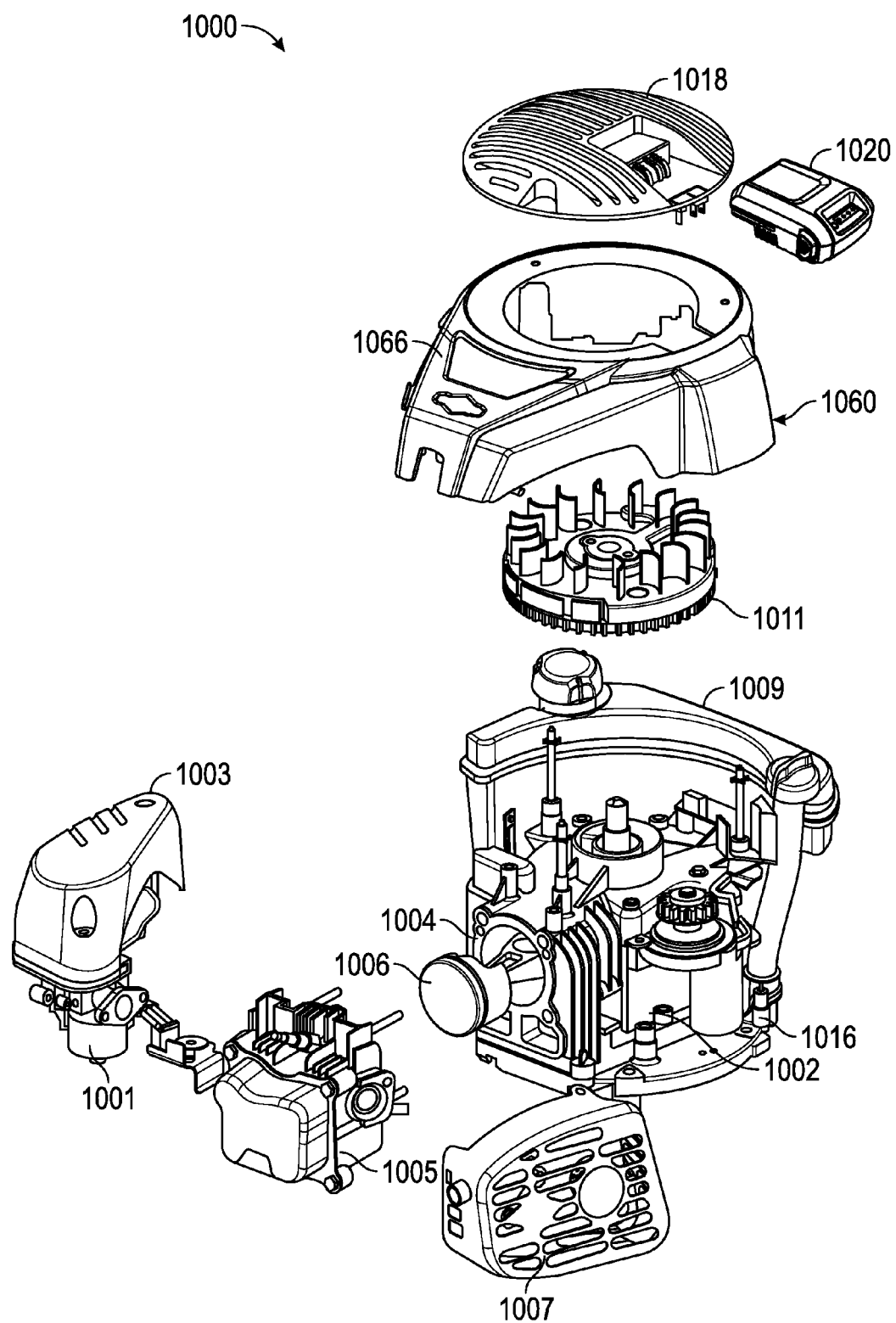
FIG. 2A is an exploded view of the engine of FIG. 1.

Referring to FIGS. 1-5, an internal combustion engine 1000 is illustrated according to an exemplary embodiment. The internal combustion engine 1000 includes an engine block 1002 having a cylinder 1004, a piston 1006, and a crankshaft 1008. The piston 1006 reciprocates in the cylinder 1004 along a cylinder axis 1010 to drive the crankshaft 1008. The crankshaft 1008 rotates about a crankshaft axis 1012. As shown in FIG. 2A, the engine 1000 includes fuel system 1001 for supplying an air-fuel mixture to the cylinder 1004 (e.g., a carburetor, an electronic fuel injection system, etc.), an air filter assembly 1003, a cylinder head assembly 1005, a muffler assembly 1007, a fuel tank assembly 1009, and a flywheel and fan assembly 1011. In the illustrated embodiment, the cylinder 1004 and the cylinder axis 1010 are oriented horizontally (i.e., a horizontal cylinder engine). In some embodiments, the cylinder 1004 and the cylinder axis 1010 can be oriented vertically (i.e., a vertical cylinder engine) or at an angle (i.e., a slanted engine). In some embodiments, the engine includes multiple cylinders, for example, a two cylinder engine arranged in a V-twin configuration.

The engine 1000 also includes an electric starting system 1014. The electric starting system 1014 includes a starter motor 1016, a battery receiver 1018, and a removable, rechargeable lithium-ion battery 1020. The starter motor 1016 is electrically coupled to the lithium-ion battery 1020 to be powered by the lithium-ion battery 1020. When activated in a response to a user input (e.g., via a key switch, a push button, a bail start system, a trigger start system for a pressure washer, other automatic start system, etc.), the starter motor 1016 rotates the crankshaft 1008 to start the engine. The starter motor 1016 is selectively coupled to the crankshaft 1008 (e.g., by a movable pinion gear that selectively engages a flywheel ring gear) so that the starter motor 1016 may be decoupled from the crankshaft 1008 (i.e., does not rotate with the crankshaft 1008 after the engine 1000 has been successfully started). As illustrated, the starter motor 1016 is attached to the engine block 1002.

Referring to FIGS. 6-18, the battery receiver 1018 is illustrated according to an exemplary embodiment. The battery receiver 1018 includes a receptacle 1022 (port, socket, pocket, etc.) configured to receive the lithium-ion battery 1020. The receptacle 1022 includes three male terminals 1024, 1026, and 1028 configured to couple with corresponding female terminals of the lithium-ion battery 1020. The receptacle 1022 includes a second set of three male terminals 1030, 1032, and 1034 configured to be coupled to corresponding terminals of a wiring harness, which is electrically coupled to the starter motor and any other electrical components of the engine 1000 and/or the piece outdoor power equipment including the engine that are powered by or send signals (data, information, etc.) to and/or from the lithium-ion battery 1020. Each of the terminals 1024, 1026, and 1028 is electrically coupled to a corresponding one of the terminals 1030, 1032, and 1034. Two pairs of the terminals (e.g., terminal pair 1024 and 1030 and terminal pair 1028 and 1034) are used to complete an electrical circuit between the starter motor 1016 and the lithium-ion battery 1020 (e.g., as a positive terminal pair and a ground terminal pair). These two pair of terminals may be referred to as voltage output terminals. The third pair of the terminals (e.g., terminal pair 1026 and 1032) is used to transmit a signal (e.g., an enable signal as described herein) to and/or from the lithium-ion battery 1020. This third pair of terminals may be referred to as data terminals or as the enable terminals. A guide 1036 (wall, protrusion, etc.) is positioned on either side of each of the terminals 1024, 1026, and 1028. Each guide 1036 is received by a corresponding aperture in the lithium-ion battery and helps to guide the terminals 1024, 1026, and 1028 into the corresponding female terminals of the lithium-ion battery 1020. The guides 1036 extend outward from a wall 1038 of the receptacle 1022 to a distance greater than that of the terminals 1024, 1026, and 1028. The enable terminal 1026 extends to a distance less than the voltage output terminals 1024 and 1028. This helps to ensure that lithium-ion battery 1020 is not able to power the starter motor 1016 except when the lithium-ion battery 1020 is properly secured (fully inserted, fully seated, properly inserted, properly seated, properly installed) in the receptacle 1022. Unless the lithium-ion battery 1020 is properly secured, the lithium-ion battery 1020 cannot provide power to the starter motor 1016, even with the voltage output terminals 1024 and 1028 electrically connected to corresponding voltage output terminals of the lithium-ion battery 1020. The lack of connection to the enable terminal 1026 prevents an enable signal needed for the lithium-ion battery 1020 to provide power to the starter motor 1016 from reaching the lithium-ion battery 1020.

The receptacle 1022 is defined by a floor 1040, sidewalls 1042, and an end wall 1044. The receptacle 1022 is open on one end 1046 to allow the lithium-ion battery 1020 to be slid into the receptacle 1022 from the side. The sidewalls 1042 are connected by the end wall 1044. A protrusion or rail 1048 extends inward from each sidewall 1042 and is sized to be received by a corresponding slot in the lithium-ion battery 1020. Each rail 1048 extends forward from the end wall 1044 toward the open end 1046.

The sidewalls 1042 may each include an angled end portion 1050 proximate the open end 1046 such that the open end 1046 has a width that is greater than the width of the lithium-ion battery 1020 and of the remainder of the receptacle 1022. The angled end portions 1050 facilitate the insertion of the lithium-ion battery 1020 into the receptacle 1022 through the open end 1046. The angled end portions 1050 also provide access for a user to actuate the push buttons found on the sides of the lithium-ion battery 1020.

The floor 1040 is an offset body that includes the wall 1038 (a vertical step or shoulder). The wall 1038 may contact a corresponding wall of the lithium-ion battery 1020 to limit the travel of the lithium-ion battery 1020 relative to the receiver 1018. The wall 1038 separates two portions of the floor 1040, the upper portion 1052 and the lower portion 1054. The lower portion 1054 includes a latching region 1056 (strike plate, latching portion, locking region, locking portion) configured to receive a corresponding latch of the lithium-ion battery 1020 to secure the lithium-ion battery to the battery receiver 1018. The latching region 1056 includes apertures 1058 that each are configured to receive and correspond to a protrusion of the latch of the lithium-ion battery 1020.

In some embodiments, the receptacle 1022 is configured to protect the terminals 1024, 1026, and 1028 from environmental hazards. For example, the floor 1040 may slope away from the terminals 1024, 1026, and 1028 to direct moisture away from the terminals 1024, 1026, and 1028. According to other exemplary embodiments, the terminals may be oriented horizontally or the terminals of the battery may be vertical and interface with terminals provided in an elevated portion of the receiver such that any moisture that enters the space between the battery and the receiver flows away from the terminals. The battery receiver 1018 and/or other portions of the engine 1000 proximate the receptacle 1022 may include features (e.g., channels, drain holes, weep holes, sloped surfaces, etc.) that direct moisture and debris away from the terminals 1024, 1026, and 1028.

Figure 16:
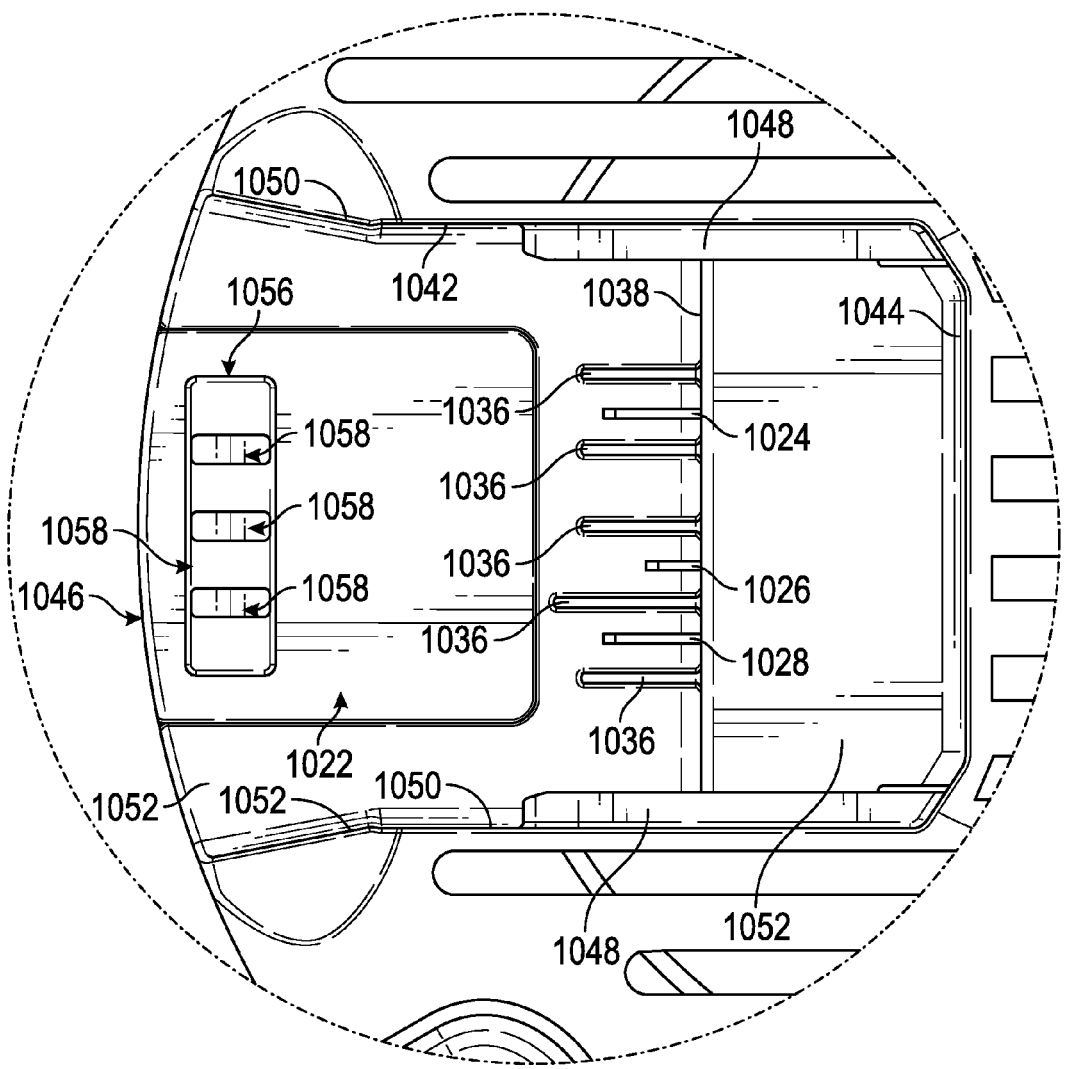
FIG. 16 is a detail view of a portion of the battery receiver of FIG. 15.
Figure 16A:
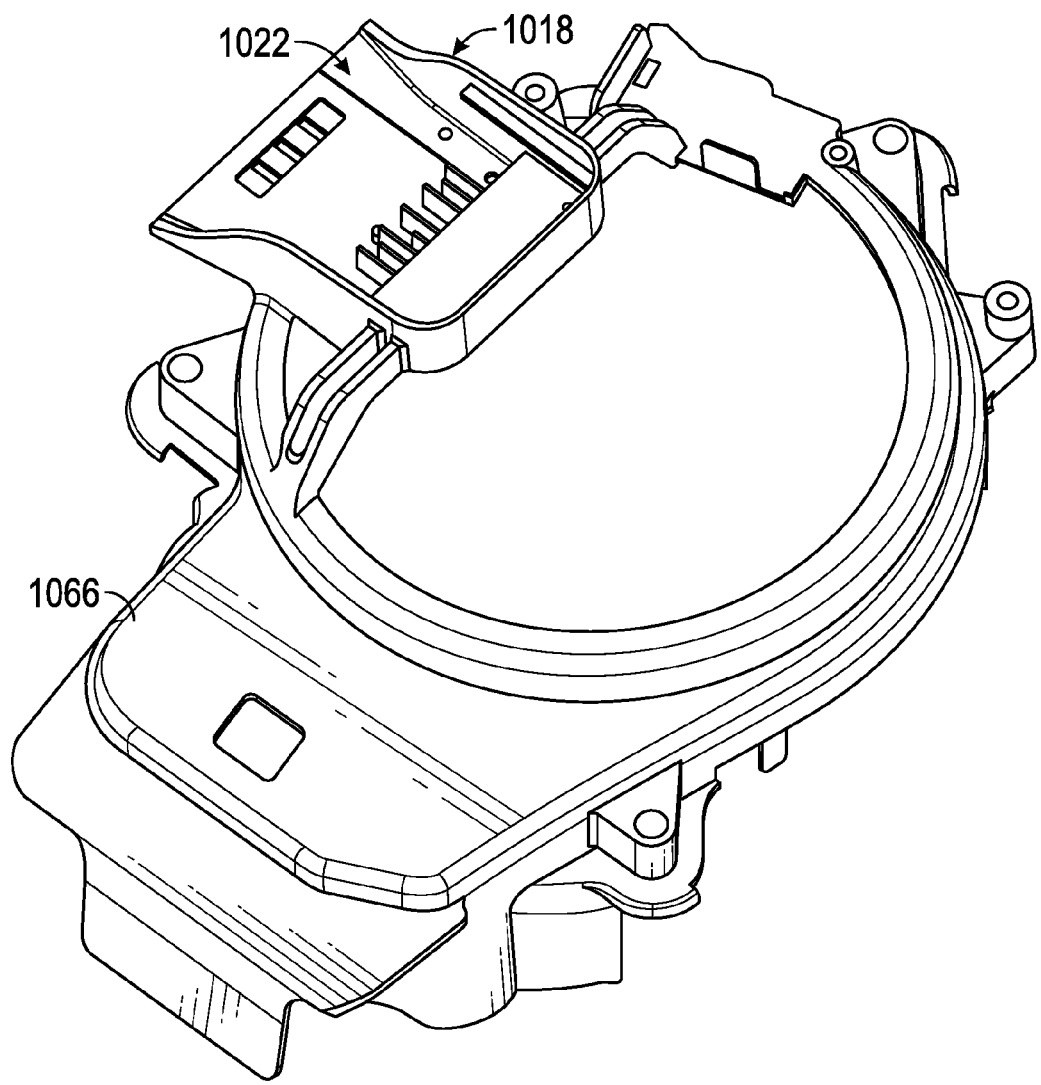
FIG. 16A is a perspective view of a battery receiver for a starting system, according to an exemplary embodiment.

As illustrated, the battery receiver 1018 is a portion of an engine housing 1060 (blower housing, cowl, cover, etc.) The battery receiver 1018 includes an air intake 1062. The air intake 1062 includes multiple apertures 1064 (openings, slots, etc.) that allow air to enter the engine housing (e.g., air drawn into the engine housing by a flywheel or blower fan for use to air cool the engine). The apertures 1064 also limit the ability for debris such as grass clippings to pass through the air intake 1062. As illustrated, the battery receiver 1018 is formed as a generally dome-shaped body that is configured as a cover or screen of the engine. The battery receiver 1018 may be separate from a base 1066 (remainder) of the engine housing 1060. As illustrated, the battery receiver 1018 is secured to the base 1066 by threaded fasteners. In other embodiments, for example as illustrated in FIG. 16A, the battery receiver 1018 is integrally formed (e.g., molded) with the base 1066 of the engine housing 1060.

As illustrated, the battery receiver 1018 is positioned relative to the rest of the engine 1000 at the location typically occupied by a recoil starter in a manually-started engine. With this positioning, the electric starting system 1014 replaces the recoil starter in a way that is intuitive to the user by placing the battery receiver 1018 and the lithium-ion battery 1020 in the location where the user expects to find the equipment (i.e., the recoil starter) used to start a typical manually-started engine. This positioning places the battery receiver 1018 above the crankshaft 1008 with the crankshaft axis 1012 extending through a portion of the battery receiver 1018. The flywheel is located below the battery receiver 1018. Eliminating the recoil starter reduces the engine operating temperature (e.g., the oil temperature) by improving air flow into the cooling system (e.g., the blower housing). For example, replacing the recoil starter with the battery receiver 1018 and the lithium-ion battery 1020 can reduce the engine operating temperature by between 10 and 20 degrees Fahrenheit (5.6 degrees and 11.1 degrees Celsius) in expected operating conditions.

Figure 17:
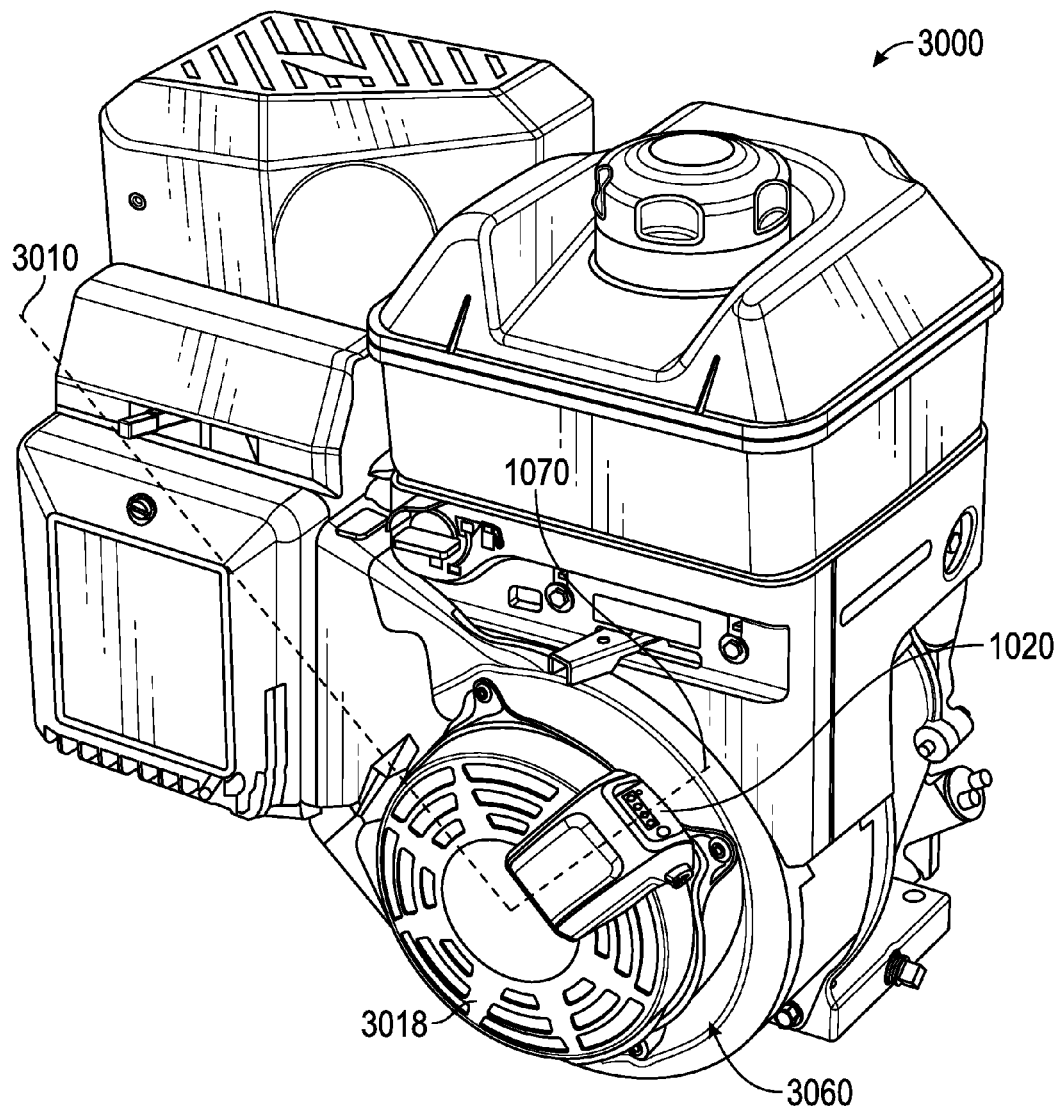
FIG. 17 is a perspective view of an internal combustion engine including an electric starting system powered by a lithium-ion battery, according to an exemplary embodiment of the invention.
Figure 18:
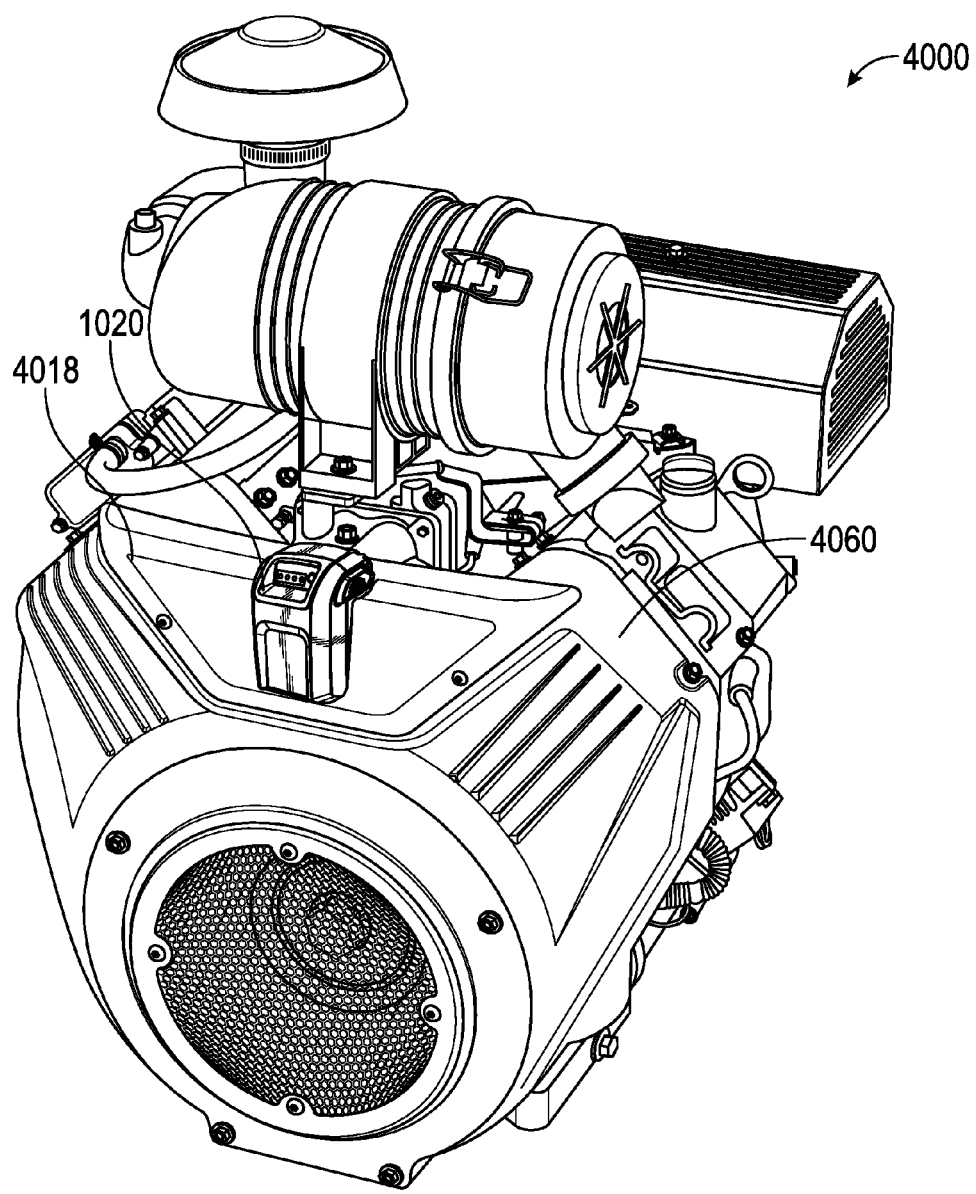
FIG. 18 is a perspective view of an internal combustion engine including an electric starting system powered by a lithium-ion battery, according to an exemplary embodiment of the invention.
Figure 19:
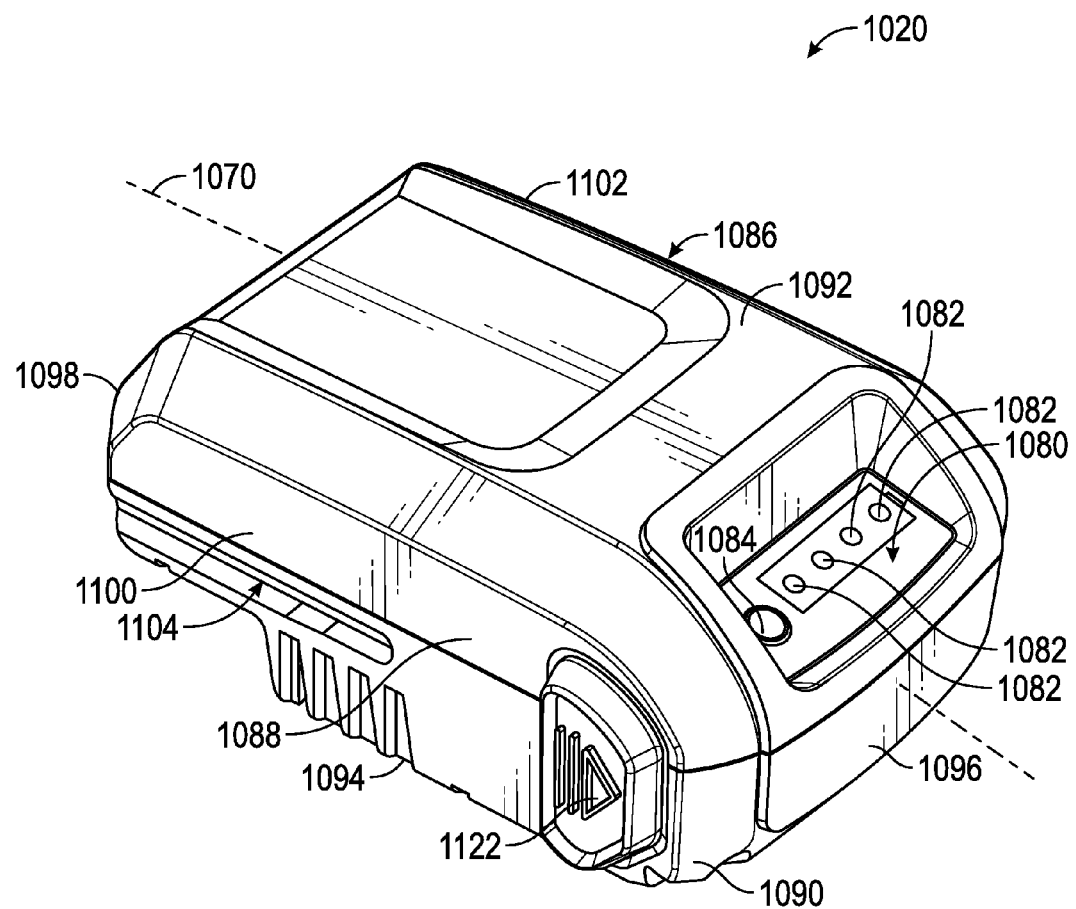
FIG. 19 is a perspective view of a lithium-ion battery for use with an electric starting system of an internal combustion engine, according to an exemplary embodiment of the invention.

Reducing the engine operating temperature can help to reduce oil deterioration, overheating, and other failure modes related to high temperatures. In other embodiments, the receptacle 1022 is incorporated into a battery receiver having a different shape or form appropriate to the mounting location for that receiver relative to the other components of the engine 1000. For example, the battery receiver for a horizontally-shafted single-cylinder engine or for a two-cylinder engine may be located at a different portion of the engine housing than the vertically-shafted single-illustrated engine 1000 as shown. Referring to FIG. 17, a horizontally-shafted single-cylinder internal combustion engine 3000 is illustrated according to an exemplary embodiment. The lithium-ion battery 1020 is selectively attached to a battery receiver 3018. As illustrated, the battery receiver 3018 is a portion of the engine housing 3060. Referring to FIG. 18, a V-twin two-cylinder internal combustion engine 4000 is illustrated according to an exemplary embodiment. The lithium-ion battery 1020 is selectively attached to a battery receiver 4018. As illustrated, the battery receiver 4018 is a portion of the engine housing 4060. In other embodiments, the battery receiver is not a component of the engine itself and is instead mounted to the outdoor power equipment at a location remote from (separate from, spaced apart from), the engine 1000. An electrical connection (e.g., a wiring harness) is used to electrically connect such a battery receiver to the starter motor 1016 and any other required electrical components of the outdoor power equipment. For example, for a riding tractor, riding lawn-mower, snow thrower, or zero-turn mower, the battery receiver may be a component of a dashboard or other user-control panel.

Referring to FIGS. 19-30, the lithium-ion battery 1020 is illustrated according to an exemplary embodiment. The lithium-ion battery 1020 is not equivalent to a lithium-ion battery for use with cordless power tools (e.g., a drill). For example, the lithium-ion battery 1020 may include fewer lithium-ion battery cells than a power tool battery and is intended for less frequent cycling at lower run times than a power tool battery (e.g., used to start an engine, not used to power frequent running of a drill motor for relatively long durations). The operation of the lithium-ion battery 1020 requires an output of relatively high current (e.g., 200 Amps) over a relatively short discharge time (e.g., 10 milliseconds). A lithium-ion battery for use with a power tool or portable computing device (e.g., a laptop computer) provides an output of a relatively low current over a relatively long discharge time. Additionally, a power tool lithium-ion battery is "always on" so that it is always able to provide power to the tool. In a preferred embodiment described in more detail below, the lithium-ion battery 1020 is only on when it is receiving an enable input indicating a need to start the engine. Without the enable input, the lithium-ion battery 1020 does not provide any power to the electric starting system 1014. This allows the lithium-ion battery 1020 to be removed from the receptacle 1022 after the engine 1000 is successfully starter. For example, a user could start the engine 1000 with a lithium-ion battery 1020 having a relatively low charge and then remove and recharge the lithium-ion battery 1020 while using the outdoor power equipment. In a preferred embodiment, the lithium-ion battery 1020 is rated at 10.8 Volts (V) and 1.5 Amp-hours (Ah).

Figure 20:
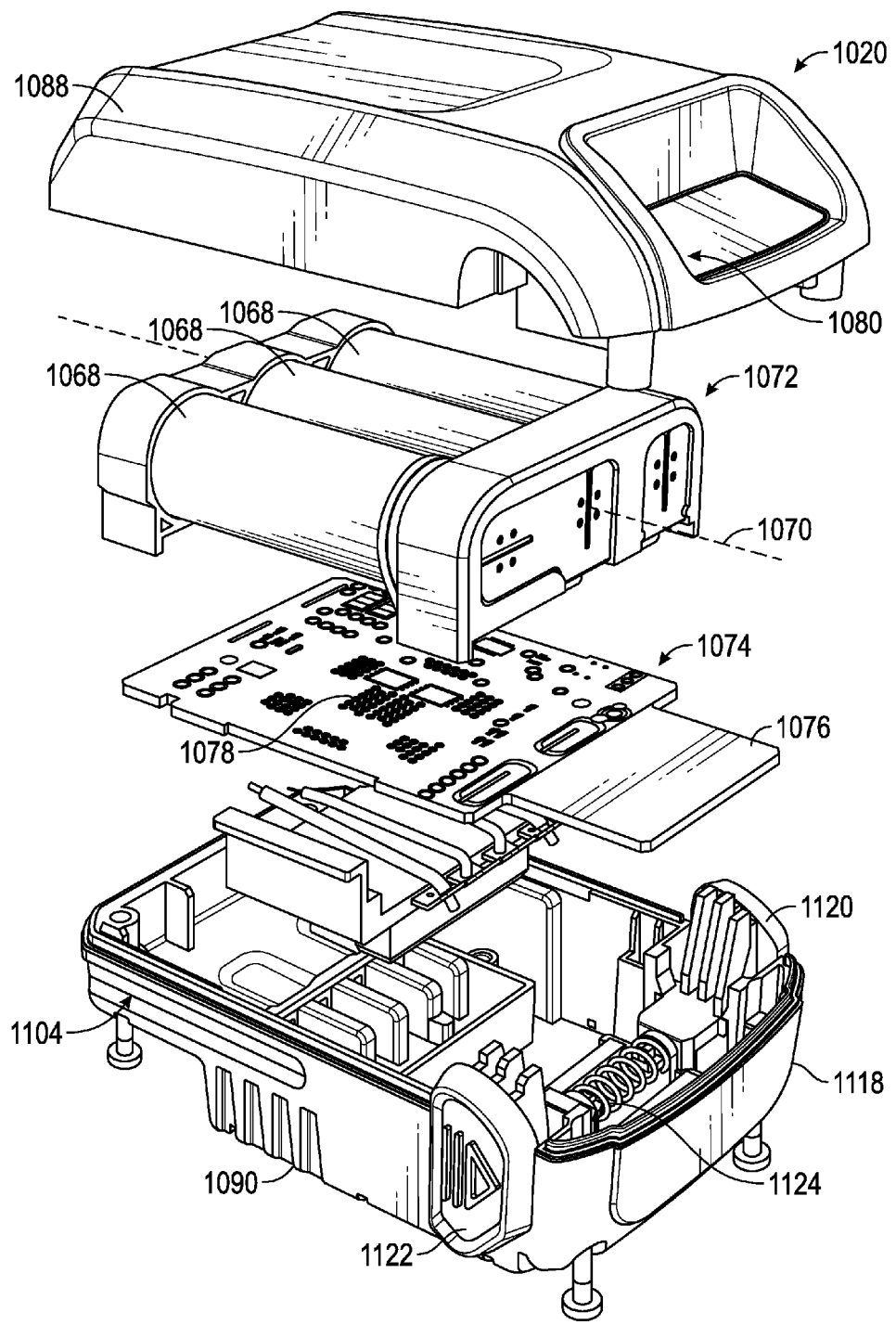
FIG. 20 is an exploded view of the lithium-ion battery of FIG. 19.
Figure 21:
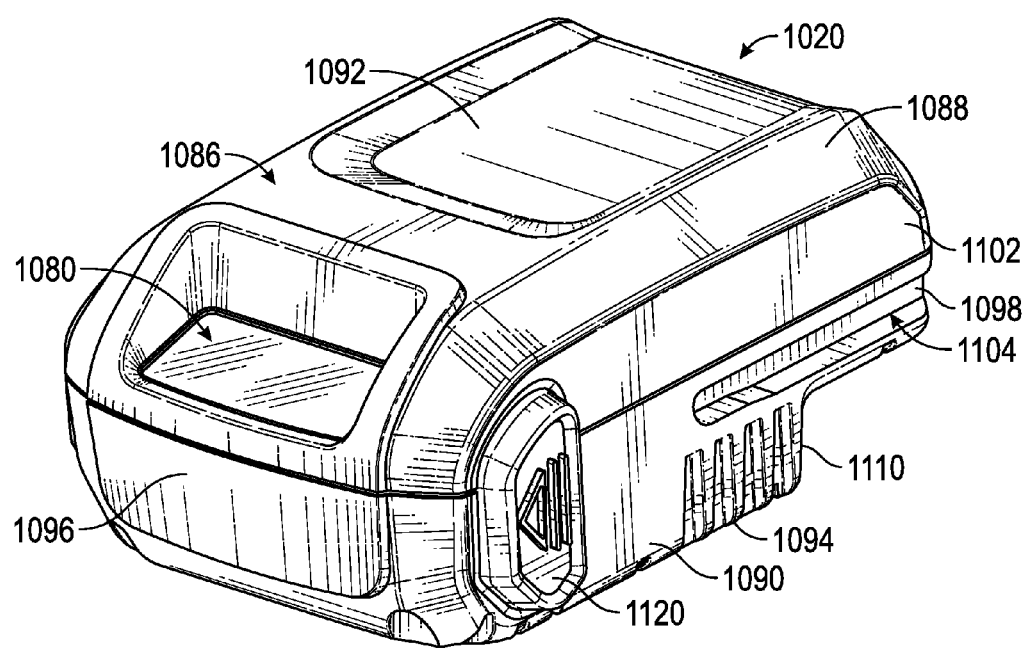
FIG. 21 is a perspective view from above of the lithium-ion battery of FIG. 19.
Figure 22:
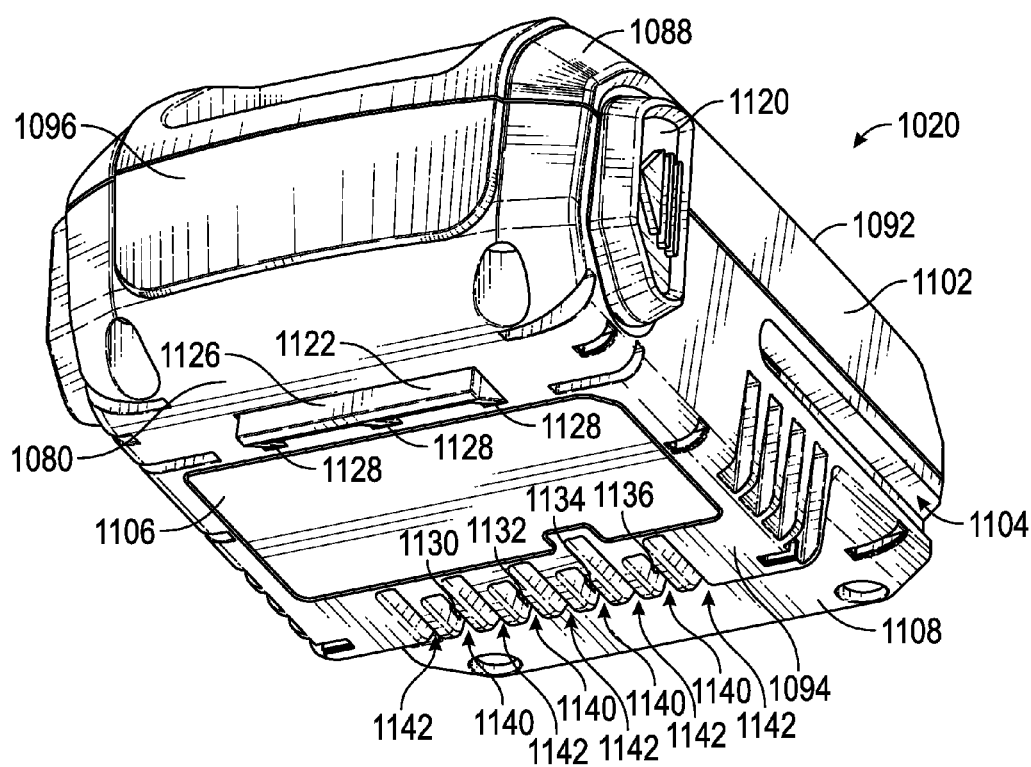
FIG. 22 is a perspective view from below of the lithium-ion battery of FIG. 19.

As shown in FIG. 20, the lithium-ion battery 1020 includes one or more lithium-ion cells 1068 electrically coupled together. As illustrated, three lithium-ion cells 1068 are used, though more or fewer may be used in different embodiments. Each lithium-ion cells 1068 is formed as an elongated body having a longitudinal axis (e.g., a cylindrical, cylinder, or cylindrical roll style lithium-ion cells). All three lithium-ion cells 1068 are oriented in the same direction, the cell axis 1070. The three lithium-ion cells 1068 are secured as a pack 1072 so that the entirety of the pack 1072 (including all three lithium-ion cells 1068) moves as a single integral unit. This prevents the three lithium-ion cells 1068 from moving independently to one another. Movement of the pack 1072 as a single unit helps to reduce failure modes for the lithium-ion battery 1020 related to vibration, as will be explained in more detail herein.

The lithium-ion battery 1020 also includes processing electronics 1074 (controller, processing circuit, etc.) In a preferred embodiment, the processing electronics 1074 includes a processor 1076 (microprocessor) and a memory device 1078. The processor 1076 can be implemented as a general purpose processor, an application specific integrated circuit (ASIC), one or more field programmable gate arrays (FPGAs), a group of processing components, or other suitable electronic processing components. The memory device 1078 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 1078 may be or include volatile memory or non-volatile memory. The memory device 1078 may include database components, object code components, script components, or any other type of information structure for supporting the various activities and information structures described in the present application. According to an exemplary embodiment, The memory device 1078 is communicably connected to processor via processing circuit and includes computer code for executing (e.g., by processing circuit and/or processor) one or more processes described herein. In a preferred device, the processing electronics 1074 implements one or more processes to protect the lithium-ion battery 1020 (e.g., prevents operation outside of a range of appropriate operating temperatures), to optimize performance of the lithium-ion battery 1020, and to optimize the life of the lithium-ion battery 1020.

The lithium-ion battery 1020 further includes a display 1080 for providing information to a user. In the illustrated embodiment, the display 1080 consists of four light sources 1082. In a preferred embodiment, each light source 1082 is a light-emitting diode (LED). In other embodiments, more or fewer light sources may be included. In other embodiments, the display 1080 is a LCD or other appropriate display screen. In some embodiments, an audible device (e.g, a speaker) is used in addition to or in place of the display 1080 to provide information to a user. A user interface 1084 (e.g., a pushbutton, switch, button, touchscreen, etc.) is actuated by the user to activate the display 1080. Once activated, the display 1080 provides a battery charge level indication to the user by turning on one or more of the light sources 1082. In some embodiments, the display 1080 is deactivated after a predetermined amount of time passes after the user actuates the user interface 1084. In other embodiments, the display 1080 is only activated while the user interface 1084 is actuated. In a preferred embodiment, all four light sources 1082 being lit indicates more than 78% charge level, three lights sources 1082 being lit indicates more than 55% charge level, two light sources 1082 being lit indicates more than 33% charge level, one light source 1082 being lit indicates more than 10% charge level, one blinking or flashing light source 1082 indicates less than 10% charge level, and all four light sources 1082 blinking or flashing indicates an error (e.g., an overcurrent state). In some embodiments, the display 1080 is omitted.

A battery housing 1086 contains and supports the lithium-ion cells 1068 and the processing electronics 1074. The housing 1086 also supports the display 1080 and the user interface 1084. As illustrated, the housing 1086 is formed by two primary pieces, a top half or portion 1088 and a bottom half or portion 1090, though other constructions are possible. The housing 1086 has a top side 1092, a bottom side 1094, a front side 1096, a back side 1098, a left side 1100, and a right side 1102. The overall dimensions of the housing 1086 correspond to those of the receptacle 1022 so that the lithium-ion battery 1020 can be received by the receptacle 1022 and attached to the battery receiver 1018. In a preferred embodiment, the housing 1086 is a sealed enclosure that is configured to protect the electrochemical cells by preventing environmental contaminants (e.g., moisture, plant debris, salt, dust, etc.) from passing into the interior of the housing 1086. The housing 1086 provides a rugged structure that is able to withstand impact during operation of the outdoor power equipment (e.g., impacts from branches or trunks when operating a lawn mower). The housing 1086 can be formed from a material that is resistant to liquid or vaporized fuel (e.g., polyethylene terephthalate or PET) to prevent fuel from passing into the interior of the housing 1086.

An aperture or slot 1104 is formed in the left side 1100 and the right side 1102 proximate the back side 1098. The slots 1104 include an open end at the back side 1098 and an opposite closed end. Each slot 1104 is sized to receive the corresponding rail 1048 of the receptacle 1022. Contact between the closed end of the slots 1104 and the corresponding ends of the rails 1048 functions as a stop to limit the travel of the lithium-ion battery 1020 into the receptacle 1022.

As shown in FIGS. 24, 26-28, and 30, the bottom side 1094 of the housing 1086 is an offset body that mirrors the floor 1040 of the receptacle 1022. The bottom side 1094 includes an upper portion 1106 and a lower portion 1108 separated by a wall 1110. Contact between the wall 1110 of the lithium-ion battery 1020 and the corresponding wall 1038 of the receptacle 1022 functions as a stop to limit the travel of the lithium-ion battery 1020 into the receptacle 1022.

Figure 23:
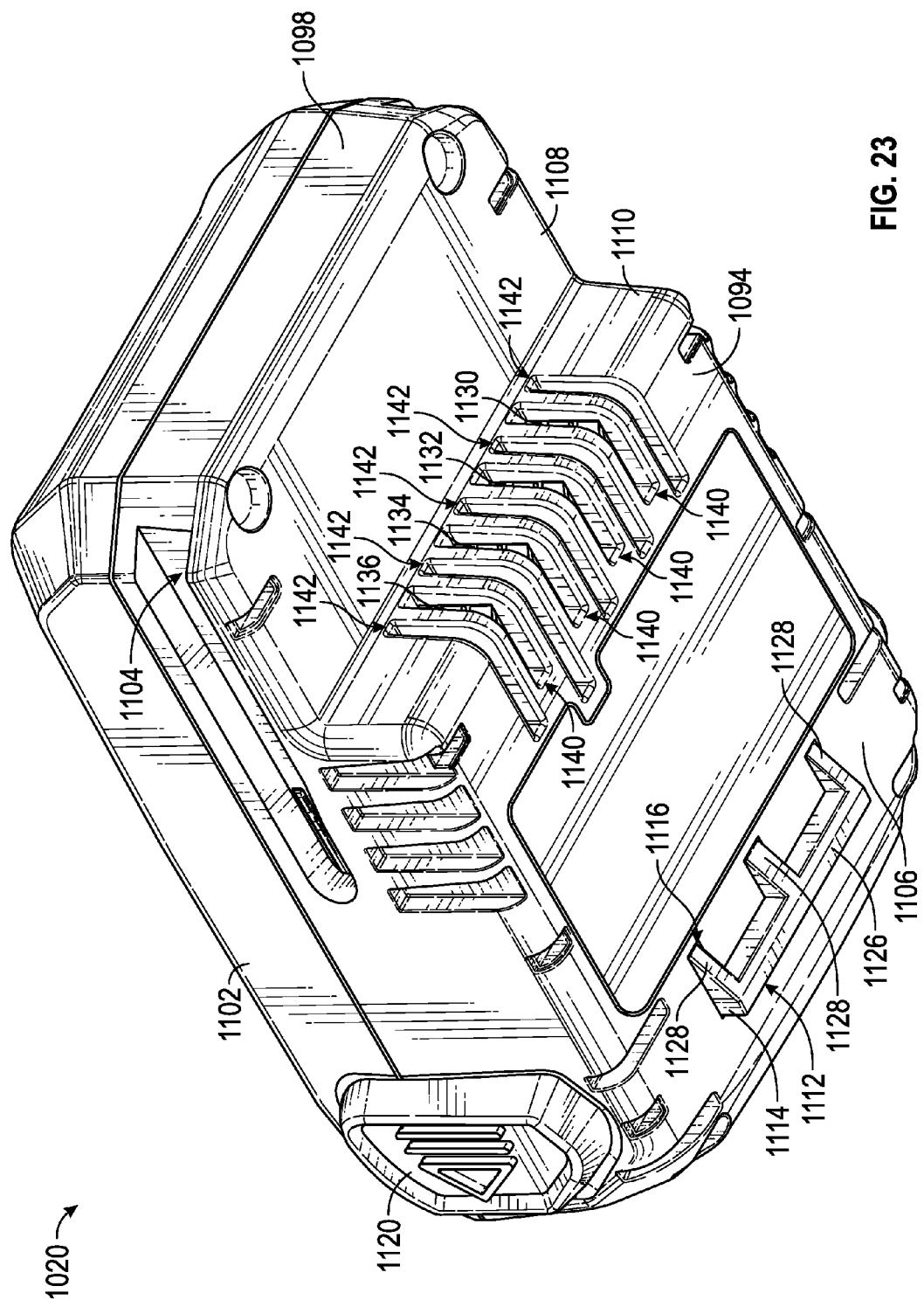
FIG. 23 is a perspective view from below of the lithium-ion battery of FIG. 19.
Figure 24:
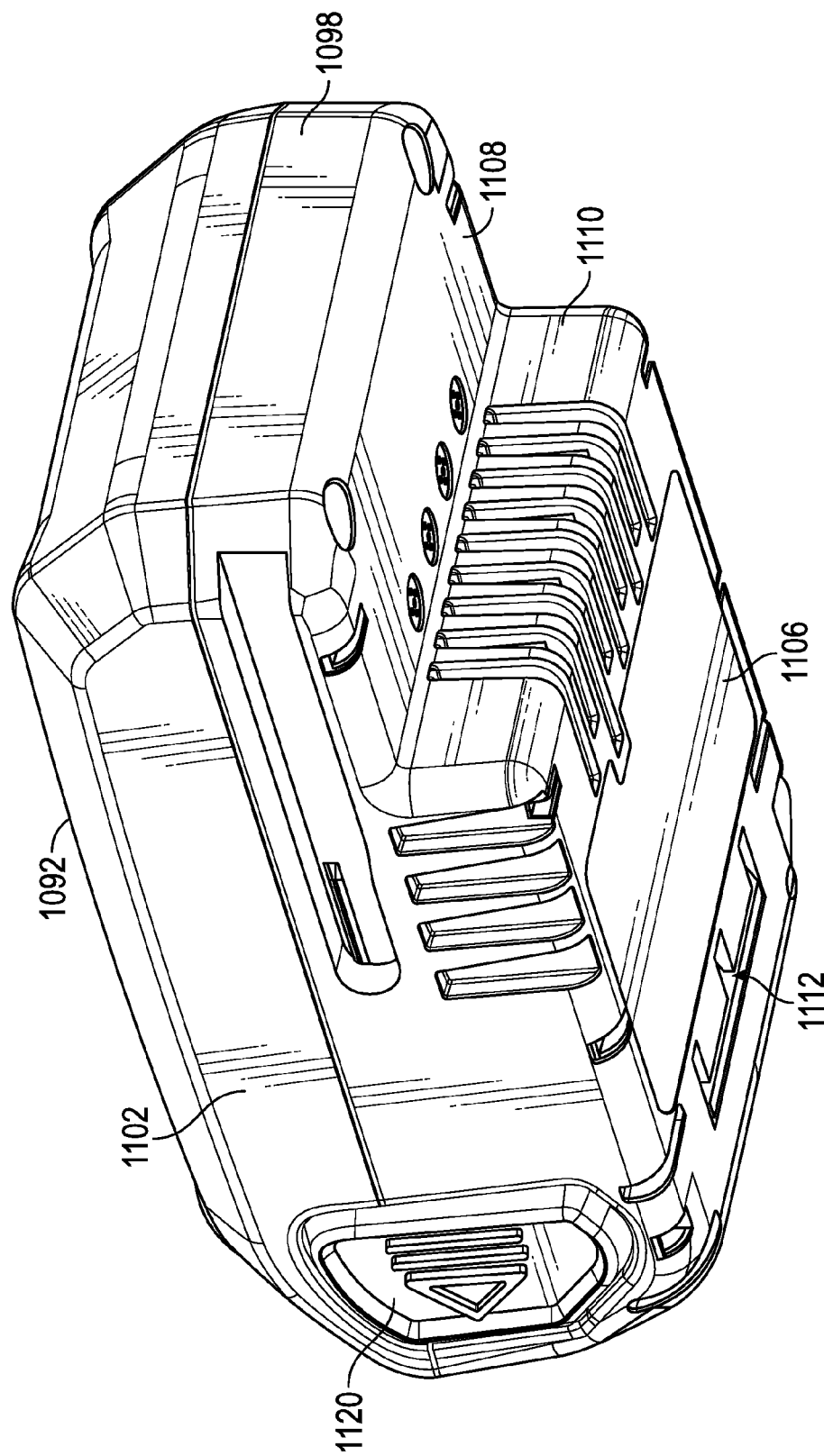
FIG. 24 is a perspective view from below of the lithium-ion battery of FIG. 19.
Figure 25:
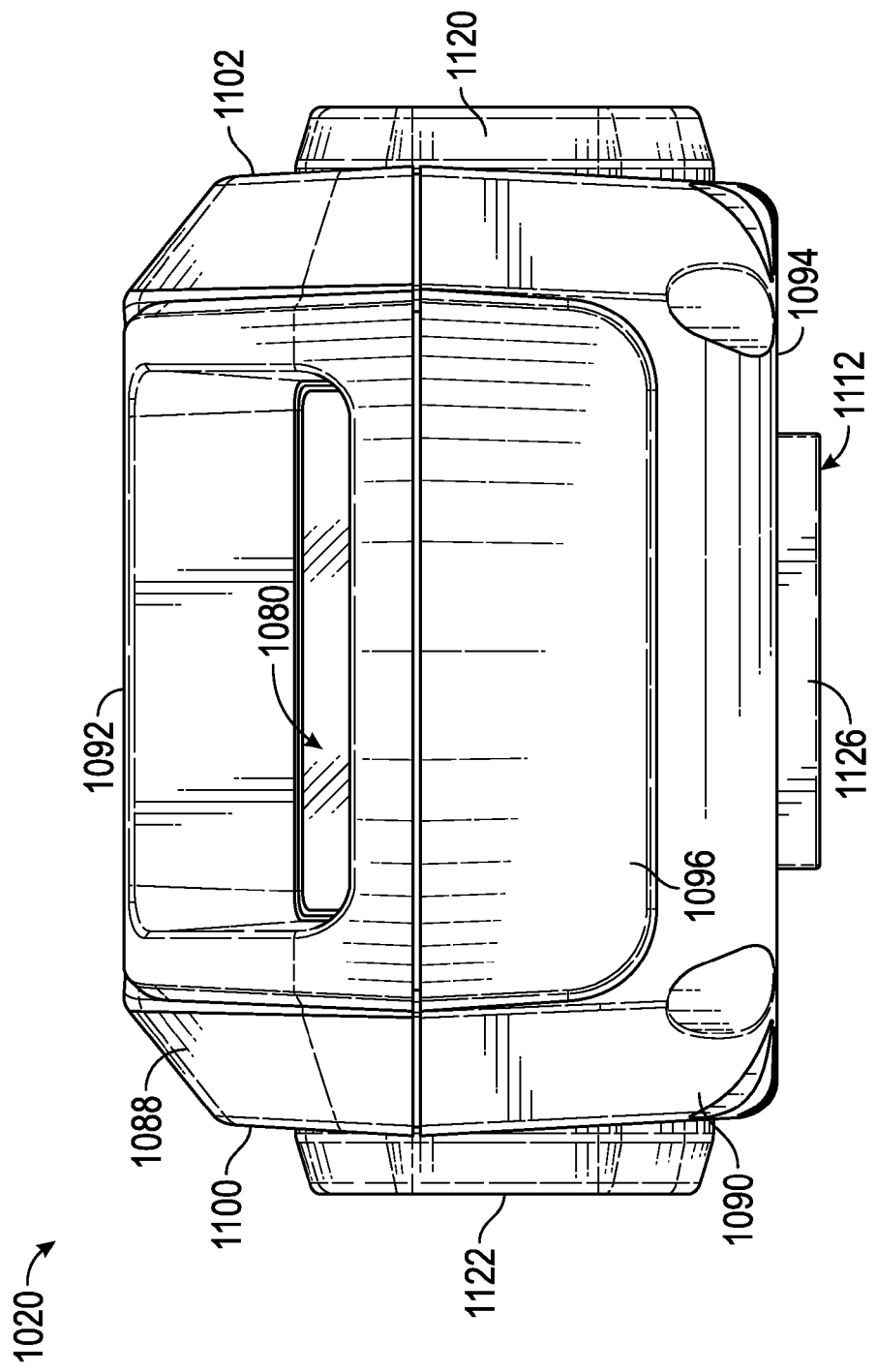
FIG. 25 is a front view of the lithium-ion battery of FIG. 19.
Figure 26:
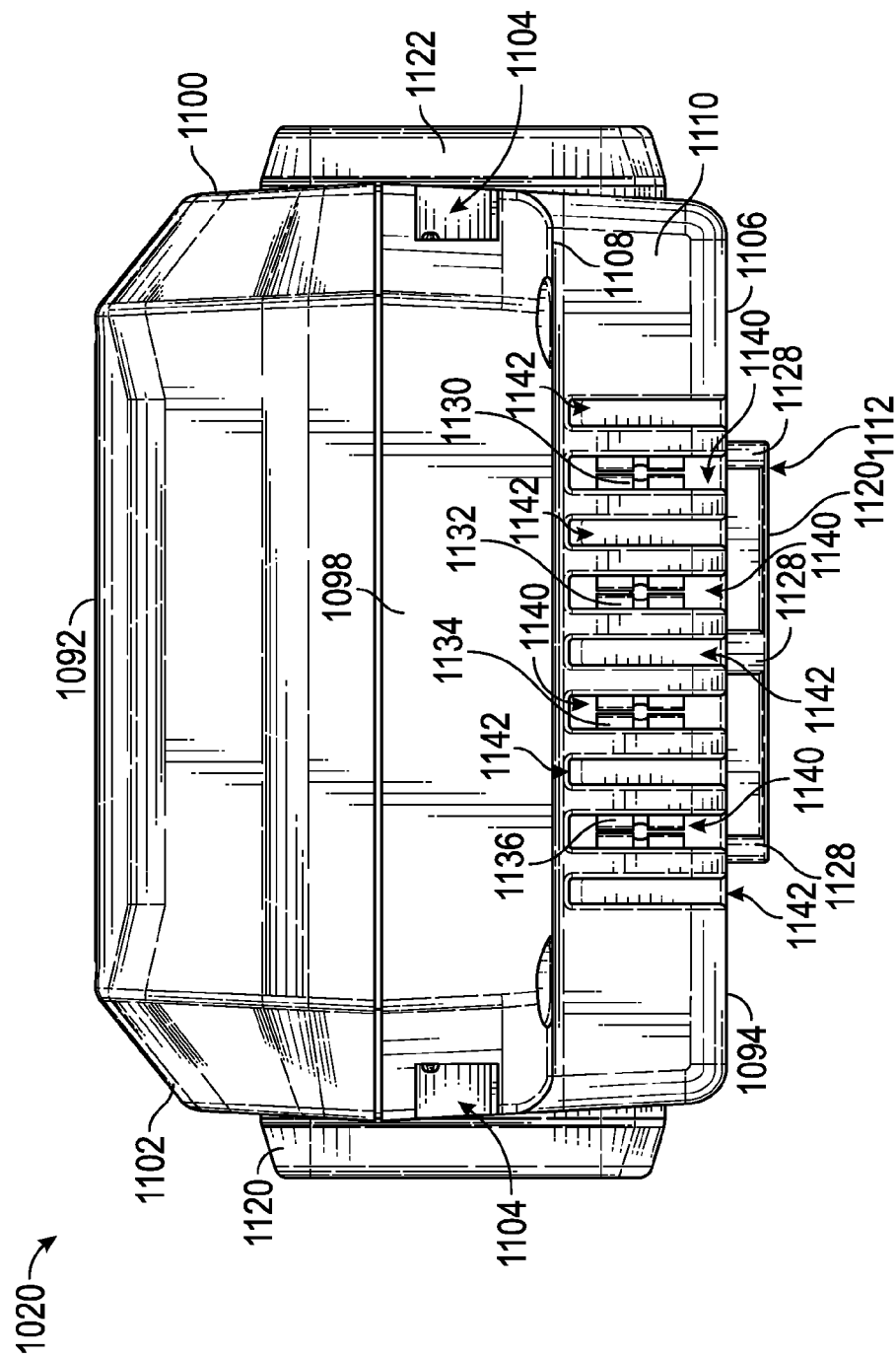
FIG. 26 is a rear view of the lithium-ion battery of FIG. 19.
Figure 27:
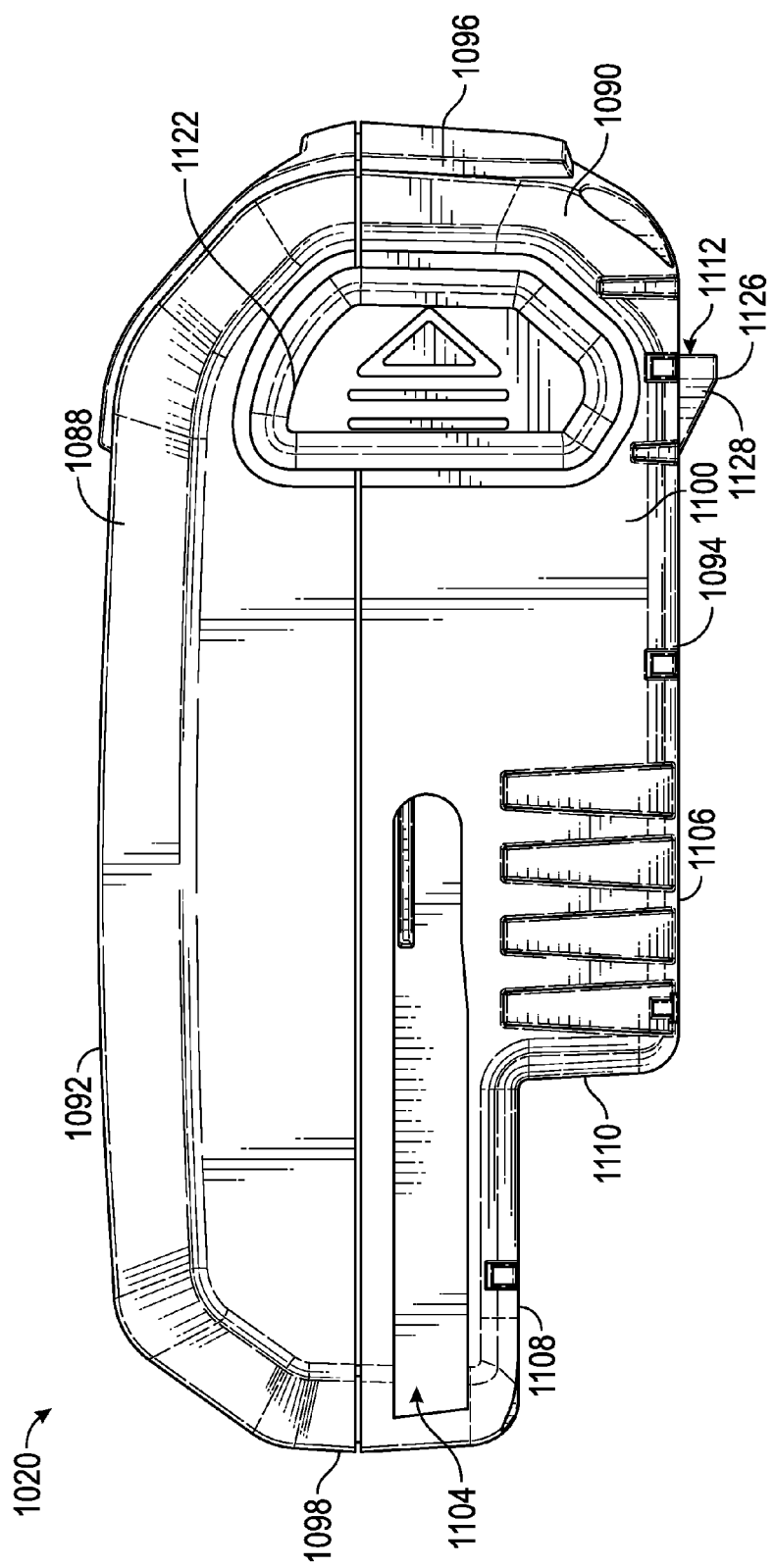
FIG. 27 is a left-side view of the lithium-ion battery of FIG. 19.
Figure 28:
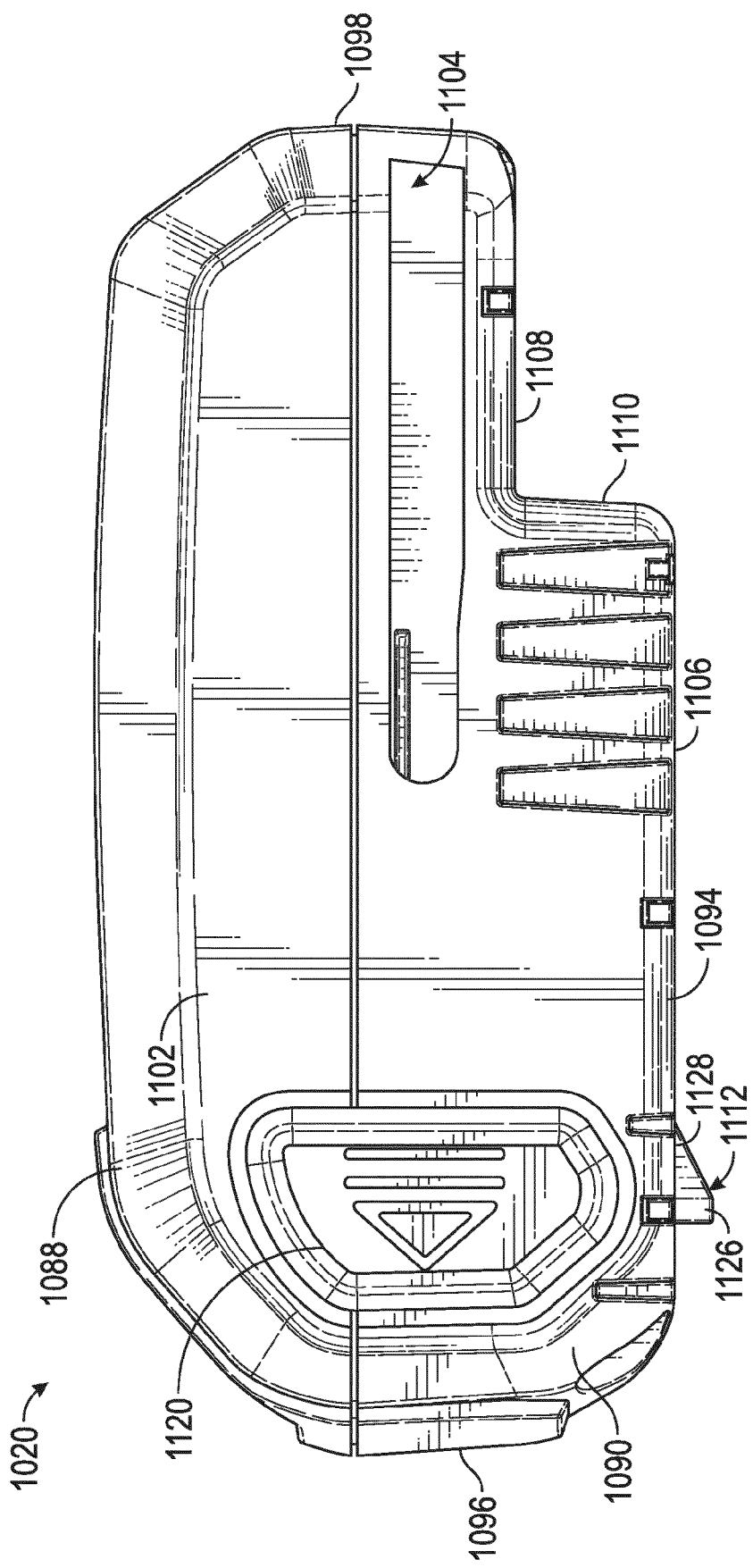
FIG. 28 is a right-side view of the lithium-ion battery of FIG. 19.
Figure 29:
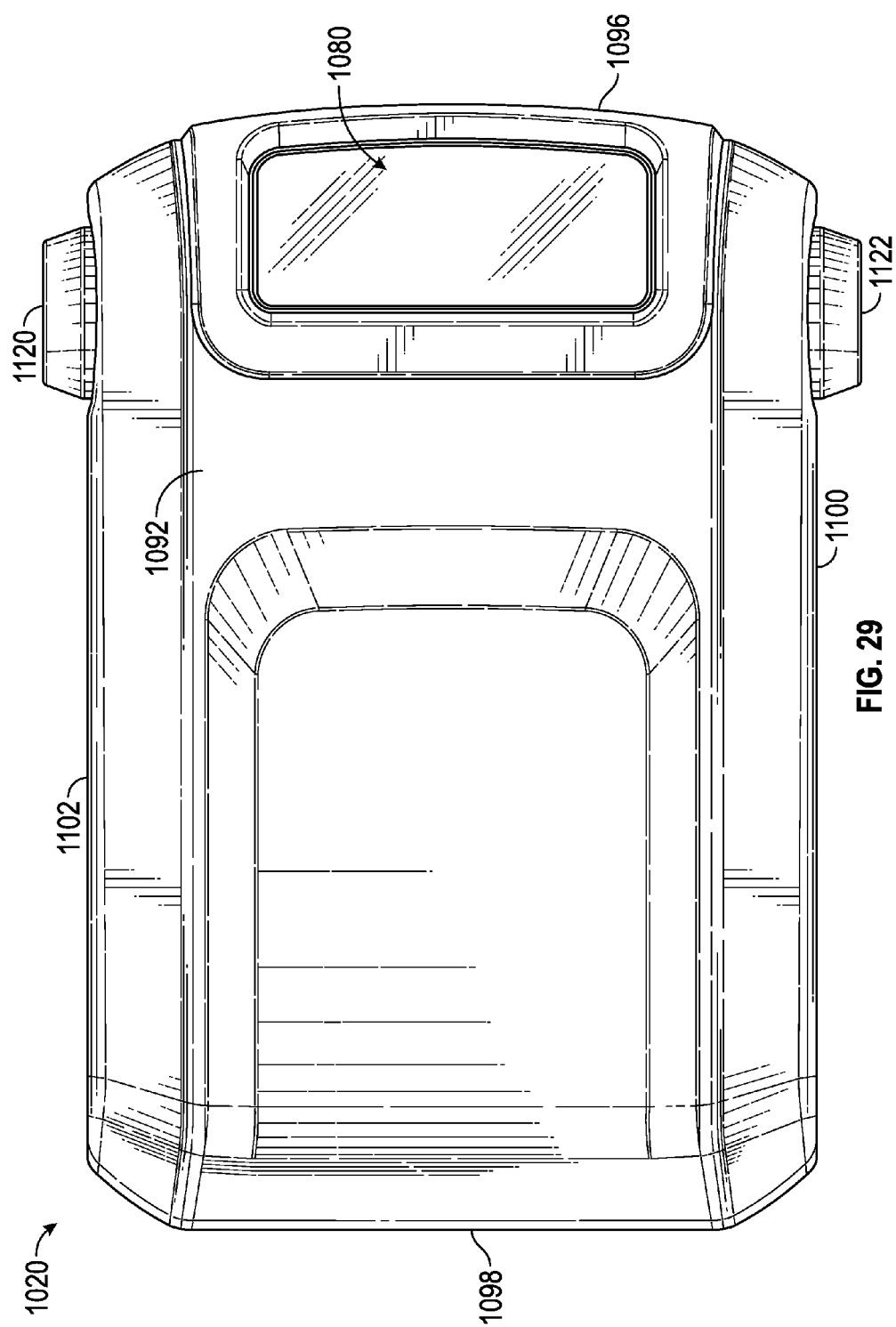
FIG. 29 is a top view of the lithium-ion battery of FIG. 19.
Figure 30:
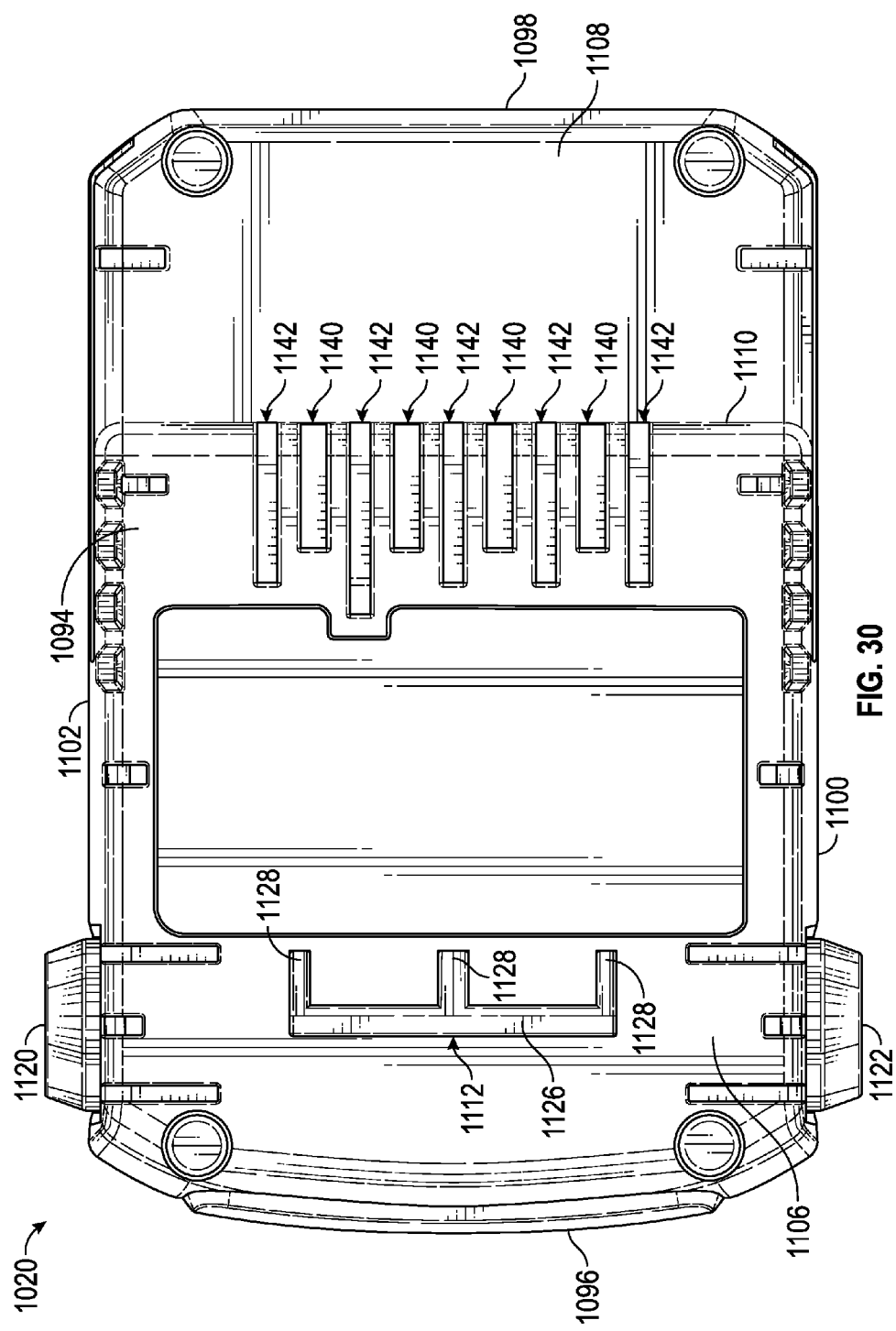
FIG. 30 is a bottom view of the lithium-ion battery of FIG. 19.

A latch 1112 (lock, locking member, latching member) is pivotally coupled to the housing 1086. As shown in FIG. 23, in a latched position (secured, locked, engaged, extended etc.), a latching portion 1114 of the latch 1112 extends through an aperture 1116 (opening) through the bottom side 1094 of the housing 1086 and is retracted through the aperture 1116 into the interior of the housing 1086 in a release position (unlatched, unsecured, unlocked, disengaged, retracted, etc.). A body portion 1118 of the latch 1112 (FIG. 20) remains in the interior of the housing 1086. The latch 1112 is mechanically coupled to a pair of push buttons, a right push button 1120 and a left push button 1122. Each push button extends through an aperture in a corresponding side of the housing. The push buttons 1120 and 1122 are biased outward from the interior of the housing 1086 to an extended position (secured, locked, engaged, latched, etc.) A spring 1124 or other biasing member or biasing members bias the push buttons 1120 and 1122 to the extended position. As shown in FIG. 24, the push buttons 1120 and 1122 are movable inward toward the interior of the housing 1086 to a depressed position (retracted, released, unsecured, unlocked, disengaged, etc.). The mechanical coupling between the push buttons 1120 and 1122 is such that the push buttons being in the extended position causes the latch 1112 to be in the latched position (FIG. 23) and moving both push buttons 1120 and 1122 to the depressed position causes the latch 1112 to be in the release position (FIG. 24). This mechanical coupling also causes the spring 1124 to bias the latch 1112 to the latched position. The push buttons 1120 and 1122 are able to move separately from one another, but each push button 1120 and 1122 must be in its depressed position for the latch to completely be in the release position. This arrangement helps to avoid accidental unlatching (unsecuring, release, unlocking, etc.) of the lithium-ion battery 1020 from the receptacle 1022 when only one of the push buttons 1120 and 1122 is depressed. This helps to prevent the lithium-ion battery 1020 from unwanted unlatching when impacted by an object or obstacle (branch, trunk, wall, shrub, rock, etc.) when in use on a piece of outdoor power equipment because it is unlikely that both push buttons 1120 and 1120 will be simultaneously actuated by an unwanted impact with an object of obstacle when using the outdoor power equipment. The latching portion 1114 includes one or more protrusions, as illustrated a transverse wall 1126 and three legs 1128 that extend substantially perpendicular to the wall 1126.

Four female terminals 1130, 1132, 1134, and 1136 are located within the bottom side 1094 of the housing 1086. The female terminals 1130, 1132, 1134, and 1136 are configured to couple with the corresponding male terminals of a receptacle, for example male terminals 1024, 1026, and 1028 of the receptacle 1022 of the battery receiver 1018 or male terminals of the receptacle of a battery charger.

A pair of the terminals (e.g., terminals 1130 and 1134) are used to complete an electrical circuit between the starter motor 1016 and the lithium-ion battery 1020 (e.g., as a positive terminal and a ground terminal). This pair of terminals may be referred to as voltage output terminals. The other two terminals (e.g., terminals 1132 and 1136) may each be used to transmit a signal (e.g., an enable signal as described herein) to and/or from the lithium-ion battery 1020. This second pair of terminals may be referred to as data terminals. In particular, one of the terminals (e.g., terminal 1132) may be referred to as the enable terminal and is used to receive an enable input signal as described herein. In a preferred embodiment, each of the female terminals 1130, 1132, 1134, and 1136 is formed as a pair of opposed springs that receive and hold a male terminal of the lithium-ion battery 1020. The opposed springs exert opposing forces transverse to the longitudinal axis of the male terminal, which helps to reduce wear of the male terminals and make a secure electrical connection between the female terminal and the male terminal.

The terminals 1130, 1132, 1134, and 1136 are positioned within slots or apertures 1140 formed in the bottom side 1094. Each aperture 1140 has an open end in the wall 1110 and an open end in the upper portion 1106 and is sized to receive a corresponding male terminal. Additional apertures 1142 are formed in the bottom side, each with an open end in the wall 1110 and an open end in the upper portion 1106. Each aperture 1142 is sized and positioned to receive one of the guides 1036 of the receptacle 1022. The interaction between the apertures 1142 and the guides 1036 help to guide the lithium-ion battery 1020 into the receptacle 1022 and ensure proper connections between the male terminals of the receptacle 1022 and the female terminals of the lithium-ion battery 1020.

In alternative embodiments, the lithium-ion battery 1020 can include a few as two male terminals (i.e., two voltage output terminals) or more than four male terminals. In some embodiments, two pairs of terminals are configured as voltage output terminals. For example, the first pair of voltage output terminals could provide a voltage (e.g., 10 V) sufficient to start the starter motor 1016 and the second pair of voltage output terminals could provide a voltage (e.g., 3 V) sufficient to power one or more other electric components of the engine 1000 or the outdoor power equipment powered by the engine

1000 (e.g., a light source or processing electronics). As another example, the first pair of voltage output terminals could provide a voltage (e.g., 12 V) sufficient to start the starter motor 1016 and be grouped with an enable terminal to control activation of the lithium-ion battery 1020 and the second pair of voltage output terminals could provide a continuous voltage (e.g., 12 V) not dependent on the state of the enable signal to the enable terminal to power one or more electronic components of the engine 1000 or the outdoor power equipment powered by the engine 1000 other than starter motor 1016.

According to other exemplary embodiments, the lithium-ion battery 1020 may further include additional ports or connectors. For example, the battery may include a universal serial bus (USB) port that may be used as an input to receive power to charge the lithium-ion cells 1068 or as an output to power or charge another device (e.g., a mobile phone, etc.) from the lithium-ion cells 1068.

To attach the lithium-ion battery 1020 to the battery receiver 1018, the user slides the lithium-ion battery 1020 back side first into the receptacle 1022 through the open end 1046. The front end of each rail 1048 is received in the corresponding slot 1104 of the lithium-ion battery 1020, helping to guide the lithium-ion battery 1020 into the receptacle 1022 and to position the lithium-ion battery 1020 within the receptacle 1022. Each of the apertures 1142 of the lithium-ion battery 1020 then receive the corresponding guide 1036 of the receptacle, further helping to guide the lithium-ion battery 1020 into the receptacle and positioning the female terminals 1130, 1132, and 1134 of the lithium-ion battery 1020 to receive the male terminals 1024, 1026, and 1028 of the receptacle 1022. The voltage output terminals 1024 and 1130 and 1028 and 1134 are electrically connected before the enable terminals 1026 and 1132. Contact between the wall 1038 of the receptacle 1022 and the wall 1110 of the lithium-ion battery and contact between the front ends of the rails 1048 of the receptacle 1022 and the closed ends of the slots 1104 of the lithium-ion battery 1020, and contact between the end wall 1044 of the receptacle 1022 and the back side 1098 of the lithium-ion battery 1020 stop (limit, halt) insertion of the lithium-ion battery 1020 into the receptacle 1022 and align the latch 1112 of the lithium-ion battery 1020 and the latching region 1056 of the receptacle 1022. When these points of physical contact between the lithium-ion battery 1020 and the receptacle are made, the lithium-ion battery 1020 is properly secured (fully inserted, fully seated, properly inserted, properly seated, properly installed) in the receptacle 1022. These points of physical contact between the lithium-ion battery 1020 and the receptacle 1022 and the longitudinal dimensions of the enable terminals 1026 and 1132 are arranged so that the enable terminals 1026 and 1132 are not electrically connected unless these points of physical contact are made between the lithium-ion battery 1020 and the receptacle 1022, thereby preventing the lithium-ion battery 1020 from powering the starter motor 1016 because the lithium-ion battery 1020 cannot receive the enable signal. The latch 1112 is biased to latched position to automatically engage the latching region 1056, thereby attaching (securing, locking) the lithium-ion battery 1020 to the battery receiver 1018. In some embodiments, the latch 1112 engages the latching region 1056 with an audible sound (e.g., a "click"). With the latch 1112 in the latched position, the latching portion 1114 engages the latching region 1056 of the receptacle 1022 to attach the lithium-ion battery 1020 to the battery receiver 1018. In the latched position of the latch 1112, the wall 1126 and legs 1128 of the latching portion 1114 are received by corresponding apertures 1058 of the latching region 1056. In the release position of the latch 1112, the wall 1126 and the legs 1128 are moved out of the apertures 1058, unattaching (unsecuring, unlocking, releasing, disengaging) the lithium-ion battery 1020 from the battery receiver 1018 and allowing the lithium-ion battery 1020 to be removed from the receptacle 1022 by reversing the above steps. The latch 1112 is moved to the release position by moving each push button 1120 and 1122 to its depressed position. In this way, the lithium-ion battery 1020 is removably attached to the battery receiver 1018 and the push buttons 1120 and 1122 and latch 1112 allow a user to selectively attach and remove the lithium-ion battery 1020 to the battery receiver 1018 without the use of tools.

Figure 3:
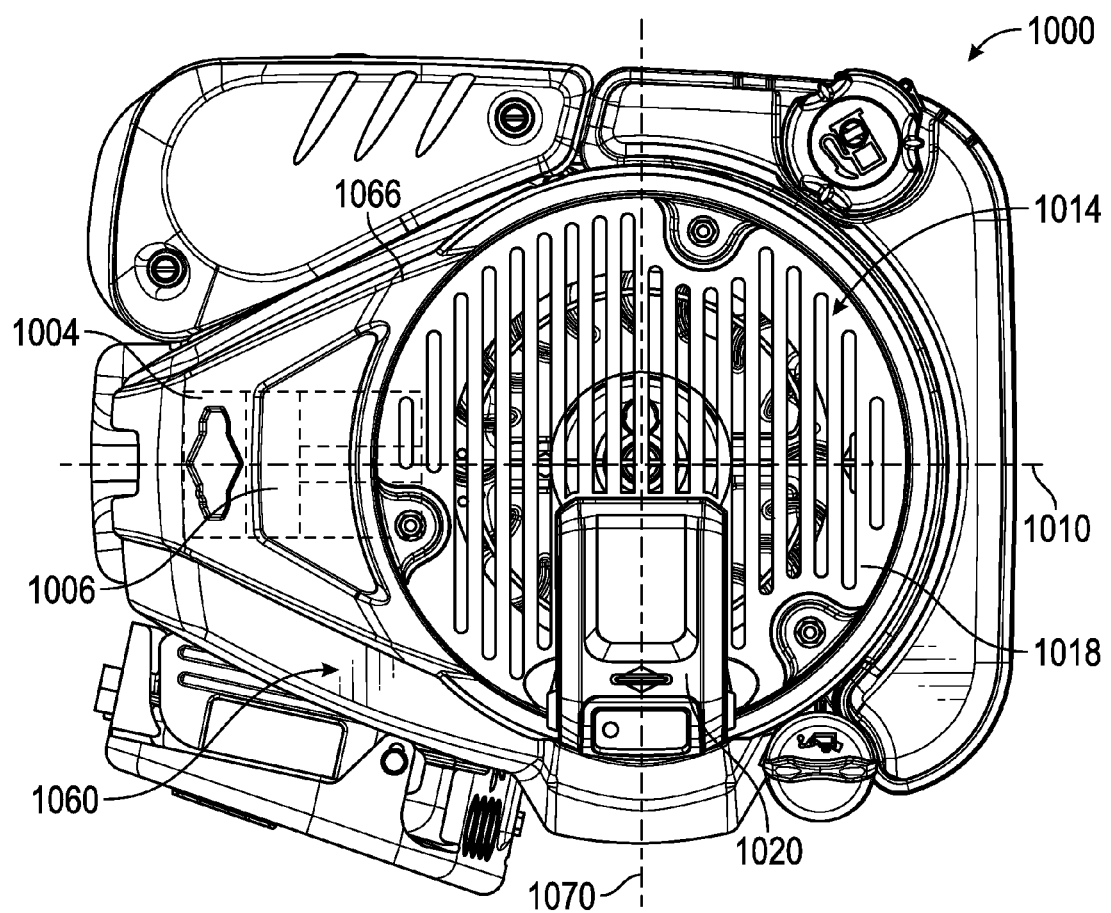
FIG. 3 is a top view of the engine of FIG. 1.

Vibrations caused by the operation of an engine and the operation of the piece of outdoor power equipment that the engine powers can potentially cause the loss of the electrical connections between one or more of the terminals of the lithium-ion battery 1020 and the terminals of the receptacle 1022. These vibrations can also potentially damage the lithium-ion cells 1068 or other sensitive components of the lithium-ion battery 1020 or the battery receiver 1018. These possible negative effects caused by vibrations inherent in the operation of the engine and the outdoor power equipment that the engine powers can be reduced by selecting an appropriate orientation of the cell axis 1070 of a lithium-ion battery 1020 attached to the battery receiver 1018. This cell axis orientation is dependent on the orientation of the receptacle 1022 of the battery receiver 1018. To reduce the possible negative effects caused by vibrations, the cell axis 1070 should not be parallel to (in the same direction) an axis representative of the primary direction of vibrations of the engine or vibrations of the piece of outdoor power equipment to which the engine will be attached (i.e., a primary vibration axis). The vibrations of the engine or the outdoor power equipment will likely not be purely linear in a single direction. However, analyzing the vibrations of the engine or the specific piece of outdoor power equipment identifies the primary vibration axis for that specific engine or piece of outdoor power equipment. For example, the single-cylinder vertically-shafted engine illustrated as the engine 1000 has a primary vibration axis parallel to the cylinder axis 1010. As another example, when the engine 1000 is used to power a lawn-mower having an unbalanced blade driven by the crankshaft 1008, the primary vibration axis is parallel to the crankshaft axis 1012. In a preferred embodiment, the battery receiver 1018 is positioned so that the cell axis 1070 of an attached lithium-ion battery 1020 is as far out of parallel with the primary vibration axis as possible, that is, oriented transverse to (perpendicular to, at an angle of 90 degrees relative to) the primary vibration axis to minimize the possible negative effects of the vibrations. For example, as shown in FIG. 3, the engine 1000 has a primary vibration axis parallel to the cylinder axis 1010 and the cell axis 1070 of the lithium-ion battery 1020 is transverse to the cylinder axis 1010 and therefore also transverse to the primary vibration axis. As another example, as shown in FIG. 17, the horizontally-shafted engine 3000 has a primary vibration axis parallel to the cylinder axis 3010 and the cell axis 1070 of the lithium-ion battery 1020 is transverse to the cylinder axis 3010 and therefore also transverse to the primary vibration axis. Using a Cartesian coordinate system to describe these axes, the cylinder axis 1010 can be considered the x-axis, the cell axis 1070 can be considered the y-axis, and the crankshaft axis 1012 can be considered the z-axis. The primary vibration axis parallel to the z-axis, the battery receiver 1018 could be positioned so that the cell axis 1070 is parallel to the y-axis (as illustrated in FIG. 3) or so that the cell axis 1070 is parallel to the x-axis, with both orientations being transverse to the primary vibration axis. Orientations other than transverse for the cell axis 1070 relative to the primary vibration axis provide some reduction of the negative effects of the vibrations as compared to the cell axis 1070 and the primary vibration axis being parallel to one another. Two axes "substantially transverse" to one another are positioned at 90 degrees plus or minus 10 degrees relative to one another. An axis is "substantially vertical" when within plus or minus 10 degrees of vertical for an engine in a normal operating position. An axis is "substantially horizontal" when within plus or minus 10 degrees of horizontal for an engine in a normal operating position. In some embodiments, the cell axis 1070 is positioned at an angle of at least 15 degrees relative to the primary vibration axis. In some embodiments, the cell axis 1070 is positioned at an angle of at least 45 degrees relative to the primary vibration axis.

Figure 31:
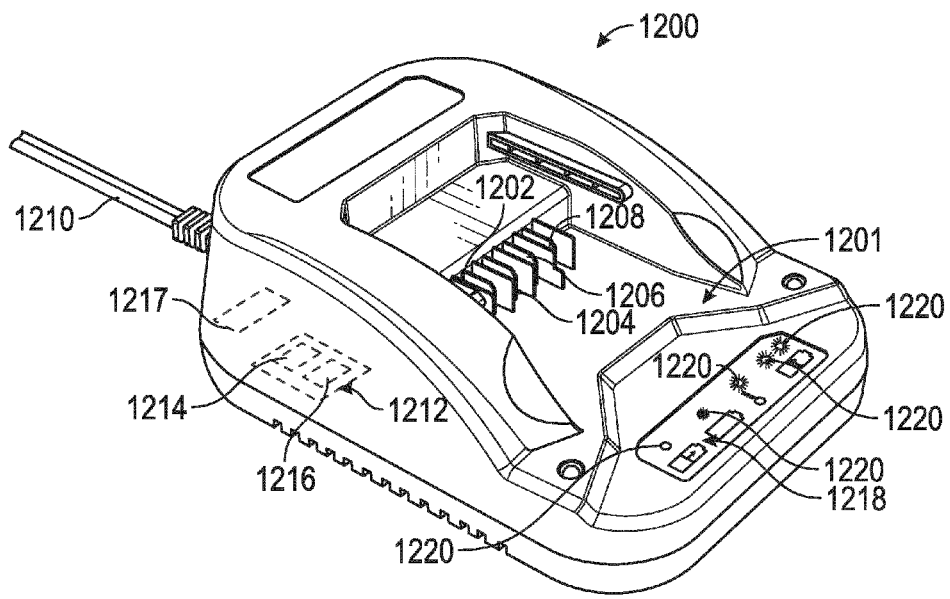
FIG. 31 is a perspective view of a battery charger for use with a lithium-ion battery, according to an exemplary embodiment of the invention.
Figure 32:
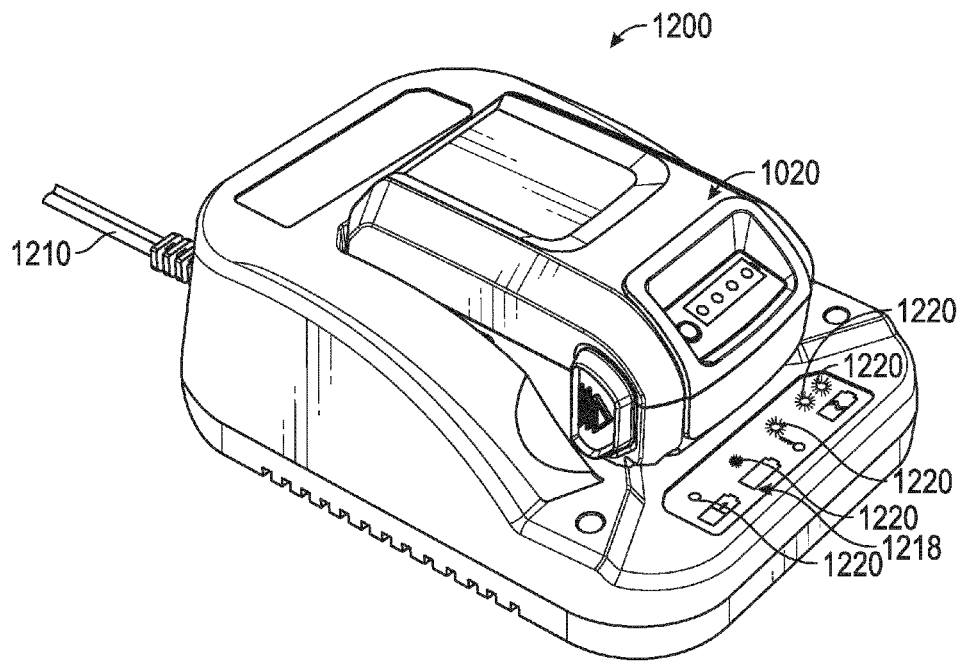
FIG. 32 is a perspective of the lithium-ion battery of FIG. 19 attached to the battery charger of FIG. 31.

Referring to FIGS. 31-32, a battery charger 1200 is illustrated according to an exemplary embodiment. The battery charger 1200 is configured to charge lithium-ion batteries as described herein (e.g., the lithium-ion battery 1020). The battery charger 1200 includes a receptacle 1201 similar to the receptacle 1022 of the battery receiver 1018 described above. The lithium-ion battery 1020 is removably attached to the battery charger 1200 without the use of tools in a manner similar to that described above for the battery receiver 1018.

The receptacle 1201 of the battery charger 1200 includes four male terminals 1202, 1204, 1206, and 1208 rather than the three terminals of the receptacle 1022. Two terminals (e.g., terminals 1202 and 1206) are configured as voltage output terminals as described above and correspond to the female voltage output terminals of the lithium-ion battery 1020. The other two terminals (e.g., terminals 1204 and 1206) are configured as data terminals as described above. The extra fourth terminal (e.g., terminal 1206) relative to the receptacle 1022 is used to transmit status and/or error data from the lithium-ion battery 1020 to the battery charger 1200.

The battery charger 1200 includes a power cord 1210 configured to be connected to a source of electrical power (e.g., an electrical outlet connected to a grid or generator). The type of plug on the cord 1210 will vary depending on the market in which the battery charger 1200 will be used (e.g., the United States uses a different plug configuration than Europe, the United Kingdom uses a different plug configuration than other countries in Europe, etc.). The cord 1210 is electrically connected to a transformer which converts the input electrical power to an electrical power form appropriate for charging the lithium-ion battery 1020 via the voltage output terminals 1202 and 1206.

The battery charger 1200 also includes processing electronics 1212 (controller, processing circuit, etc.) In a preferred embodiment, the processing electronics 1212 includes a processor 1214 (microprocessor) and a memory device 1216. The processor 1214 can be implemented as a general purpose processor, an application specific integrated circuit (ASIC), one or more field programmable gate arrays (FPGAs), a group of processing components, or other suitable electronic processing components. The memory device 1216 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 1216 may be or include volatile memory or non-volatile memory. The memory device 1216 may include database components, object code components, script components, or any other type of information structure for supporting the various activities and information structures described in the present application. According to an exemplary embodiment, The memory device 1216 is communicably connected to processor via processing circuit and includes computer code for executing (e.g., by processing circuit and/or processor) one or more processes described herein. In a preferred device, the processing electronics 1212 implements one or more processes to control charging of the lithium-ion battery 1020, to protect the lithium-ion battery 1020 (e.g., prevents operation outside of a range of appropriate operating temperatures), to optimize performance of the lithium-ion battery 1020, to optimize the life of the lithium-ion battery 1020, and to provide a user with information about the lithium-ion battery 1020. The battery charger 1200 includes a temperature sensor 1217 configured to detect when the ambient temperature is outside of an acceptable operating range (i.e., below a cold threshold temperature or above a hot threshold temperature).

The battery charger 1200 further includes a display 1218 for providing information to a user. In the illustrated embodiment, the display 1218 consists of five light sources 1220. In a preferred embodiment, each light source 1220 is a light-emitting diode (LED). In other embodiments, more or fewer light sources may be included. In other embodiments, the display 1218 is a LCD or other appropriate display screen. In some embodiments, an audible device (e.g, a speaker) is used in addition to or in place of the display 1218 to provide information to a user. In a preferred embodiment, the display 1218 is always activated when a lithium-ion battery 1020 is attached to the battery charger 1200. In a preferred embodiment, the display 1080 of the lithium-ion battery 1020 is also always activated when the lithium-ion battery 1020 is attached to the battery charger 1200. In a preferred embodiment, the first light source 1220 lit to provide red light indicates that the lithium-ion battery 1020 is charging normally, the second light source 1220 lit to provide a green light indicates that the lithium-ion battery 1020 is fully charged, the third light source 1220 lit to provide a red light indicates that a temperature detected by the temperature sensor 1217 is outside the acceptable operating range and that the lithium-ion battery 1020 will not accept a charge, the fourth light source flashing or blinking a red light and the fifth light source flashing or blinking a green light indicates that the lithium-ion battery 1020 will not charge and should be replaced. In some embodiments, the display 1218 is omitted.

In some embodiments, the lithium-ion battery 1020 includes male terminals and the receptacle 1022 of the battery receiver 1018 and the receptacle 1201 of the battery charger 1200 include female terminals. In other embodiments, the lithium-ion battery and the receptacles use other appropriate types of paired electrical connections to electrically connect the lithium-ion battery to the receptacles.

In a preferred embodiment, an engine (e.g., the engine 1000), a lithium-ion battery (e.g., the lithium-ion battery 1020), and a battery charger (e.g., the battery charger 1200) are packaged as an internal combustion engine and battery charging system. For example, such a system could be sold to OEMs for use in various pieces of outdoor power equipment.

For embodiments of the engine 1000 using a magneto or spark ignition system, extra energy in the form of ignition sparks or pulses can be harvested and stored in a capacitor or other energy storage device (e.g., battery) for use to trickle charge the lithium-ion battery 1020 attached to the battery receiver 1018. Though a spark based ignition system is discussed as an example other types of ignition systems are possible. The excess energy of the ignition system may also be sufficient to power the other electrical components of the lithium-ion battery 1020 or the engine 1000. After the engine 1000 is started, there is a relatively abundant amount of excess energy that can be harvested to charge the lithium-ion battery

1020. For example, the energy from the two positive pulses or sparks of a four-cycle magneto ignition system can yield about one amp of current. Other types of ignition systems also provide waste energy that could be harvested to power the electronic governor system. In a four-cycle magneto ignition system there is a waste spark on the exhaust stroke of the cylinder. In such a system, the two positive pulses or sparks and the waste negative pulse or spark could all be harvested. Control circuitry associated with the engine 1000 or outdoor power equipment powered by the engine 1000 (e.g., control circuitry included in the lithium-ion battery 1020, control circuitry included in the battery receiver 1018, other engine or outdoor power equipment control circuitry, etc.) can include an outlet capable of trickle charging the lithium-ion battery 1020 through the use of ignition primary pulses, in accordance with yet another exemplary embodiment. The running state/rpms of the engine 1000 are conventionally monitored by reading ignition primary pulses, wherein each ignition primary has a sequence of positive and negative pulses. The positive primary pulses are not needed/used for production of a spark to fire the engine, so the energy/current from the positive primary pulses may be used for other uses (e.g., monitoring the rpms). In this instance, there is enough energy from the positive primary pulses to both monitor the engine's rpms and trickle charge the lithium-ion battery 1020. Thus, after the engine 1000 has run for a certain period of time (e.g., 12-15 minutes), the positive primary pulses provide enough energy to replenish the energy used during one starting/cranking cycle, thereby eliminating the need for the user to recharge lithium-ion battery 1020 via other means after running engine 1000 a certain amount of time.

Figure 33:
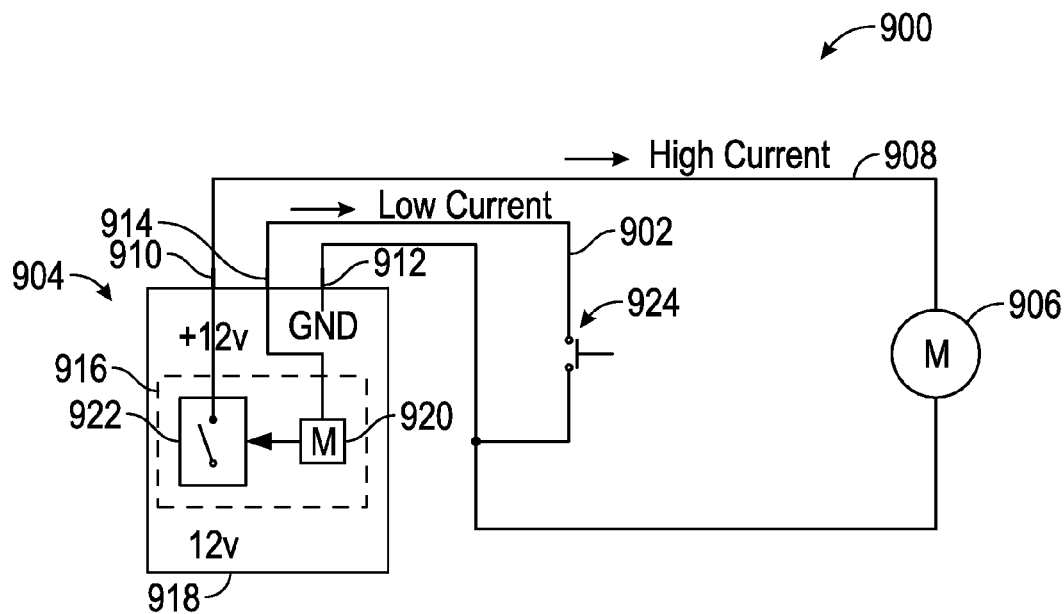
FIG. 33 is a schematic diagram of a starter system for an engine, according to an exemplary embodiment of the invention.

Referring now to FIG. 33, a low current enable circuit 902 for a starter system 900 is shown according to an exemplary embodiment utilizing internal battery circuitry and an external low current switch to engage the starter system 900 and control the high current circuit 908 connecting the starter motor 906 to the battery 904. The starter motor 906 may therefore be stopped and started without the use of costly high current switch provided in series between the battery 904 and the starter motor 906 and configured to handle the full motor current (e.g., more than 100 Amps). The starter system may further include a secondary activation device such as a bail (not shown) as described above.

The battery 904 includes a pair of primary terminals (e.g., contacts, pins, etc.), shown as a first terminal 910 (e.g., positive terminal) and a second terminal 912 (e.g., negative terminal, ground, etc.). The battery 904 is coupled to the starter motor 906 via the first terminal 910 and the second terminal 912 to form the high current circuit 908 powering the starter motor 906. The battery 904 further includes a third terminal 914 (e.g., enable terminal, enable pin, enable contact, etc.), which may be positioned relative to the first terminal 910 and the second terminal 912 similar to the auxiliary terminal 832 of the battery 800 in FIG. 50. The third terminal 914 is coupled to circuitry 916 provided within the battery housing 918. The internal circuitry 916 monitors the internal conditions of the battery 904 for fault conditions (e.g., overvoltage, undervoltage, overcurrent, overtemperature, etc.).

According to an exemplary embodiment, the internal circuitry 916 includes a transistor 920 (e.g., a MOSFET) which enables or disables a switch 922 to selectively provide power to the first terminal 910 of the battery 904. The transistor 920 is connected to the third terminal 914. If the third terminal 914 is connected to the second terminal 912 (e.g., connected to ground), the switch 922 closes and connects the first terminal 910 to the internal cells of the battery 904 to provide power to the first terminal 910 and to the starter motor 906 or another load connected to the battery 904. If the third terminal 914 is disconnected from the second terminal 912, the switch 922 is opened and the battery 904 is disabled.

The low current enable circuit 902 connects the third terminal 914 to the second terminal 912. The low current enable circuit 902 is a low current circuit and may include a switch 924 provided in series between the third terminal 914 and the second terminal 912 allowing a user to selectively enable and disable the battery 904. According to an exemplary embodiment, the switch 924 is a low cost, low current switch actuated with a user interface such as a push-button (e.g., a start button, a bail, etc.) or actuated automatically (e.g., by a pressure switch or sensor, a flow switch or sensor, a combination of the two etc.) as in a trigger-started pressure washer (e.g., pressure washer 2010 described below). The user may depress the button to close the switch 924 and complete the low current enable circuit 902. The internal switch 922 is then closed and current flows from the battery 904 to the motor 906 through the high current circuit 908. Once the starter motor 906 has started the engine, the user may release the button to open the switch 924 and break the low current enable circuit 902 between the third terminal 914 and the second terminal 912. The internal switch 922 is opened and the battery 904 is disabled. The low current enable circuit 902 may be overridden by the internal circuitry 916 such that the user may not enable the battery 904 with the switch 924 if there an internal fault condition is detected. In another embodiment, the switch 924 may not be a non-momentary switch (e.g., latching switch) and may remain closed after the user releases the button.

Figure 34:
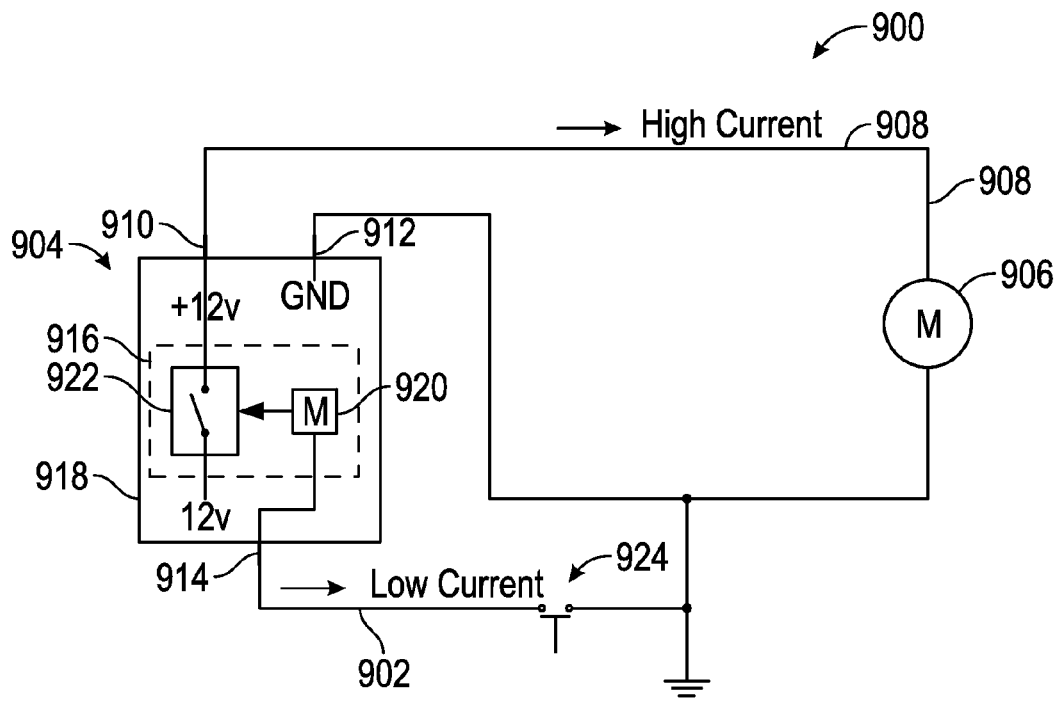
FIG. 34 is a schematic diagram of a starter system for an engine, according to an exemplary embodiment of the invention.

Referring now to FIG. 34, in another embodiment, the third terminal 914 may not be positioned proximate the first terminal 910 and the second terminal 912 but may be positioned elsewhere on the battery 904. For example, the third terminal 914 may be positioned on an opposite side of the battery 904 relative to the first terminal 910 and the second terminal 912.

Figure 35:
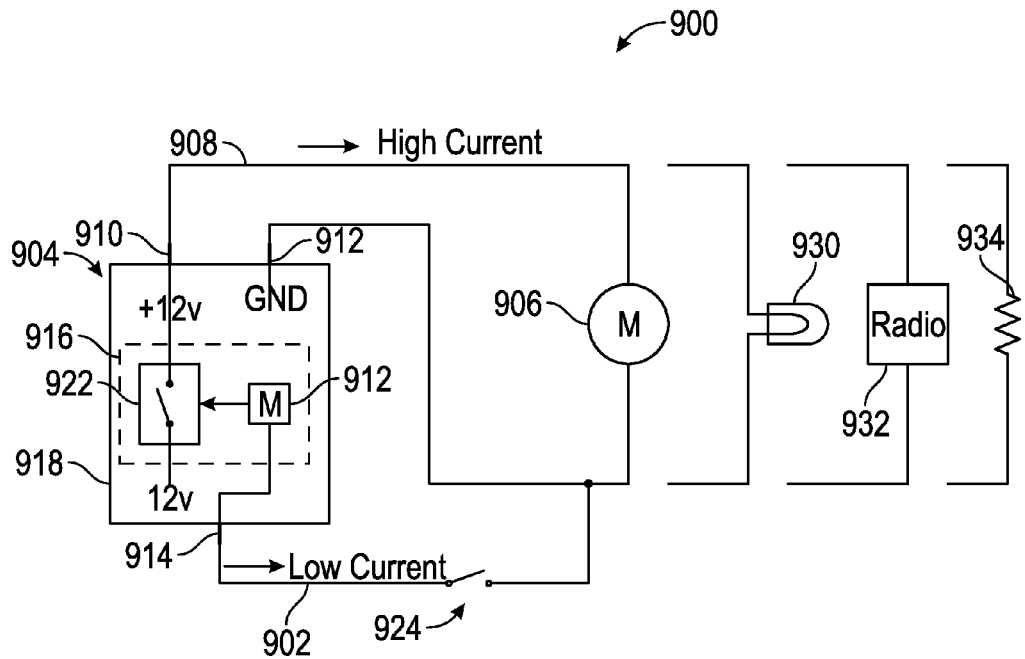
FIG. 35 is a schematic diagram of a starter system for an engine, according to an exemplary embodiment of the invention.

Referring now to FIG. 35, in another exemplary embodiment, the low current enable circuit 902 may be utilized to turn on and off any continuous duty electrical load connected to the battery 904 in parallel with the starter motor 906. Such a continuous load may be, for example, a lamp 930 (e.g., console lighting, headlamps, etc.), a radio 932, a heater 934, etc.

Figure 36:
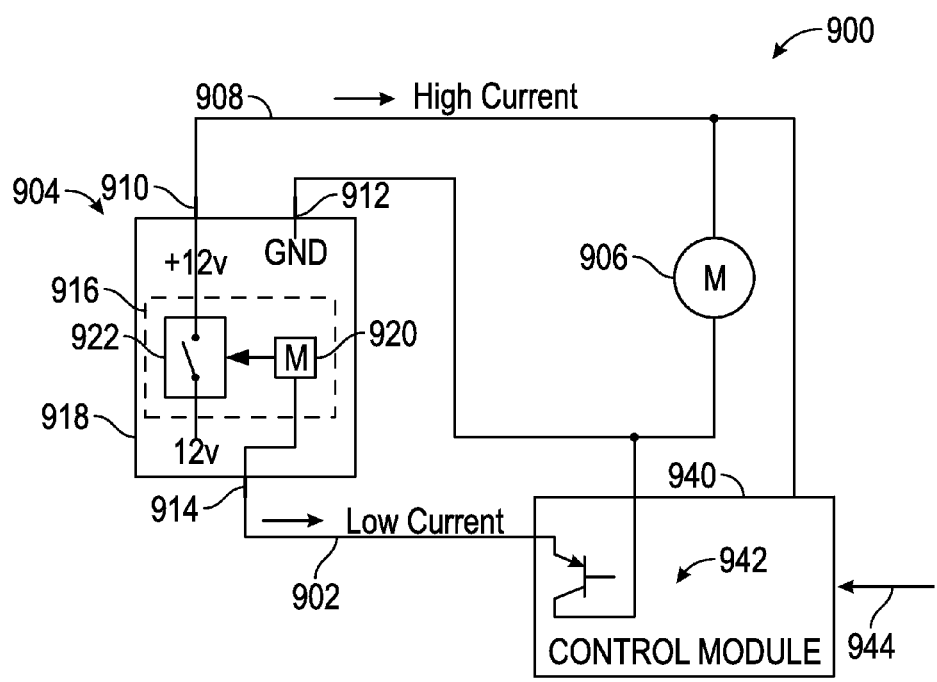
FIG. 36 is a schematic diagram of a starter system for an engine, according to an exemplary embodiment of the invention.

Referring now to FIG. 36, in another exemplary embodiment, the starter system 900 may include an external battery control module 940 (e.g., a module including an electrical control circuit). The module 940 may be positioned in various locations on or around the engine. For example, the module may be a distinct component (e.g., electronic control 520 shown in FIG. 43), the module may be component of an engine controller or control circuitry, the module may be mounted on the engine, or the module may be mounted to the battery receiver (e.g., battery receiver 802). The control module 940 includes a switch 942 provided along the low current enable circuit 902. The switch 942 may be provided instead of or in addition to the switch 924 actuated by the user. According to an exemplary embodiment, the switch 942 may be a low current electronic switching device (e.g., MOSFET, transistor, hall effect sensor, reed switch, etc.). The switch 942 may be controlled automatically with a control input. For example, the control module 940 may receive an engine RPM input 944 and open the switch 942 when the engine RPM input 944 indicates that the engine has reached a predetermined RPM threshold, thereby breaking the low current enable circuit 902 and disabling the battery 904 to stop the starter motor 906.

Figure 37:
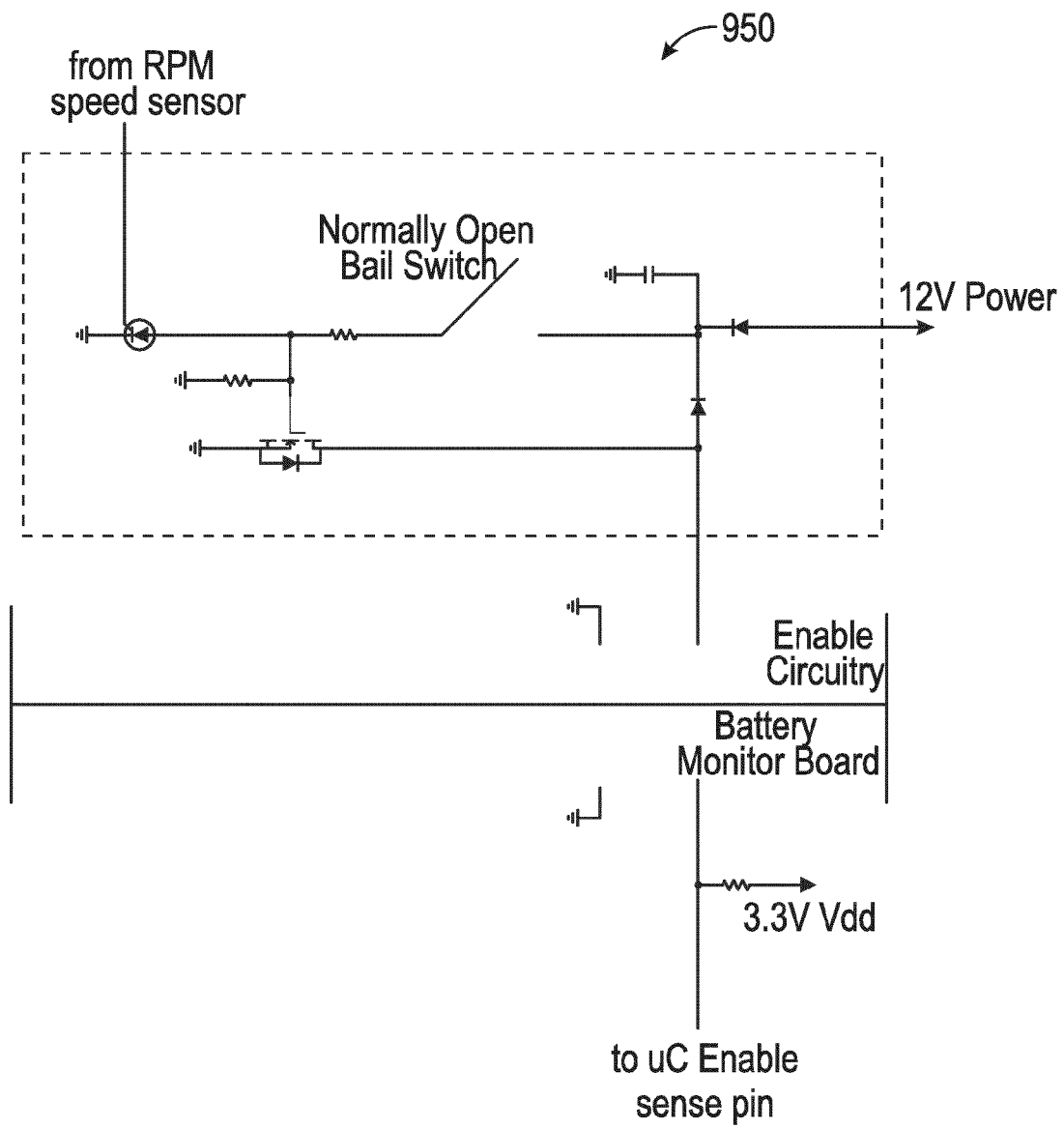
FIG. 37 is a circuit diagram of a control system for a battery, according to an exemplary embodiment of the invention.

Referring now to FIG. 37 an electrical control circuit 950 for a battery control module 940 is shown according to an exemplary embodiment. In some embodiments, the circuit 950 contains essentially all analog parts. In some embodiments, the circuit 950 is implemented as "non-programmable circuitry" that consists of analog or digital hard circuitry that does not utilize a microcontroller or software. It is believed that embodiments in which the controls are implemented as non-programmable circuitry including discrete components may be less expensive than embodiments implemented with microcontrollers or using software. Such non-programmable circuitry embodiments do not include a microcontroller. In other embodiments, the circuit 950 is implemented in a microcontroller or using software. In some embodiments, the circuit 950 is configured to detect when a bail closes (or opens) a switch (e.g., the switch 924).

Figure 38:
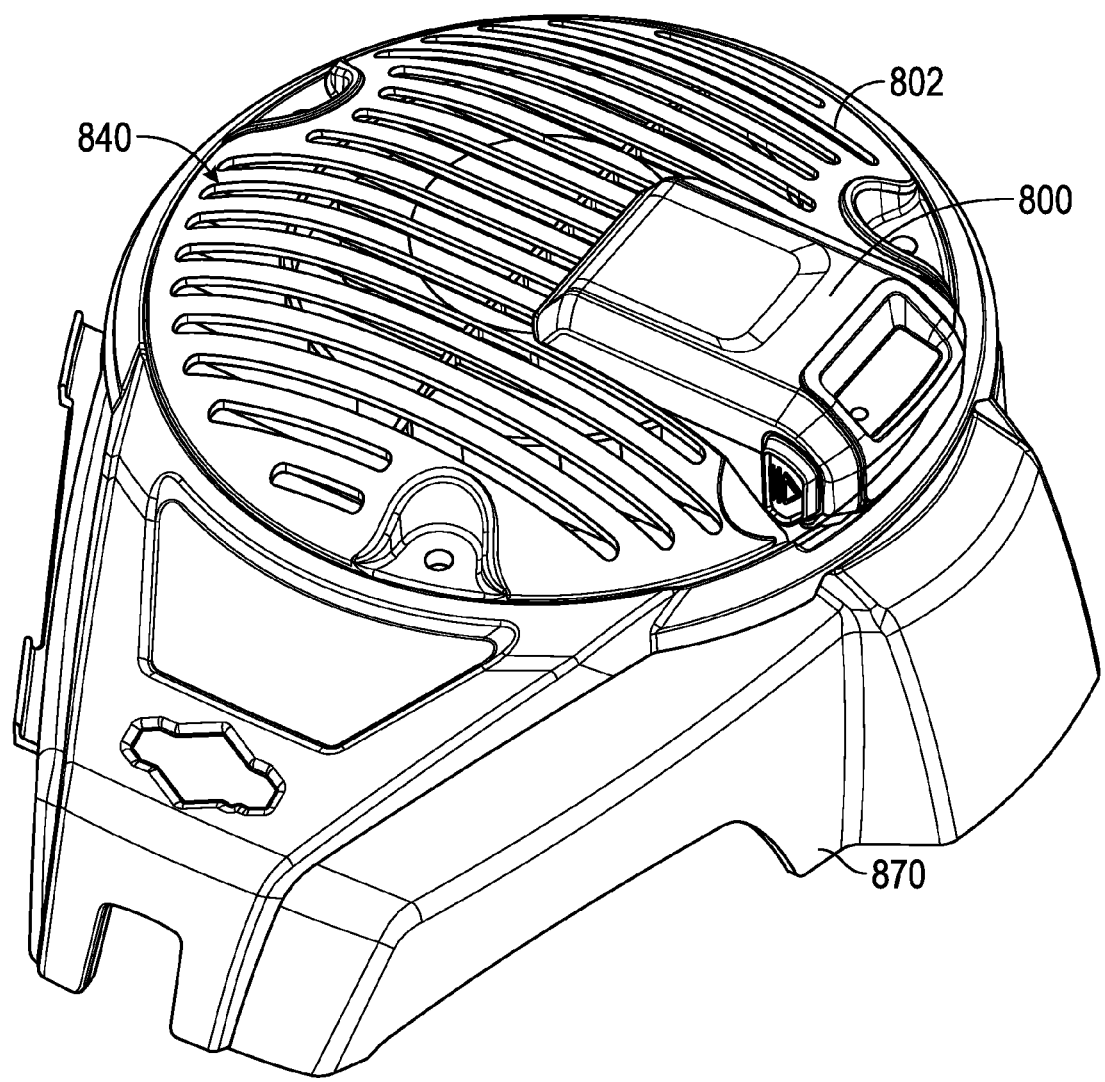
FIG. 38 is perspective view from above of a blower housing according to an exemplary embodiment.
Figure 39:
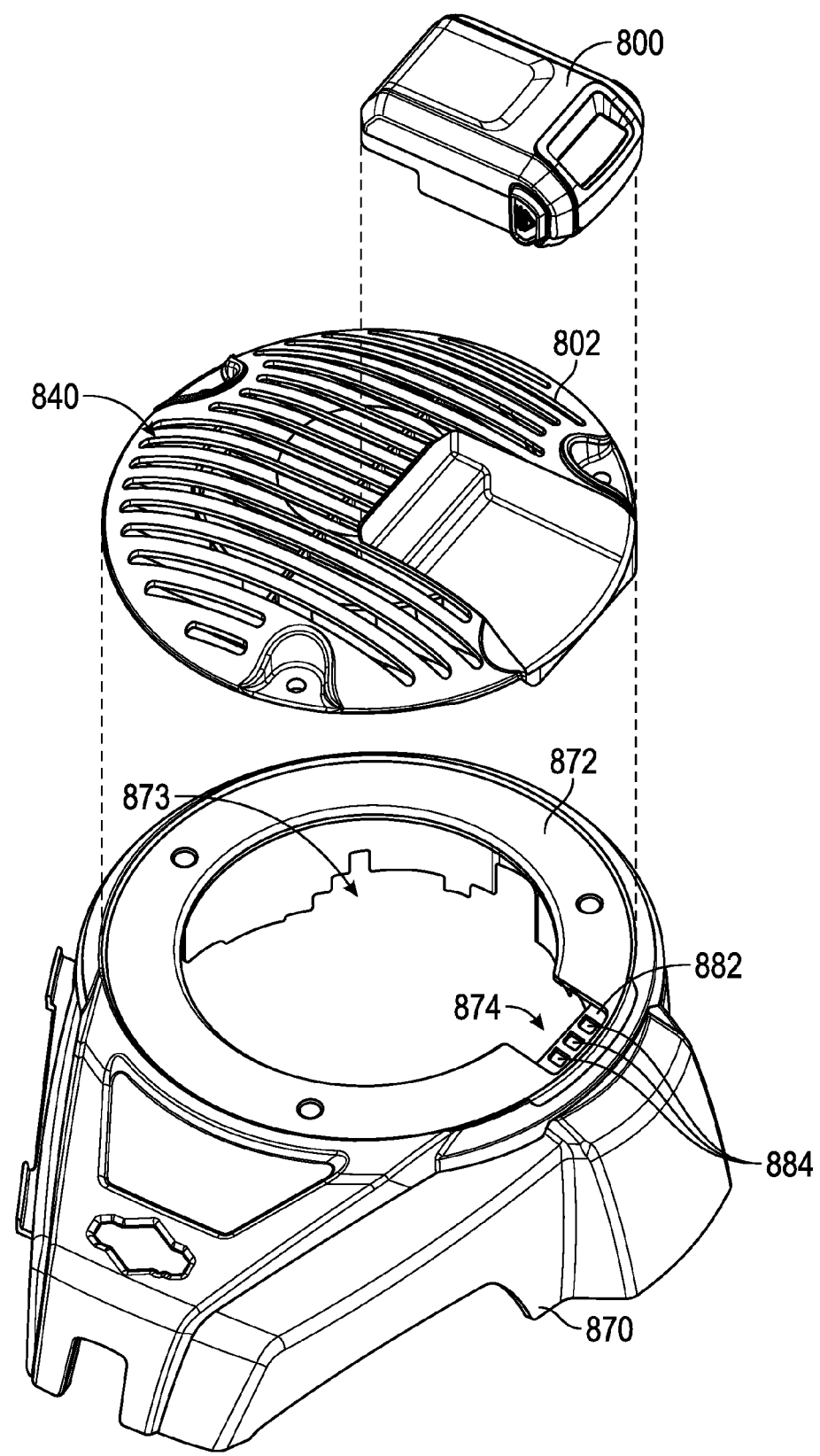
FIG. 39 is a perspective view from below of the blower housing of FIG. 22.
Figure 40:
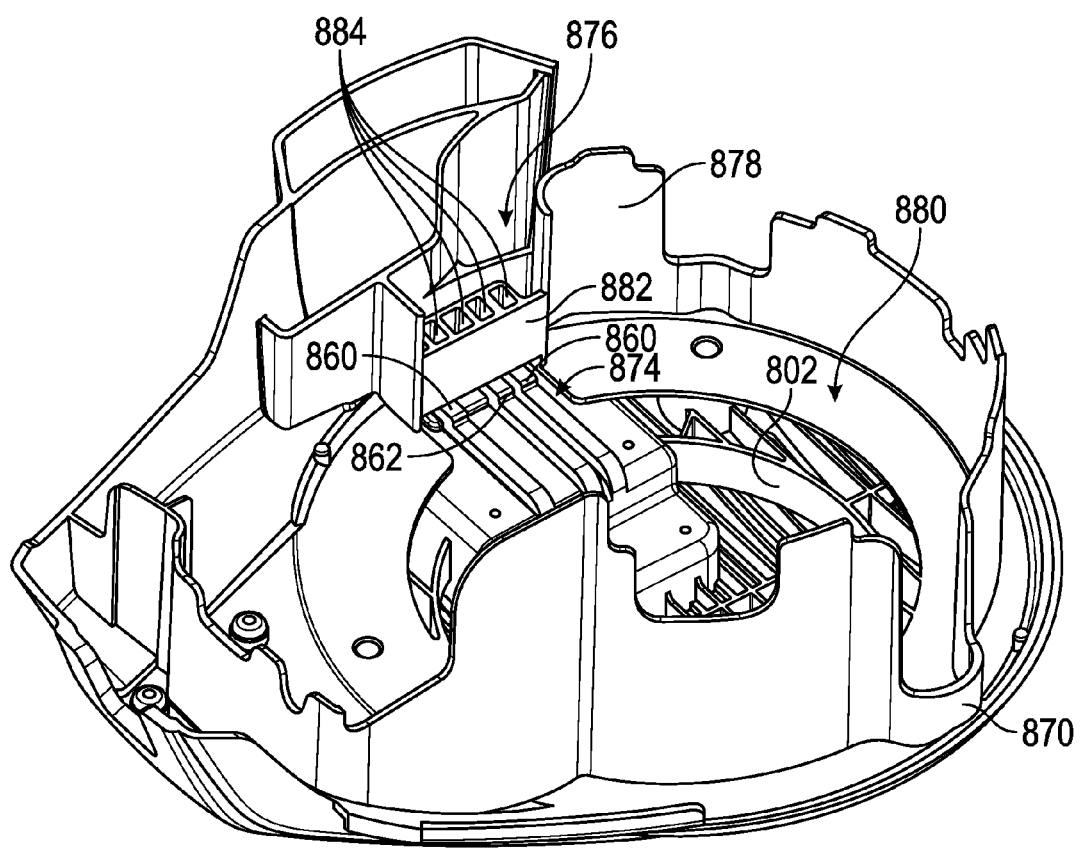
FIG. 40 is another perspective view from below of the blower housing of FIG. 22.

Referring to FIGS. 38-40, a blower housing 870 (e.g., engine housing) is shown according to an exemplary embodiment. As shown in FIG. 39, the blower housing 870 includes a mating surface 872 to which the battery receiver 802 is coupled. The mating surface 872 surrounds an air inlet opening 873. The air inlet opening 873 allows air to enter the blower housing 870. Air is drawn through the openings 840 in the battery receiver 802 into the blower housing 870. The battery receiver 802 can be coupled to mating surface 872 in various appropriate ways including with mechanical fasteners (e.g., bolt, screw, etc.), with snap-fit fasteners, gluing, epoxying, welding, etc. The mating surface 872 includes an opening 874 that allows an electrical connecting component (e.g., the terminals 860 and 862 of the receiver 802, a plug on a wiring harness extending from the terminals 860 and 862, etc.) to extend through the mating surface 872 so that the battery receiver 802 can be electrically coupled to another component of the engine or outdoor power equipment powered by the engine (e.g., an engine controller, control circuitry, etc.). As shown in FIG. 40, the opening 874 leads to channel 876 for routing wires or a wiring harness. A sidewall 878 extending from the mating surface 872 separates the channel 876 from an interior chamber 880 defined by the blower housing 870. A fan and/or other moving engine parts (e.g., crankshaft, flywheel) may be positioned in or near the interior chamber 880. The sidewall 878 protects the wires or wiring harness in the channel 876 from the moving engine parts. Without the sidewall 878 and the channel 876, the wires or wiring harness could become entangled with and damaged by the moving engine parts.

In some embodiments, as shown in FIGS. 38-40, a socket 882 is positioned in the opening 874. The socket 882 couples to the electrical connecting component (e.g., the terminals 860 and 862 of the receiver 802, a plug on a wiring harness extending from the terminals 860 and 862, etc.) of the battery receiver. For example, the terminals 860 and 862 are received by corresponding openings 884 in the socket 882. The socket 882 is also coupled to an electrical connecting component of the other component of the engine or outdoor power equipment to which the battery receiver is electrically coupled. For example, a wiring harness may include a plug that is coupled to the socket 882. The wiring harness may be used to electrically couple the battery receiver to the other component of the engine or outdoor power equipment. As another example, the socket 882 may be the plug of a wiring harness. The socket 882 is the electrical connection point between the battery receiver and the other component of the engine or outdoor power equipment to which the battery receiver is electrically coupled (e.g., module 940 described below). Assembly of the engine is simplified by including the socket 882 in the blower housing 870.

In some embodiments, the battery receiver 802 is mounted to the engine (e.g., on the blower housing 870) so that the effects of the vibrations of the engine on the engagement of the battery 800 to the battery receiver 802, including the engagement of the battery terminals 830 and 832 to the receiver terminals 860 and 862, are minimized. For example, the installation direction in which the battery 800 is slid into or otherwise engages the battery receiver 802 is not the same direction as the engine vibrations. Assuming that the engine vibrations can be considered to oscillate along one or vibration axes (i.e., a major axis, one or more minor axes, a combined axis that sums the effect of all the engine vibrations), the battery receiver 802 should be arranged so that the installation direction of the battery 800 is different than the vibration axis (e.g., the installation direction is perpendicular to the major axis, the installation direction is perpendicular to the combined axis, the installation direction is at an angle to one or more of the vibration axes). The location at which the battery receiver 802 is mounted to the engine may also be chose to minimize the effects of the engine vibrations. For example, the battery receiver 802 may be mounted so that the battery terminals 830 and 832 and the receiver terminals 860 and 862 may, to the extent possible, be aligned with drive shaft of the engine or other source of engine vibrations. As another example, the battery receiver 802 may be mounted remote from the drive shaft of the engine or other source of engine vibrations. The battery receiver 802 may be mounted via a damper (shock-absorber, dash-pot, etc.) or other component that minimizes or absorbs the engine vibrations. Similarly, the battery receiver 802 may be mounted to the engine or elsewhere on the outdoor power equipment to minimize the effect of the vibrations of the outdoor power equipment as a whole (e.g., the vibrations caused by the operation of the outdoor power equipment, not just those caused by the engine).

The various combinations of batteries 800 (e.g., batteries of different capacities) and battery receivers 802 (e.g., receivers that can receive one or more sizes of battery) helps original equipment manufacturers ("OEMs") more easily incorporate an electric start system into their products. For example, the battery 800 and the battery receiver 802 may replace a typical recoil starter and use the same amount of space and similar connections as a typical recoil starter. Also, by providing a battery 800 and receiver 802 with additional terminals for future use, OEMs have flexibility in how to use and incorporate the battery 800 and receiver 802 into their products. Providing standardized batteries 800 and battery receivers 802 allows OEMs to more quickly install these components when manufacturing their products and increases their familiarity with how to incorporate these components into their products.

Typically the outdoor power equipment includes a brake mechanism that selectively prevents or stops rotation of the tool. The brake may stop a flywheel of the engine, correspondingly stopping the crankshaft and rotating tool coupled to the power takeoff of the crankshaft.

Starting the braked outdoor power equipment may be cumbersome, requiring release of the brake followed by activation of the engine. For lawn mowers and other types of outdoor power equipment, release of the brake may include rotating a bail to draw an inner-wire of a Bowden cable that lifts the brake mechanism. Then, activation of the engine typically further includes manually pulling a recoil starter rope or activating an electric starter for the engine. A need exists for a less-cumbersome and faster process to start the outdoor power equipment.

Furthermore, the outdoor power equipment may include the engine mounted to a frame or a base plate. If an electric starter is included, the starter motor is typically connected to an interface on the handle of the outdoor power equipment so that the operator may activate the starter motor while standing in an operational position, such as behind the handle. During assembly of the outdoor power, a power source, control circuitry, and wiring associated with the starter motor are coupled to the handle, the frame, and the engine, the attachment of which may be a time-consuming and labor-intensive process. A need exists for an engine having a starter motor that facilitates efficient assembly of the outdoor power equipment.

Figure 41:
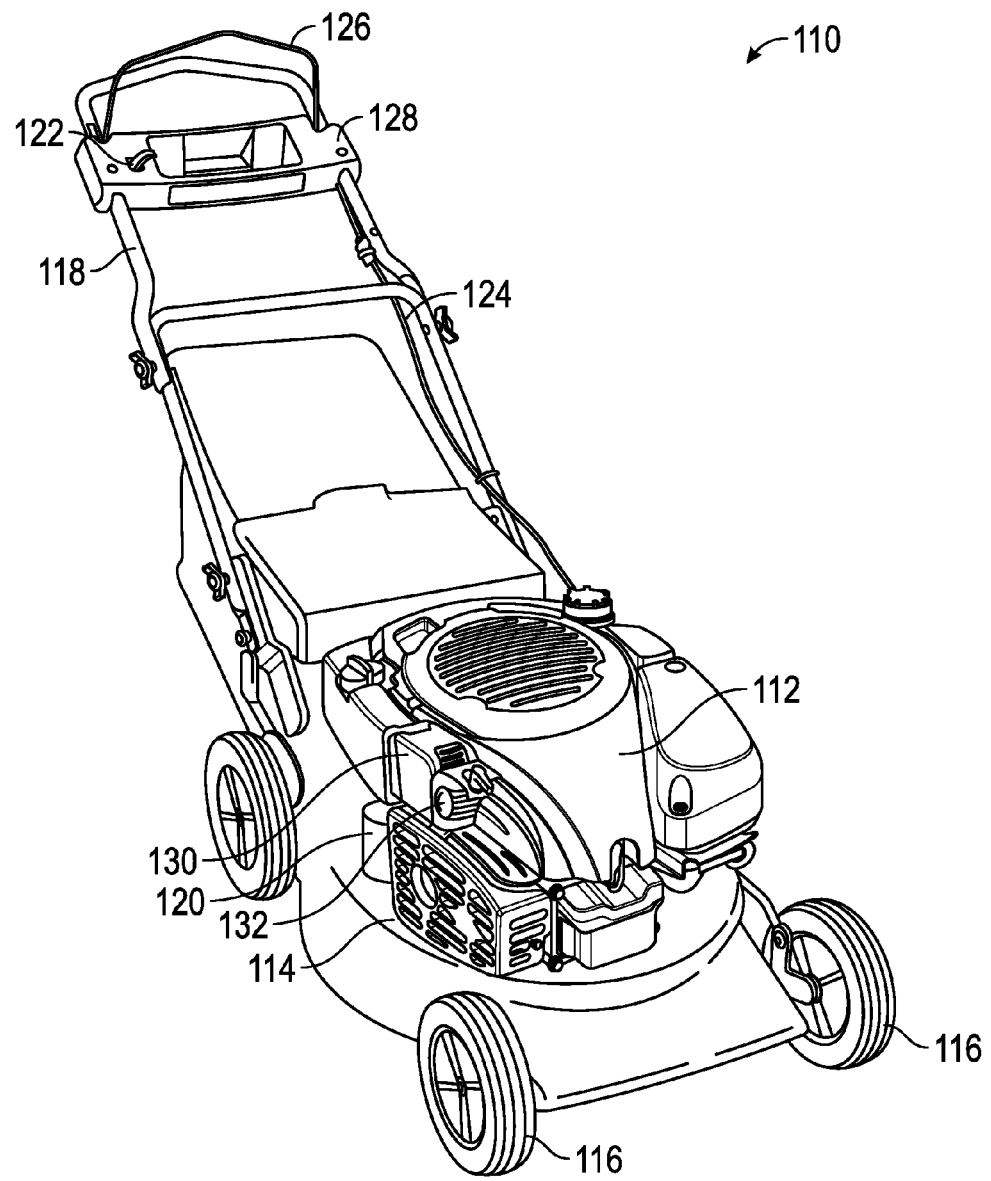
FIG. 41 is a perspective view of a lawn mower, according to an exemplary embodiment.

Referring to FIG. 41, outdoor power equipment, in the form of a lawn mower 110, includes an internal combustion engine 112 coupled to a rotary tool, such as the blade in a deck 114 of the lawn mower 110, an auger, a saw, tines, a drill, a pump, or other rotary tools. In some embodiments, the lawn mower 110 further includes wheels 116 and a rearward extending handle 118 designed to be pushed by an operator walking behind the lawn mower 110. In other contemplated embodiments, the outdoor power equipment may be in the form of a rotary tiller, a pressure washer, a snow thrower, a lawn tractor or riding mower, an edger, a portable generator, or other equipment, with a corresponding powered tool, such as tines, a pump, an auger and impeller, an alternator, a drive train, or other tools.

Still referring to FIG. 41, the lawn mower 110 includes a starter system. According to an exemplary embodiment, the starter system includes an electric motor 120 that is selectively coupled to the engine 112 such that the electric motor 120 is configured to rotate the crankshaft of the engine 112 to start the engine 112, and is then configured to disengage once the engine 112 is running. In some embodiments, the motor 120 is fastened to the engine 112, such as being mounted on top of or to a side of the engine 112. Gearing (e.g., gear reduction, transmission) may extend between the motor 120 and the crankshaft of the engine 112, or the motor 120 may be connected directly to the crankshaft of the engine 112.

According to an exemplary embodiment, an operator may engage the starter system via the handle 118 of the lawn mower 110. In some embodiments, the handle 118 includes a lever 122, button, toggle, or other interface that the operator may use to command the starter system to start the engine 112. In some embodiments, the command is relayed from the handle 118 via a linkage 124, such as an electric wire transmitting an electrical signal, a Bowden cable communicating a mechanical signal, or another type of linkage. In contemplated embodiments, a transmitter and start button are coupled to the handle (e.g., clipped on, integrally mounted with), and the starter system includes an integrated receiver configured to receive commands wirelessly provided by the transmitter to start the engine. According to an exemplary embodiment, the command from the operator is received directly or indirectly by the motor 120, and the motor 120 rotates the crankshaft to start the engine 112.

In some embodiments, the starter system is integrated with a bail 126 of the lawn mower 110. A brake mechanism (e.g., friction brake, ignition interrupt switch or circuit, etc.) may be holding the blade or other tool, locking the crankshaft of the engine 112, or otherwise preventing operation of the power equipment. When the operator actuates the bail 126 to release the brake mechanism from rotating members (e.g., blade, crankshaft, power takeoff, flywheel, blower fan, etc.) of the lawn mower 110, the action simultaneously actuates the motor 120 to start the engine 112. As such, releasing of the brake mechanism synergistically also starts the engine 112, easing operation of the lawn mower 110 or other outdoor power equipment by reducing the steps necessary for activation.

In some embodiments, the lawn mower 110 includes an interlock 128 (e.g., lock-out device, signal interrupt) to prevent release of the brake and engagement of the motor 120. According to an exemplary embodiment, the operator must release the interlock 128 before the bail 126 can be operated to engage the motor 120 to start the engine 112. Different types of mechanical and electrical interlocks may be used in varying contemplated embodiments to prevent inadvertent release of the brake and starting of the engine, such as when a user moves the power equipment into or out of a garage or storage shed by grabbing the handle, or if the bail is unintentionally bumped. Furthermore, engagement of the interlock 128, in some embodiments, is also configured to prevent inadvertent release of the brake when the handle 118 is being folded over the deck 114 to put the lawn mower 110 in a storage configuration.

In general, integration of the starter system with a handle of outdoor power equipment allows the operator to start the engine from the rear of the outdoor power equipment, such as several feet from the powered tool of the outdoor power equipment (e.g., snow thrower auger, lawn mower blades). Further, the integration supports an electric starting system for a walk behind mower that can be engaged by a user without actuation of a key or push-button. In other embodiments, the starter system may include a start button or other interface to engage the starter system that is located on the engine or elsewhere. For example, in contemplated embodiments, such an interface may include a smart phone application or remote control that wirelessly provides a start command or authorization code to a receiver coupled to the outdoor power equipment.

According to an exemplary embodiment, the starter system further includes an energy storage device 130 (e.g., electrical storage device) and a controller 132. The energy storage device 130 may include one or more batteries, capacitors, or other devices. When the operator engages the starter system, the linkage 124 communicates the command to start the engine directly or indirectly to the controller 132, which electrically connects the energy storage device 130 to power the motor 120. In some embodiments, the controller 132 is coupled to a governor of the engine 112 (see, e.g., speed sensor 420 as shown in FIG. 42), and disengages the motor 120 (e.g., cuts power to the motor 120, high-side switching of the battery power source, low-side switching of the ground side of the circuit) when the engine 112 is running at a sufficient speed.

In some embodiments, the motor 120, the energy storage device 130, and the controller 132 are fastened directly to the engine 112, which may be configured for efficient assembly of outdoor power equipment using the engine 112. As such, the starter system in some embodiments may come fully assembled with the engine 112 and ready for connection to a linkage configured to provide a signal from the handle (e.g., linkage 124). In some embodiments, an interface (e.g., start button, toggle, switch, etc.) for starting the engine is positioned on the engine itself, and no additional connections are necessary—the manufacturer need only attach the engine to the deck or corresponding feature and attach the tool to the power takeoff of the engine. In any such case, considerable time and effort may be saved during the manufacturing process and a potential source of manufacturing difficulty may be removed (i.e., that associated with the fastening and electrical connection of the components of the starter system during assembly of the outdoor power equipment). In still other embodiments, some or all of the starter assembly may be fastened to the deck of a lawn mower or corresponding feature of other power equipment.

Figure 42:
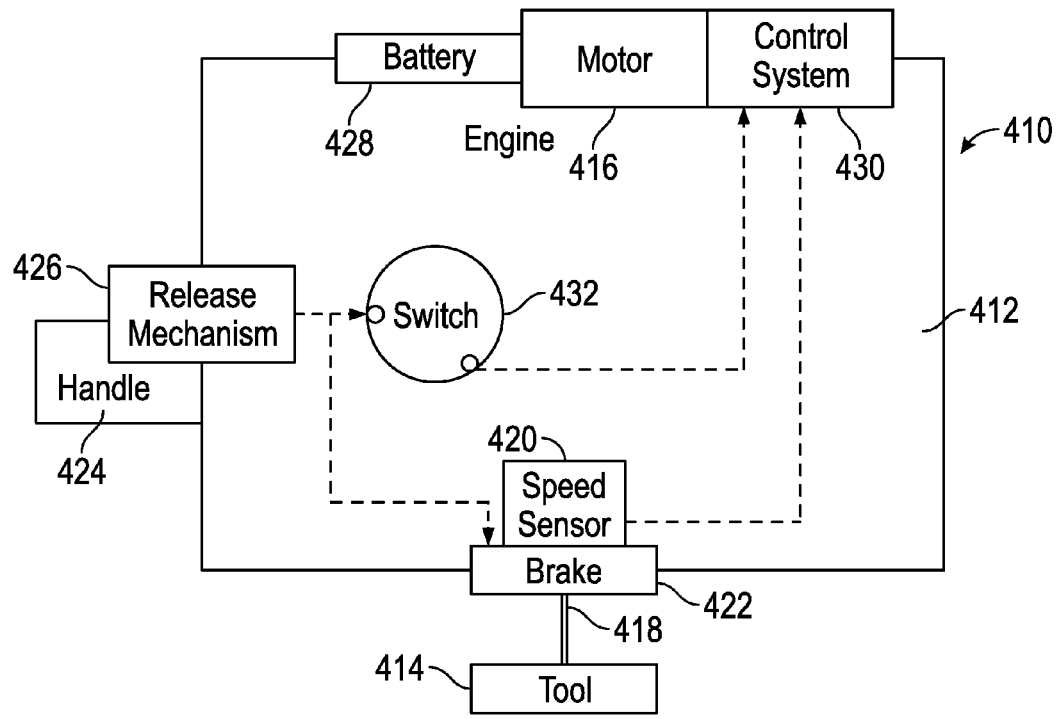
FIG. 42 is a schematic diagram of a starter system for an engine, according to an exemplary embodiment.

Referring to FIG. 42, outdoor power equipment 410 (shown schematically) includes an engine 412 and a powered tool 414 (e.g., rotary blade) driven by the engine 412. In some embodiments, a motor 416 is coupled to the engine 412, and the powered tool 414 is coupled to a power takeoff 418 of the engine 412. A speed sensor 420 (e.g., governor) may be coupled to the engine 412 to regulate the speed of the engine 412. Also, a brake 422 may be coupled to a rotary member of the outdoor power equipment 410, such as the flywheel of the engine, the power takeoff 418 of the engine, etc., to stop the engine as well as the associated powered tool.

In some embodiments, the outdoor power equipment 410 includes a handle 424 having a release mechanism 426, where the release mechanism 426 is configured to allow a user to release the brake 422 from the handle 424. The release mechanism 426 may allow a user to release the brake 422 by engaging the bail (or other element) with a linkage connected to the brake 422, or by disengaging an element blocking movement of the bail. The handle 424 may be coupled to the engine 412 and tool 414 directly, or via an intermediary member (e.g., deck 114 as shown in FIG. 41). The engine 412 may further include a battery 428 (e.g., a lithium-ion battery) for powering the motor 416 and a control system 430 for operating the motor 416.

According to an exemplary embodiment, the control system 430 is configured to receive inputs associated with the release mechanism 426. In some embodiments, when the release mechanism 426 is actuated to release the brake 422, the release mechanism 426 triggers a switch 432, which provides to the control system 430 a signal that is indicative of the release of the brake 422. The signal may be provided via a mechanical linkage, wirelessly, a hardwired electrical connection, or otherwise. In some embodiments, the control system 430 then actuates the motor 416 to start the engine 412 or uses the information in control logic configured to start the engine as a function of the status of the brake and other factors. As such, operation of the release mechanism 426 may simultaneously provide a start signal to the control system 430 as well as release the brake 422. No additional operations to start the engine 412 may be required.

According to an exemplary embodiment, the control system 430 is configured to receive additional inputs from the speed sensor 420 or another component of the engine 412 (e.g., ignition circuit). The speed sensor 420 or other component provides the control system 430 with information associated with the speed of the engine 412. When the engine 412 is running at a sufficient speed, the control system 430 then disengages the motor 416 (e.g., turns off, disconnects, cuts power to, etc.).

In contemplated embodiments, the control system 430 associated with the start system may receive additional or different inputs used to control starting of the engine, such input from a sensor configured to indicate whether the outdoor power equipment has moved recently. Movement of an axle or wheels of such outdoor power equipment may trigger a sensor that provides a signal to the control system. The signal, in combination with an electric timer providing time-related context for the movement, may serve as an additional indicator that the operator intends to activate the engine. In contemplated embodiments, the control system 430 includes a timer and is configured to deactivate the motor if the engine has not started within a predetermined amount of time. In some contemplated embodiments, the control system 430 includes a temperature sensor and is configured to prime the engine with an automated primer pump or adjust the choke or throttle plate if ambient temperature is above or below a predetermined temperature, if a portion of the engine is above or below a predetermined temperature, or if the difference between ambient and engine temperature is above or below a predetermined amount. In contemplated embodiments, the control system 430 may also provide a signal output to the operator, such as a visible indicator on a display coupled to the handle or engine, or an audible alert. In some such embodiments, the signal output may include as an error message, a low-fuel message, a replace-oil message, or another such message.

Figure 43:
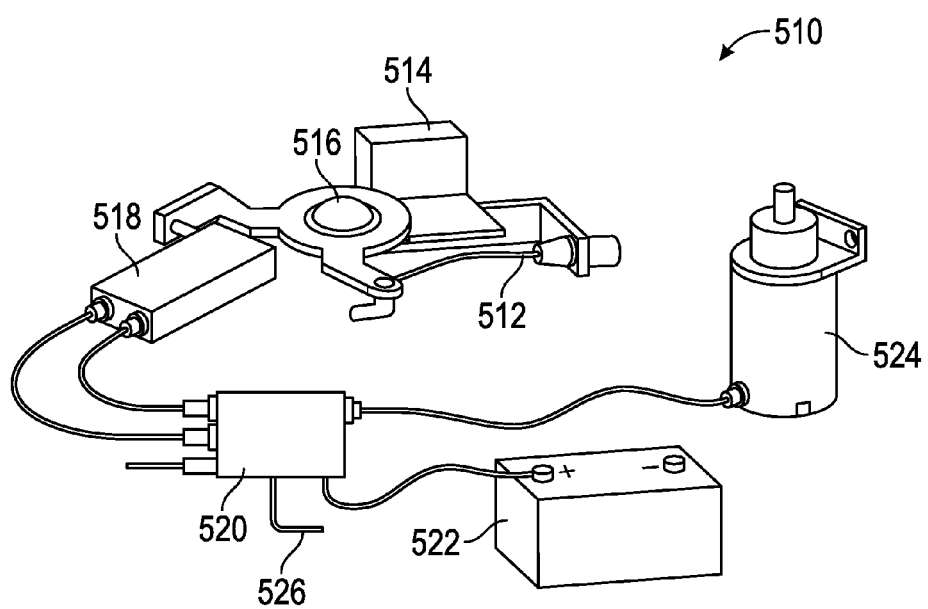
FIG. 43 is a perspective view of components of a starter system for outdoor power equipment according to an exemplary embodiment.

Referring to FIG. 43, components of a system 510 include a brake cable 512 (e.g., Bowden cable) and a brake pad 514 for an associated engine of outdoor power equipment. According to an exemplary embodiment, the brake cable 512 is configured to be coupled to the bail of a handle of outdoor power equipment (see, e.g., bails 126, 212, and 312 as shown in FIG. 1). When an operator activates the bail, the brake cable 512 moves a pivot 516 coupled to the brake pad 514. The brake pad 514 then releases, allowing the engine associated with the system 510 to drive a powered tool of the outdoor power equipment.

According to an exemplary embodiment, the engine associated with the system 510 further includes a starter system including a switch 518, an electronic control 520, a battery 522 (e.g., a lithium-ion battery), and an electric starter motor 524. When the operator activates the bail to lift the brake pad 514, the pivot 516 simultaneously activates the switch 518. The switch 518 then provides a signal to the electronic control 520 that the brake pad 514 has been lifted and that the electronic control 520 may start the engine associated with the system 510 with the electric starter motor 524. The electronic control 520 then connects the electric starter motor 524 to the battery 522. The switch 518 may be a switch already associated with the brake, but used to provide signals to both an actuator of the brake and the starter system (e.g., ignition ground), or the switch 518 may be an additional switch solely used for the starter system.

Still referring to FIG. 43, the electronic control 520 includes hard-wired circuitry and is configured to receive additional inputs from the engine associated with the system 510. In some embodiments, the additional inputs include an indication of the speed of the engine associated with the system 510 from a governor or other component of the engine (e.g., electrical pulses from the ignition system). The additional inputs may include a current state of the engine associated with the system 510, such as whether the engine associated with the system 510 is running, etc. The starter system is also coupled to a ground 526.

Referring to FIGS. 44-47, an engine 610 includes an exhaust 612, a fuel tank 614, an engine cover 616, an air intake 618 for combustion processes, an air intake 620 for cooling the engine, and a starter system having an energy storage device, such as a battery 622 (e.g., a lithium-ion battery), a capacitor, multiple batteries or capacitors, or another energy storage device. Applicants note that the engine 610 of FIGS. 44-47 mirrors the engine 112 of FIG. 41, and both are single-cylinder, four-stroke cycle, vertically-shafted, small engines. Other engine types and designs may be used, such as engines that are horizontally-shafted, two- or more cylindered, diesel powered, cold-weather structured, etc.

Figure 44:
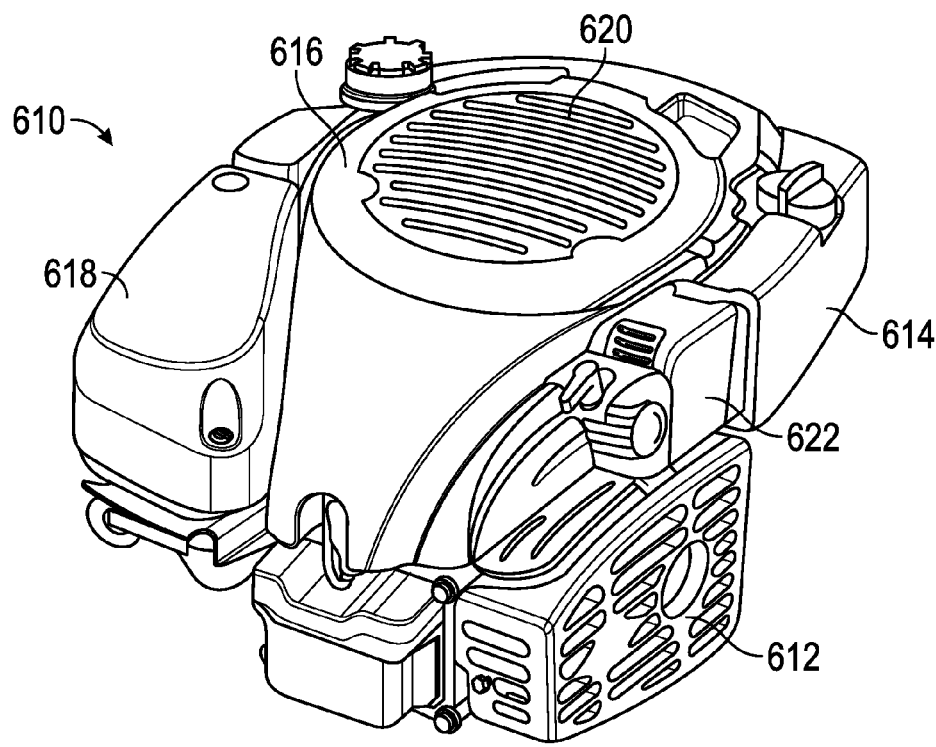
FIG. 44 is a perspective view of an engine assembly, according to an exemplary embodiment.
Figure 46:
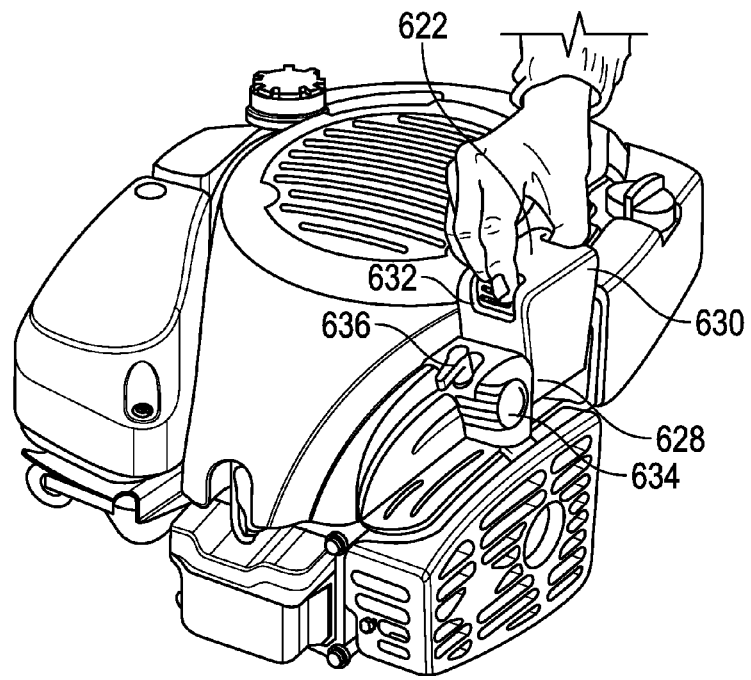
FIG. 46 is a perspective view of a battery being coupled to an engine, according to an exemplary embodiment.
Figure 47:
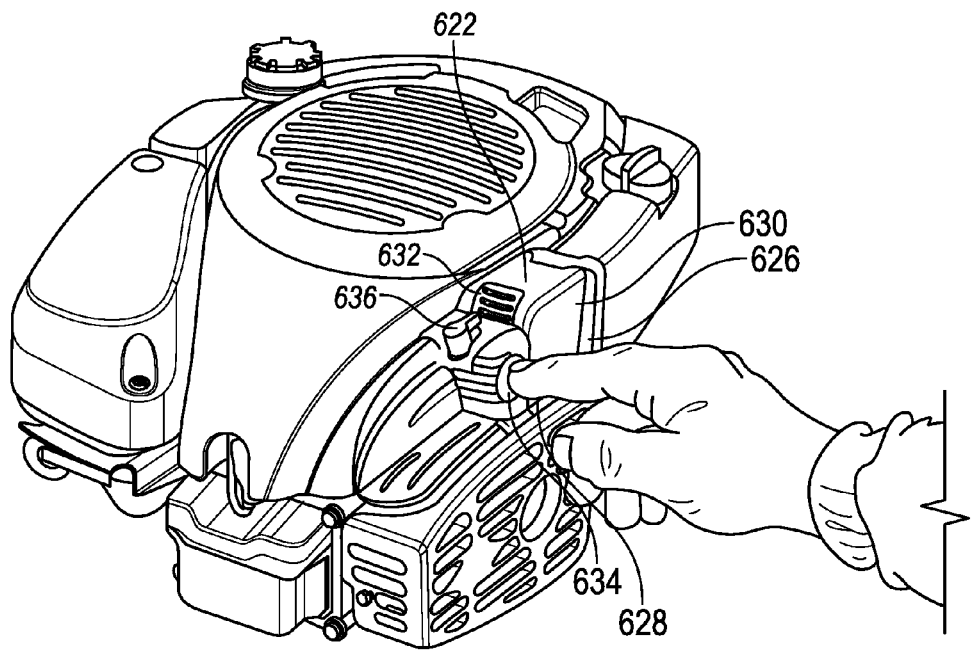
FIG. 47 is a perspective view of a starter system for the engine assembly of FIG. 44, according to an exemplary embodiment.
Figure 48:
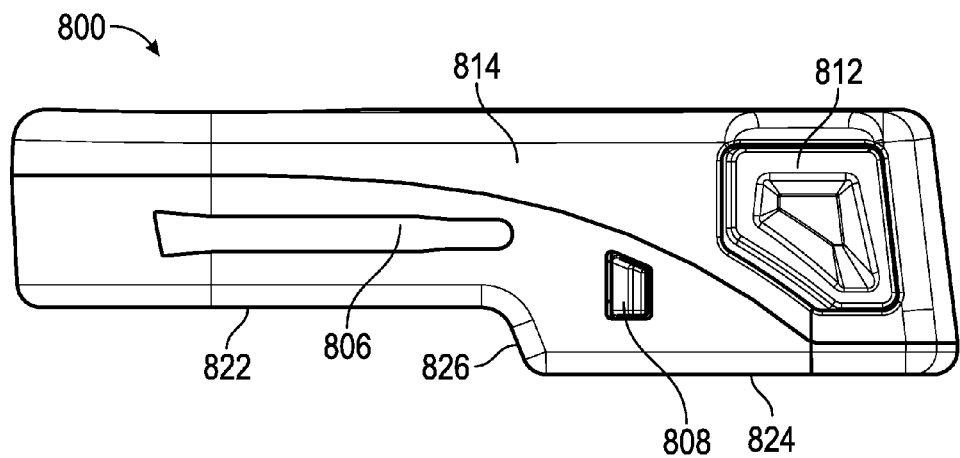
FIG. 48 is a front view of a battery for a starter system, according to an exemplary embodiment.
Figure 49:
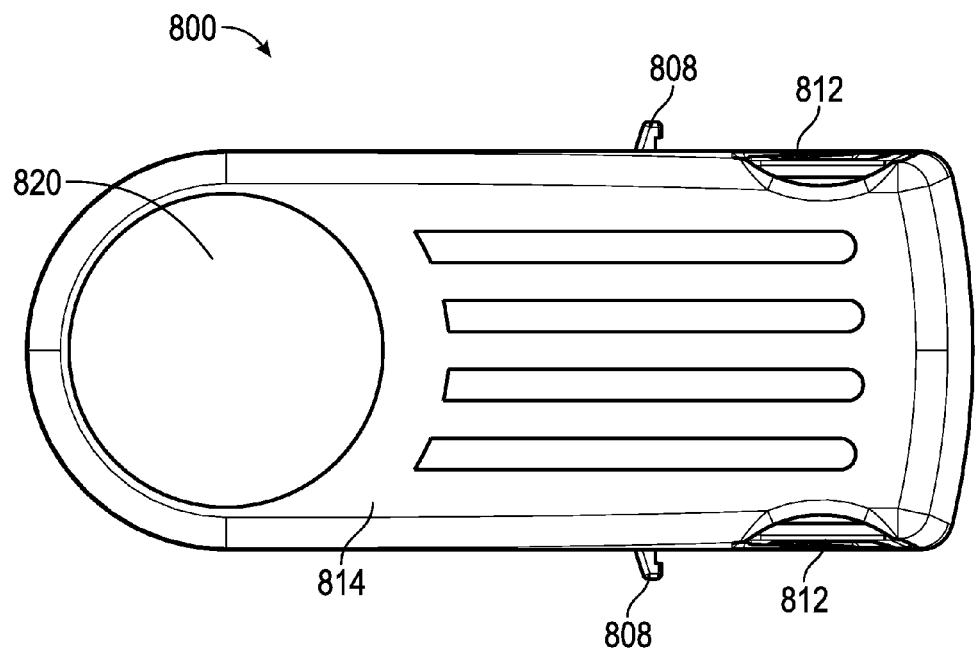
FIG. 49 is a top view of the battery of FIG. 48.

Although shown as proximate to the fuel tank 614 and exhaust 612 in FIGS. 44 and 46-47, the energy storage device (e.g., the battery 622) may be positioned elsewhere on the exterior and/or in an internal port of the engine 610. In some embodiments, where the battery 622 is sensitive to high temperature, it may be preferred to position the battery 622 away from the exhaust 612, which may become hot during operation of the engine 610. According to an exemplary embodiment, the battery 622 may be positioned in the path of the air intake 618 such that it does not excessively obstruct the flow of air through the air intake 618 into the engine. The air drawn in through the air intake 618 may therefore be utilized to aid in cooling of the battery 622.

According to an exemplary embodiment, the energy storage device is configured to power a starter motor (see, e.g., motor 120 as shown in FIG. 41) integrated with the engine 610. In some embodiments, the energy storage device may be further configured to power other systems of the engine 610, such as an engine control unit (ECU) having control circuitry coupled to sensors or detectors integrated with the engine (e.g., brake release, fuel-level detector, ignition-fouling detector, governor, etc.).

Figure 45:
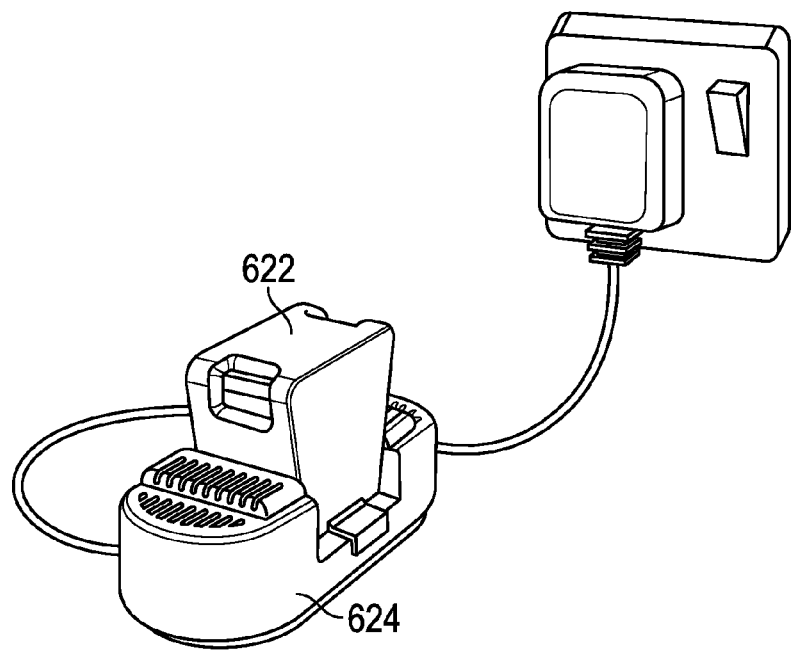
FIG. 45 is a perspective view of a battery charging station, according to an exemplary embodiment.

According to an exemplary embodiment, the energy storage device is the battery 622, which is rechargeable. As shown in FIG. 45, the battery 622 may be charged at a charging station 624 or may include a charging port integrated with the battery (e.g., battery pack with charging port to receive a connection from a wire coupled to an outlet or the charging station). The battery 622, in other embodiments, may alternatively plug directly into a wall outlet, or the charging station may be wall mounted or plug directly into a wall outlet.

In contemplated embodiments, the starter motor is configured to draw power from the engine 610, such as during periods of lesser loads on the engine. The starter motor is then driven by the engine 610 to provide an electric output. The electric output may then be routed by the ECU or otherwise to the charge the energy storage device. Such a system may be particularly useful for an engine driving an alternator of a portable generator, where the alternator may temporarily be powered by the energy storage device to start the engine and then, once the engine has started, the alternator may be used to recharge the energy storage device.

In contemplated embodiments, an appropriately sized energy storage device (e.g., the battery 622) may be configured to provide power to other electrical systems of the outdoor power equipment besides the starter system, such as lighting systems (e.g., headlights, dash lights, indicator lights, etc.), sound devices, or other on-board electronic systems. The energy storage device may then be used instead of a lead-acid battery or an alternator and regulator coupled to the engine.

In some embodiments, the energy storage device is or includes a bank of capacitors, where the capacitors are configured to charge and release electrical energy in a relatively short (e.g., less than 10 seconds), high-powered output. In some such embodiments, some of the capacitors of the bank are coupled with one another in groups (e.g., series or parallel), and the groups are configured to output sequentially in time with respect to one another. Accordingly, the capacitors are specifically configured to be able to power the motor to start the engine 610 without much additional energy storage capacity so as to be relatively compact in size and inexpensive. Use of capacitors may also allow for faster charging when compared to batteries, such as faster charging on the charging station 624 (FIG. 45).

Referring to FIG. 46, the battery is configured to be inserted (e.g., dropped, lowered, placed) into a receiver, shown as a receiving port 626 integrated with the engine. Integrating the receiving port with the engine reduces the assembly burdens for manufacturing outdoor power equipment, as disclosed above. However in contemplated embodiments, the receiving port may not be integrated with the engine. For example, FIG. 45 shows a charging station 624 or charging port, which may be similar to such a port on a deck of the engine.

In some embodiments, the battery 622 has a cross section forming an isosceles trapezoid, triangle, diamond, or other wedge shape, or shape having a narrower lower portion 628 relative to an upper portion 630 in contact with the receiving port 626. The receiving port 626 is contoured (e.g., V-shaped, U-shaped, etc.) to receive the battery 622, which may be guided into position by interfacing with the contours of the receiving port 626 and gravity.

In some embodiments, the battery 622 includes slots or grips 632 for lifting and holding the battery 622. A locking mechanism, such as a hook or latch may snap into place when the battery 622 is inserted into the receiving port 626 and hold the battery 622 in the receiving port 626. Pinching the grips 632 together may release the locking mechanism to allow removal of the battery 622 from the receiving port 626.

According to an exemplary embodiment, the starter system further includes a switch 636 (e.g., toggle, lever, key) that is integrated with the battery 622, the receiving port 626, or elsewhere on the engine 610. As shown in FIGS. 46-47, the switch 636 may rotate from an off position (FIG. 46), where the battery 622 is not electrically connected to components of the engine 610 (e.g., starter motor, ECU), to an on position (FIG. 47), where the battery 622 is electrically connected to the components. In other embodiments, rotation of the switch 636 also or alternatively engages the locking mechanism to hold the battery 622 in the receiving port 626. In various contemplated embodiments, the switch 636 may be configured to interrupt electrical connectivity of the battery, the control circuit, or both.

According to an exemplary embodiment, the starter system includes an interface, such as a button 634 on the receiving port 626. The button 634 faces outward and is accessible when the battery 622 is seated in the receiving port 626. In some embodiments, the interface may be used to initiate charging of the battery or another function. In other embodiments, the interface allows the operator to start the engine via the starter system. For example, the starter system may be configured such that it starts the engine when the button is pushed or when the button is pushed and held for a predetermined length of time. In other embodiments, the starter system may be configured such that it starts the engine when the button is pushed in combination with another input. For example, the starter system may be configured to start the engine when the button is pushed while the bail is engaged or when the bail is engaged within a predetermined time period after the button is pushed. In this way, the button acts as a "start enable" button rather than a "start button." In some embodiments, the battery or the receiving port includes a disable button or switch that must be in the on position before the start button can be used to start the engine. The disable button can electrically, mechanically, or both electrically and mechanically, prevent the start button from being used to start the engine.

According to an exemplary embodiment, the battery 622 and the receiving port 626 are positioned proximate to the air intake 620 in a location similar to that of a manual recoil starter. Such a positioning allows a user familiar with a manual recoil starter to intuitively start the engine via the starter system by actuating the button 634 or other interface device. Eliminating the recoil starter reduces the engine operating temperature (e.g., the oil temperature) by improving air flow into the cooling system (e.g., the blower housing). For example, replacing the recoil starter with the battery 622 and the receiving port 626 can reduce the engine operating temperature by between 10 and 20 degrees Fahrenheit (5.6 degrees and 11.1 degrees Celsius) in expected operating conditions. Reducing the engine operating temperature can help to reduce oil deterioration, overheating, and other failure modes related to high temperatures.

According to other exemplary embodiments, the battery 622 and the receiving port 626 may be positioned elsewhere on the engine 610 or on the outdoor power equipment powered by the engine 610 so that the battery and the receiving port 626 are accessible to the user and do not interfere with the normal operation of the engine 610 or the outdoor power equipment. For example, the battery 622 and the receiving port may be positioned on the engine housing or the blower housing (e.g., on a faceplate or other portion of the housing). For example, if the engine 610 powers a lawn tractor or riding lawn mower, the battery 622 and the receiving port 626 may be positioned on the dash. If the engine 610 powers a snow thrower, the battery 622 and the receiving port 626 may be positioned on the control panel. A cover or guard may be provided over the battery 622 to shield the battery 622 from environmental hazards such as dust, grass clippings, branches, snow, rain, other moisture, etc. The cover may be permanent, hinged or pivotable relative to a base or mount, and/or physically removable from a mount.

Referring now to FIGS. 48-58, the battery is shown according to an exemplary embodiment as battery 800 coupled to a battery receiver 802. In the illustrated embodiments, the battery receiver 802 is configured as a cover or screen of an engine. In some embodiments, the screen is positioned in an air path of the engine (e.g., at the air intake 620) such that the air drawn into the engine is utilized to cool the battery 800 coupled to the receiver 802. In other embodiments, the battery receiver 802 takes other shapes or forms appropriate to the location on the engine or outdoor power equipment to which it is mounted. According to an exemplary embodiment, the battery 800 engages the receiver 802 with a sliding connection (e.g., a pin or blade connection), allowing the battery 800 to engage and disengage the receiver 802 or another device such as a charging station without the use of tools, as would be needed with screw terminals. Rails 804 on the receiver 802 are received in corresponding slots or grooves 806 provided in the battery 800. A locking mechanism, shown as a pair of latches 808 (e.g., hooks, arms, etc.) are biased in an outward direction and are configured to snap into place in apertures 810 when the battery 800 is inserted into the receiver 802 to hold the battery 800 in the receiving receptacle or port 842. The locking mechanism is released by disengaging the latches 808 from the apertures 810. According to an exemplary embodiment, the latches 808 are coupled to buttons 812 on the side of the battery 800. Pressing the buttons retracts the latches 808 from the apertures 810 and allows the battery 800 to be removed from the receiver 802.

Referring now to FIGS. 48-53, the battery 800 is shown. The battery 800 includes one or more electrochemical cells 816 electrically coupled together. In a preferred embodiment the cells 816 are lithium-ion cells and the battery 800 is considered to be a lithium-ion battery. The cells 816 are contained within a housing 814 and are coupled to terminals (e.g., male terminals or female terminals) and/or to internal circuitry (e.g., for an electric start system as described elsewhere in the application), shown in FIG. 53 as a printed circuit board 818 within the housing 814. According to an exemplary embodiment, the battery 800 further includes a display, shown as an LCD display 820. The lithium-ion battery 800 is not equivalent to a lithium-ion battery for use with cordless power tools (e.g., a drill). For example, the battery 800 may include fewer cells than a power tool battery and is intended for less frequent cycling at lower run times than a power tool battery (e.g., used to start an engine, not used to power frequent running of a drill motor for relatively long durations).

The housing 814 is a sealed enclosure that is configured to protect the electrochemical cells by preventing environmental contaminants (e.g., moisture, plant debris, salt, dust, etc.) from passing into the interior of the battery 800. The housing 814 provides a rugged structure that is able to withstand impact during operation of the outdoor power equipment, such as from branches. The housing 814 is formed from a material that is resistant to liquid or vaporized fuel (e.g., polyethylene terephthalate or PET) to prevent fuel from passing into the interior of the battery 800. The housing 814 includes a forward, first portion 822 and rearward, second portion 824. The slots 806 are provided on the first portion 822 and the latches 808 and the buttons 812 are provided on the second portion 824. The lower surface of the housing 814 includes a shoulder 826 separating the first portion 822 from the second portion 824. The shoulder 826 contacts the receiver 802 to provide a mechanical stop that limits the travel of the battery 800 relative to the receiver 802. When the battery 800 is fully seated within the receiver 802, the second portion 824 remains partially protruding beyond the surface of the receiver 802 such that the buttons 812 are accessible by a user.

According to an exemplary embodiment, the terminals may extend from the underside of the housing 814 proximate the shoulder 826. The terminals are configured to interface with corresponding terminals in the receiver 802 to electrically couple the cells 816 to the starter system or to another device, such as a charging station.

Figure 50:
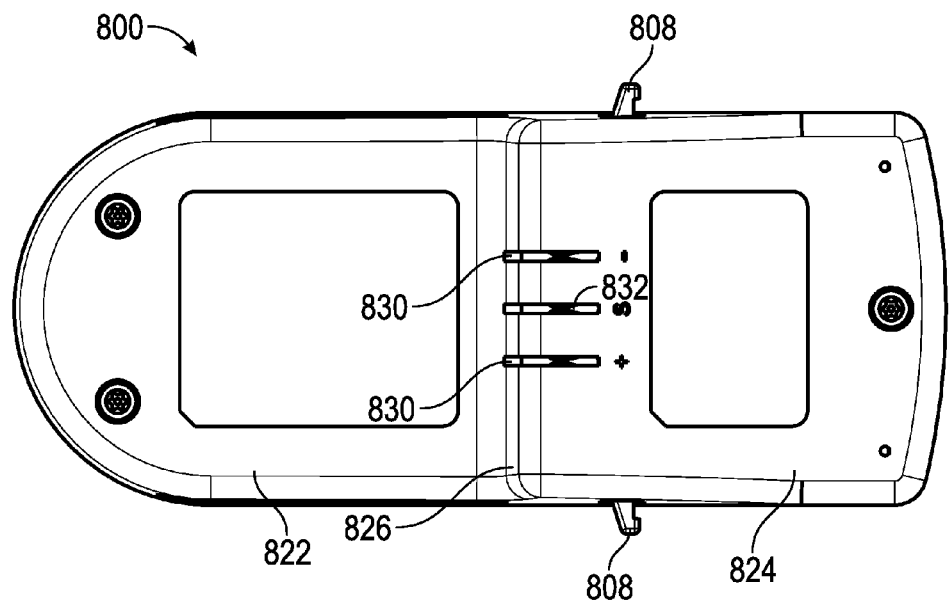
FIG. 50 is a bottom view of the battery of FIG. 48.
Figure 51:
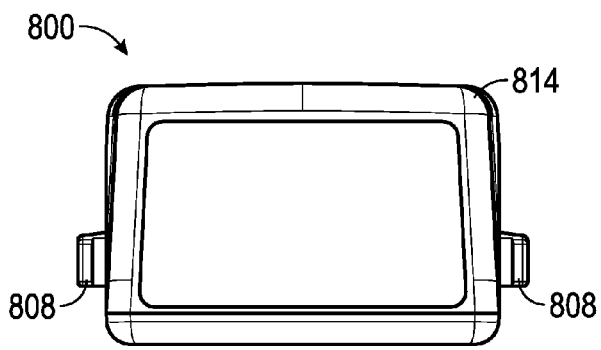
FIG. 51 is a left side view of the battery of FIG. 48.
Figure 52:
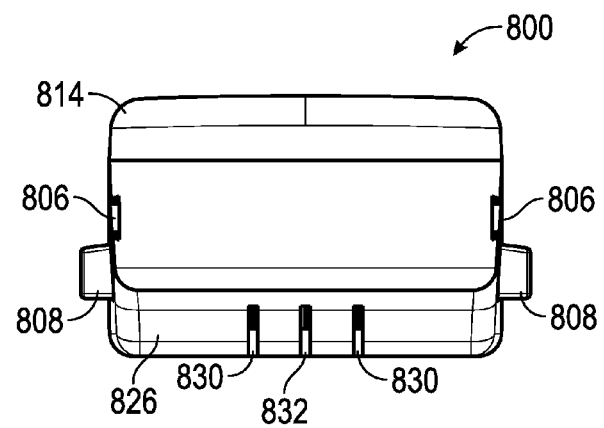
FIG. 52 is a right side view of the battery of FIG. 48.

Referring to FIGS. 50 and 52, according to an exemplary embodiment, the battery 800 includes a pair of primary terminals 830 that electrically couple the cells 816 to another system, such as the starter system. The primary terminals 830 may be positioned in a parallel arrangement, as shown in FIGS. 50 and 52. In other exemplary embodiments, the primary terminals 830 may be arranged perpendicular to each other or may be positioned in a coaxial arrangement (e.g., provided on the end face of the battery 800 instead of on the bottom face of the battery 800).

The battery 800 further includes one or more auxiliary terminals 832. The auxiliary terminals 832 provide a means for the battery 800 to communicate with other systems of the engine. For example, the auxiliary terminals may be configured to couple the internal circuitry of the battery 800 to sensors and other external systems to monitor and/or control the external systems (e.g., detecting the position of the bail or the brake, sensing vibration of the engine or vacuum strength in the carburetor, etc.). While the battery 800 is shown as including a single auxiliary terminal 832, in other exemplary embodiments the battery 800 may include two or more auxiliary terminals 832. The battery 800 may further include additional auxiliary terminals that may be adapted for future uses (e.g., communication with or connection to additional inputs including sensors, other devices, controllers, etc. and/or communication with or connection to outputs including user interfaces, monitors, speakers, alarms, lights, indicators, etc.). The terminals 830 and 832 are configured to withstand the vibrations associated with an engine and with outdoor power equipment so that the vibrations do not break any electrical connections to the terminals 803 and 832.

Figure 53:
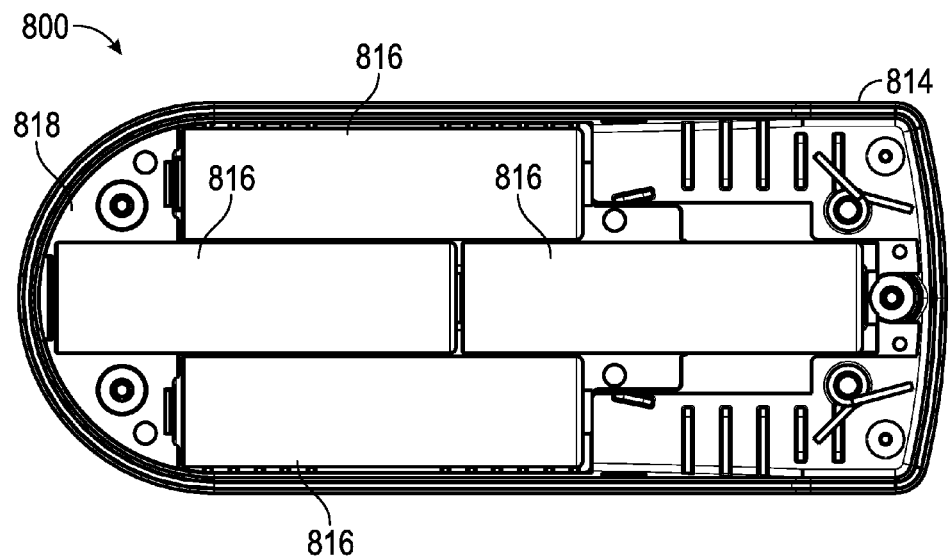
FIG. 53 is a bottom view of the battery of FIG. 48 with a portion of the housing removed to show the interior of the battery.
Figure 54:
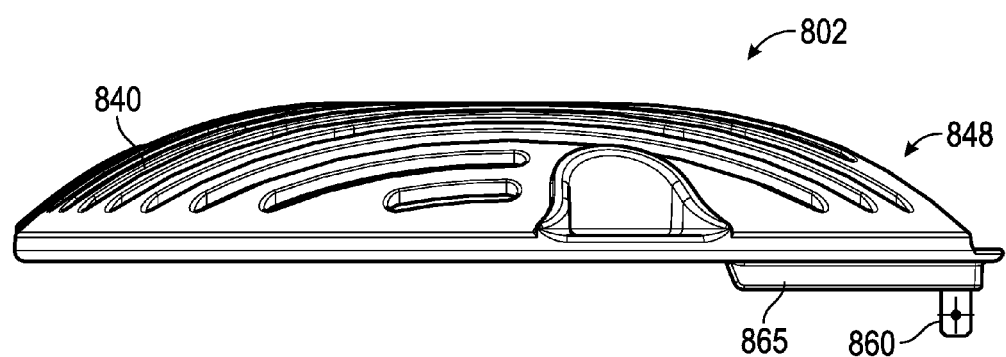
FIG. 54 is a front view of a battery receiver for a starter system, according to an exemplary embodiment.

According to an exemplary embodiment, the number and positioning of the terminals 830 and 832 on the battery 800 is fixed for batteries of varying size (e.g., voltage capacity or number of cells). As shown in FIG. 53, according to one exemplary embodiment, the battery 800 may include four cells 816. Batteries of different capacities (e.g. different voltage capacities including 1V, 3V, 6V, 12V, 18V, etc.) may therefore have a common interface structure (e.g., the number and positioning of the terminals 830 and 832 is fixed). For example, according to other exemplary embodiments, a battery intended for use with a walk-behind lawnmower may include only three cells while a battery intended for use with a riding lawnmower may include six cells. The housings of the battery and the receiver may be configured to allow only batteries of a desired capacity to be coupled to a specific receiver. According to another exemplary embodiment the housings of the battery and the receiver may be configured such that a larger capacity battery may be used with a smaller capacity receiver on equipment that is capable of operating using a smaller capacity battery (e.g., a six cell riding lawnmower battery being used on a walk-behind mower as an extended life battery), but a smaller capacity battery is incapable of being used with a larger capacity receiver on a machine that is configured to use a larger capacity battery. For example, the "footprint" or perimeter shape of the battery 800 as seen from below (FIG. 50) would remain the same for the larger capacity battery as for the smaller capacity battery, but the larger capacity batter would be taller. In this way, the larger capacity battery would be able to engage the receiver for the smaller capacity battery, but features (e.g., grooves, ridges, flanges, detents, etc.) on the smaller capacity receiver and on the larger capacity battery would only allow the larger capacity battery to engage the receiver for the larger capacity battery, the features on this larger capacity receiver and the lack of corresponding features on the smaller capacity battery would prevent the smaller capacity battery from being used with the larger capacity receiver. The features on the larger capacity receiver act as a lockout preventing the use of the smaller capacity battery with the larger capacity receiver.

According to other exemplary embodiments, the battery 800 may further include additional ports or connectors. For example, the battery may include a universal serial bus (USB) port coupled to the cells 816 and or/the internal circuitry 818. The USB port may be used as an input to receive power to charge the cells 816 or as an output to power or charge another device (e.g., a mobile phone, etc.) from the cells 816.

Referring now to FIGS. 54-58, the battery receiver 802 is shown. The battery receiver 802 is a dome-shaped body that is configured as a cover or screen of an engine. The receiver 802 includes a multitude of openings shown as slots 840 to allow air to pass through the receiver 802 while limiting the ability for debris such as grass clippings to pass through the receiver 802. The battery 800 is received in a receptacle 842 defined by a floor 844 and sidewalls 846. The receptacle 842 is open on one end 848 to allow the battery 800 to be slid into the receptacle 842 from the side. According to an exemplary embodiment, the sidewalls 846 are connected by an arcuate end wall 845. The rails 804 extend inward from the sidewalls 846. According to another exemplary embodiment, the rails 804 may form a single unitary body that continues along the arcuate end wall. In other embodiments, the receptacle 842 is incorporated into a receiver having a different shape or form appropriate to its mounting location on an engine or outdoor power equipment. In a preferred embodiment, the battery receiver 802 is mounted to an air-cooled small internal combustion engine (e.g., of less than 10 hp (7.5 kW), under 225 cc displacement) at the location typically occupied by a recoil starter. In this way the battery receiver 802 and battery 800 can be used to implement an electronic start system in place of the typical recoil starter system.

Figure 55:
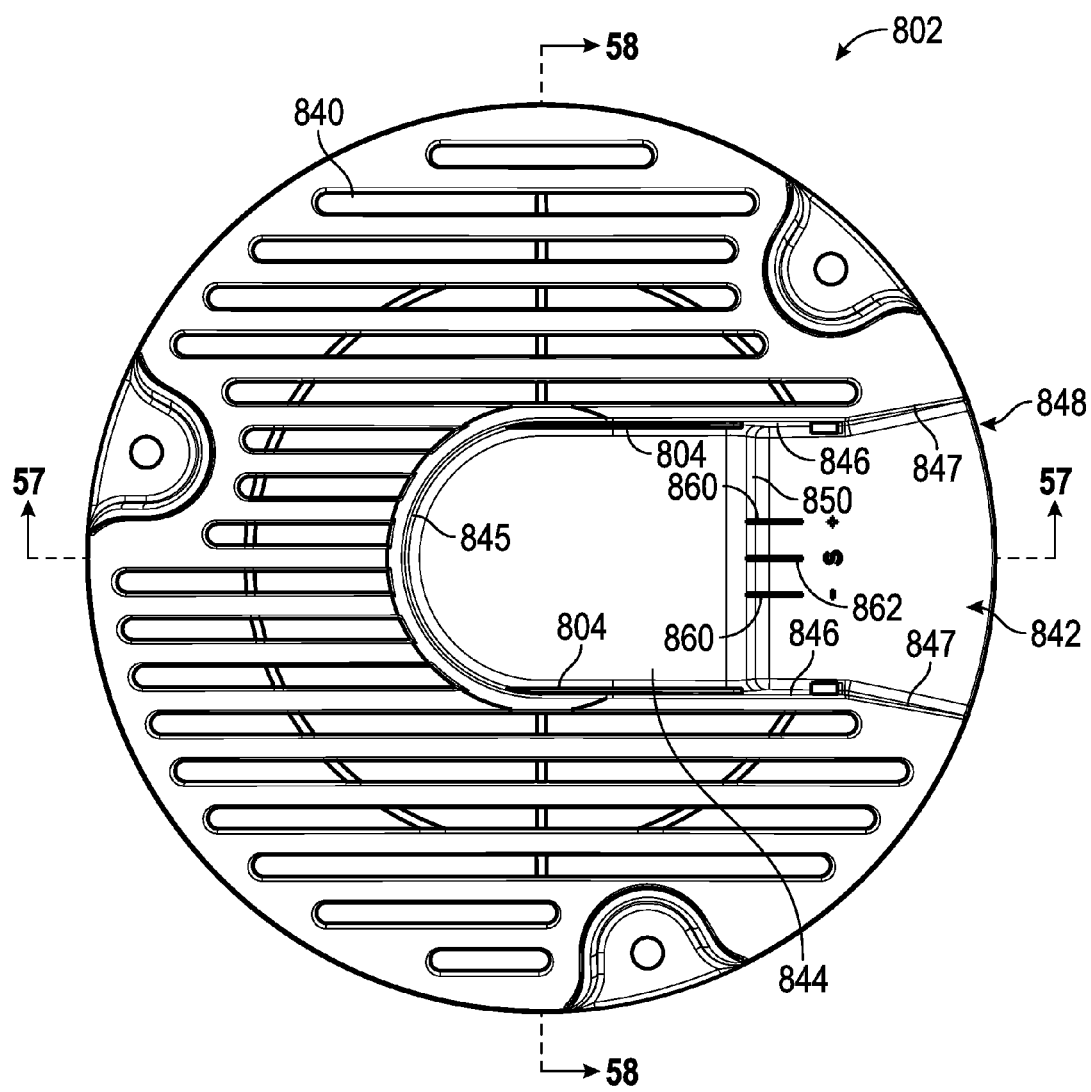
FIG. 55 is a top view of the receiver of FIG. 54.
Figure 56:
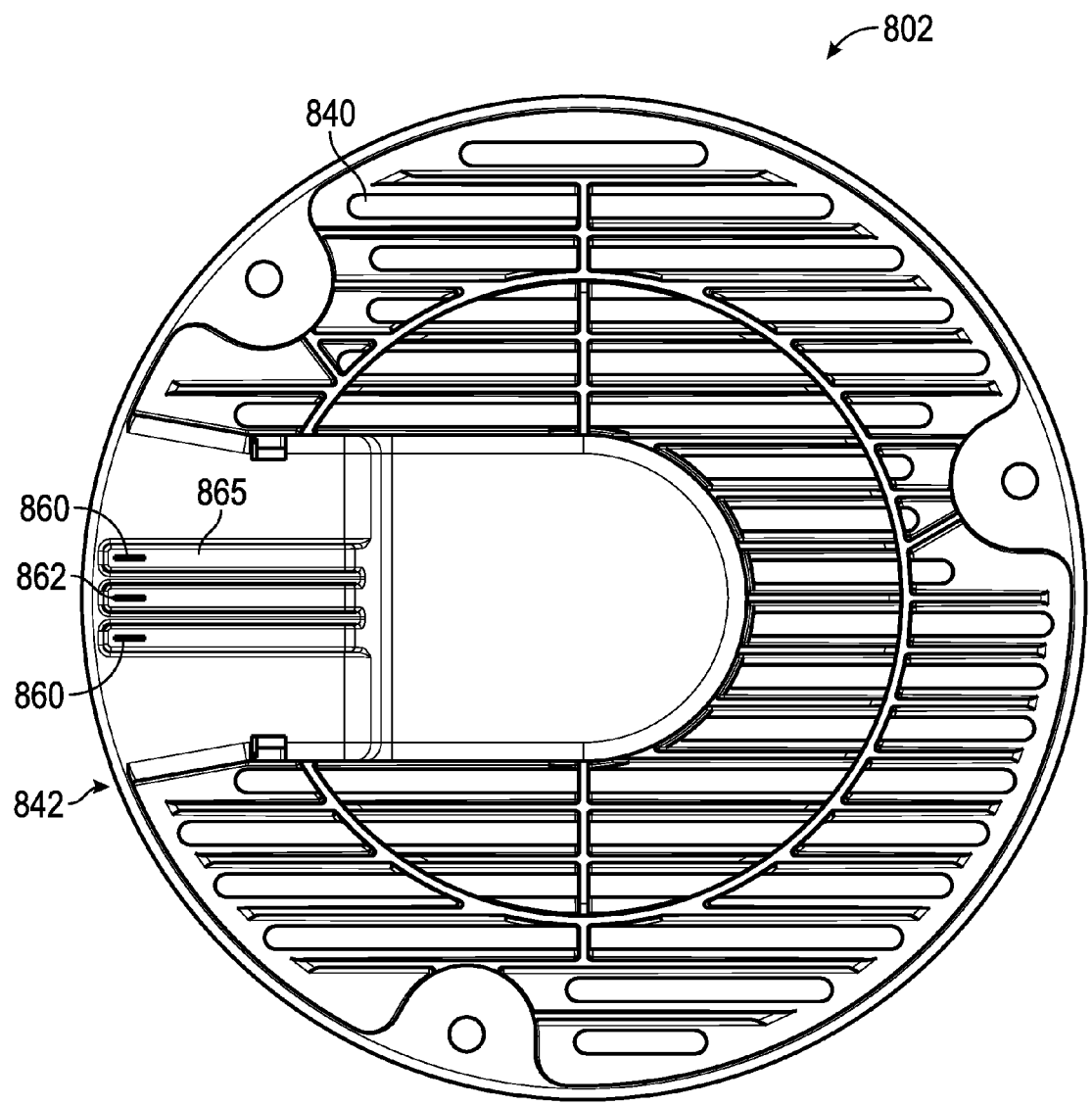
FIG. 56 is a bottom view of the receiver of FIG. 54.

As shown in FIG. 55, the sidewalls 846 may include angled end portions 847 proximate the open end 848 such that the open end 848 has a width that is greater than the width of the battery 800 and of the remainder of the receptacle 842. The angled portions 847 facilitate the insertion of the battery 800 into the receptacle 842 through the widened open end 848.

The floor 844 is an offset body with a vertical step or shoulder 850 that contacts the shoulder 826 to limit the travel of the battery 800 relative to the receiver 802. The apertures 810 in the sidewalls 846 receive the outwardly biased latches 808 protruding from the battery 800 when the shoulder 826 on the battery 800 contacts the shoulder 850 on the receiver 802. The engagement of the latches 808 in the apertures 810, the engagement of the rails 804 in the slots 806, and the contact of the shoulders 826 and 850 cooperate to retain the battery 800 in the receiver 802 and minimize the play between the battery 800 and the receiver 802 to maintain contact between the terminals on the battery 800 and the terminals on the receiver 802.

The battery receiver 802 includes a pair of primary terminals 860 that are aligned with the primary terminals 830 of the battery 800. According to an exemplary embodiment, the primary terminals 860 are blade or plate-like members positioned in a parallel arrangement, as shown in FIG. 55. In other exemplary embodiments, the primary terminals 860 may be arranged perpendicular to each other or may be positioned in a coaxial arrangement (e.g., provided on an end face such as the arcuate end wall 845 or the shoulder 850 of the receptacle 842).

The receiver 802 further includes one or more auxiliary terminals 862 that are aligned with the auxiliary terminals 832 of the battery 800. While the receiver 802 is shown as including a single auxiliary terminal 862, in other exemplary embodiments the receiver 802 may include two or more auxiliary terminals 862. The receiver 802 may further include additional auxiliary terminals that may be adapted for future uses. These additional terminals correspond to similar additional terminals on the battery 800 and cooperate with the additional terminals of the battery and may be adapted for future use. The terminals 860 and 862 are configured to withstand the vibrations associated with an engine and with outdoor power equipment so that the vibrations do not break any electrical connections to the terminals 860 and 862.

Figure 57:
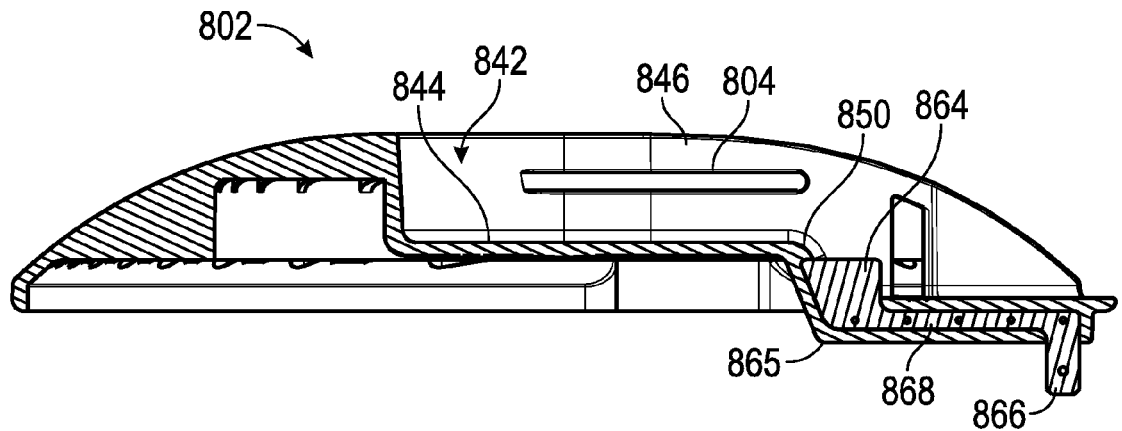
FIG. 57 is a cross-section view of the receiver of FIG. 54, taken along line 57-57.
Figure 58:
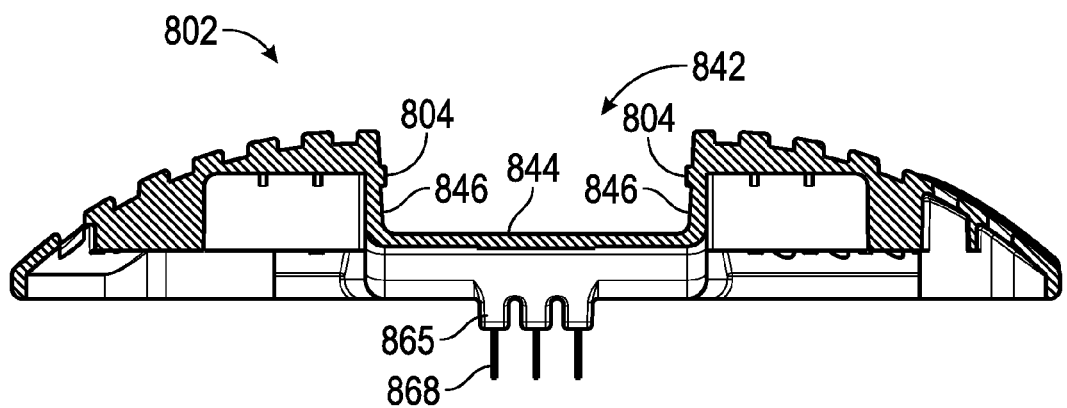
FIG. 58 is a cross-section view of the receiver of FIG. 54, taken along line 58-58.

As shown in FIGS. 57-58, the terminals of the receiver 802 (e.g., the primary terminals 860 and the auxiliary terminal 862) are shaped to extend through the body of the receiver 802. According to an exemplary embodiment, the terminals include a first, upwardly extending portion 864, a second, downwardly extending portion 866, and a connecting portion 868. The first extending portion 864 protrudes from the floor 844 proximate the shoulder 850 and each are positioned such that they contact the terminals of the battery 800 when the battery 800 is seated in the receiver 802. The second extending portion 866 protrudes from the underside of the receiver 802. The second extending portion may be conductively coupled to an electrical system powered by the battery 800, such as the starter system, such as with a wiring harness. The connecting portion 868 extends between the first portion 864 and the second portion 866. According to an exemplary embodiment, the connecting portion 868 is positioned within ribs 865 on the underside of the receiver 802 to minimize the amount of the terminal that is exposed.

According to an exemplary embodiment, the terminals may be positioned such that they are protected from environmental hazards. For example, the floor 844 may slope downward from the terminals to direct moisture away from the terminals. According to other exemplary embodiments, the terminals may be oriented horizontally or the terminals of the battery may be vertical and interface with terminals provided in an elevated portion of the receiver such that any moisture that enters the space between the battery and the receiver flows away from the terminals. The receiver and/or the portion of the engine proximate the receiver may include features (e.g., channels, drain holes, weep holes, sloped surfaces, etc.) that direct moisture and debris away from the terminals.

According to an exemplary embodiment, the electrical control circuits are each configured provide hard-wired logic for a starter system according to the disclosure provided herein. In some embodiments, each circuit contains essentially all analog parts. In some embodiments, each circuit or another such circuit is configured to detect when the bail closes (or opens) a switch (see, e.g., switch 518 as shown in FIG. 43). In other embodiments, a circuit is configured to sense when the brake is pulled and then to enable ignition of the engine. In other contemplated embodiments, a circuit may be further configured to sense vibration of the engine or Venturi vacuum strength in the carburetor, and cut power to the motor when the associated information indicates that the engine is running.

According to an exemplary embodiment, the circuits may be contained on a circuit board (or circuit boards) within the housing of the energy storage device, such as the battery 800 as shown in FIG. 53, and may be fully powered by the battery or other on-board source. As is known, rechargeable batteries generally have integrated circuitry contained therein that is configured to monitor operating variables of the battery (e.g., current, voltage, etc.) related to its charge state. Thus, the addition of the circuits of to the existing circuit board(s) or on an additional circuit may require no electrical interface to components of the lawn mower or other outdoor power equipment, and no additional wiring or hook ups are necessary. Accordingly, the assembly process for the associated outdoor power equipment may be simplified and improved. According to another exemplary embodiment, the circuits may instead be added to the battery receiver, such as the receiver 802, to reduce the cost of the battery, or to other electrical components of the engine or outdoor power equipment (e.g., a controller, control circuitry, printed circuit board, etc.). This may help to reduce the cost of individual batteries 800 be eliminating some of the circuitry that might otherwise be present in the battery. Furthermore, the circuits are only exemplary, and the specifics of the circuitry may be altered to optimize the integration of their functionality onto the existing circuit board(s) or additional circuit board(s) within the battery.

A circuit may be further configured to monitor the operation of the engine and/or the state of the battery to predict the number of starts capable with the battery. For example, a circuit may monitor the state of charge of the battery, the average amount of power expended to start the engine, and/or other characteristics of the engine (e.g., run state, rpms, etc.). The average amount of power expended to start the engine and/or characteristics of the engine may be communicated to the circuit through one or more of the terminals (e.g., the auxiliary terminal 832 shown in FIG. 50 and the auxiliary terminal 862 shown in FIG. 55) coupling the battery to engine via the receiver. The number of starts capable with the battery may then be shown on a display integrated into the battery (e.g., the display 820 shown in FIG. 49) or a display provided elsewhere, such as on the receiver, on the engine, on a control panel, or on the dash. The number of starts capable with the battery may be calculated based on the characteristics of the engine, for example, a battery having a specific charge may be able to perform more starts on a smaller engine (e.g., for a walk-behind mower) than for a larger engine (e.g., for a ride-on tractor) or be able to perform more starts for one type of outdoor power equipment (e.g., a pressure washer) than for another type of outdoor power equipment (e.g., a lawn mower).

A circuit may be further configured to monitor other characteristics of the engine or the outdoor power equipment powered by the engine by communicating with sensors and monitoring devices (e.g., fluid level sensors, temperature sensors, pressure sensors, chronometers, fuel quality sensors, tachometers, etc.). The circuit may output data related to the information received from the sensors and monitoring devices to a display, such as the display 820 integrated into the battery 800 or a display integrated into the receiver 802. The display may therefore communicate to the user of the outdoor power equipment various operational data related to the outdoor power equipment, the engine, and the battery. For example, the circuit may output to the display information such as fuel level, oil level, operational time, fuel quality, or battery temperature. The display may be used instead of or in addition to other displays, such as dashboard or control panel displays. Additionally, the circuit may monitor the temperature of the battery via an input from a temperature sensor. Temperature monitoring can be used to alert the user (e.g., via the display 820) if the battery temperature is too low for normal use of the battery. Using the battery 800 to power these circuits allows information to be provided to the user (e.g., battery temperature, fuel level, oil level, the presence of bad fuel) prior to the engine being started so that any issues can be addressed before attempting to start the engine.

Figure 4:
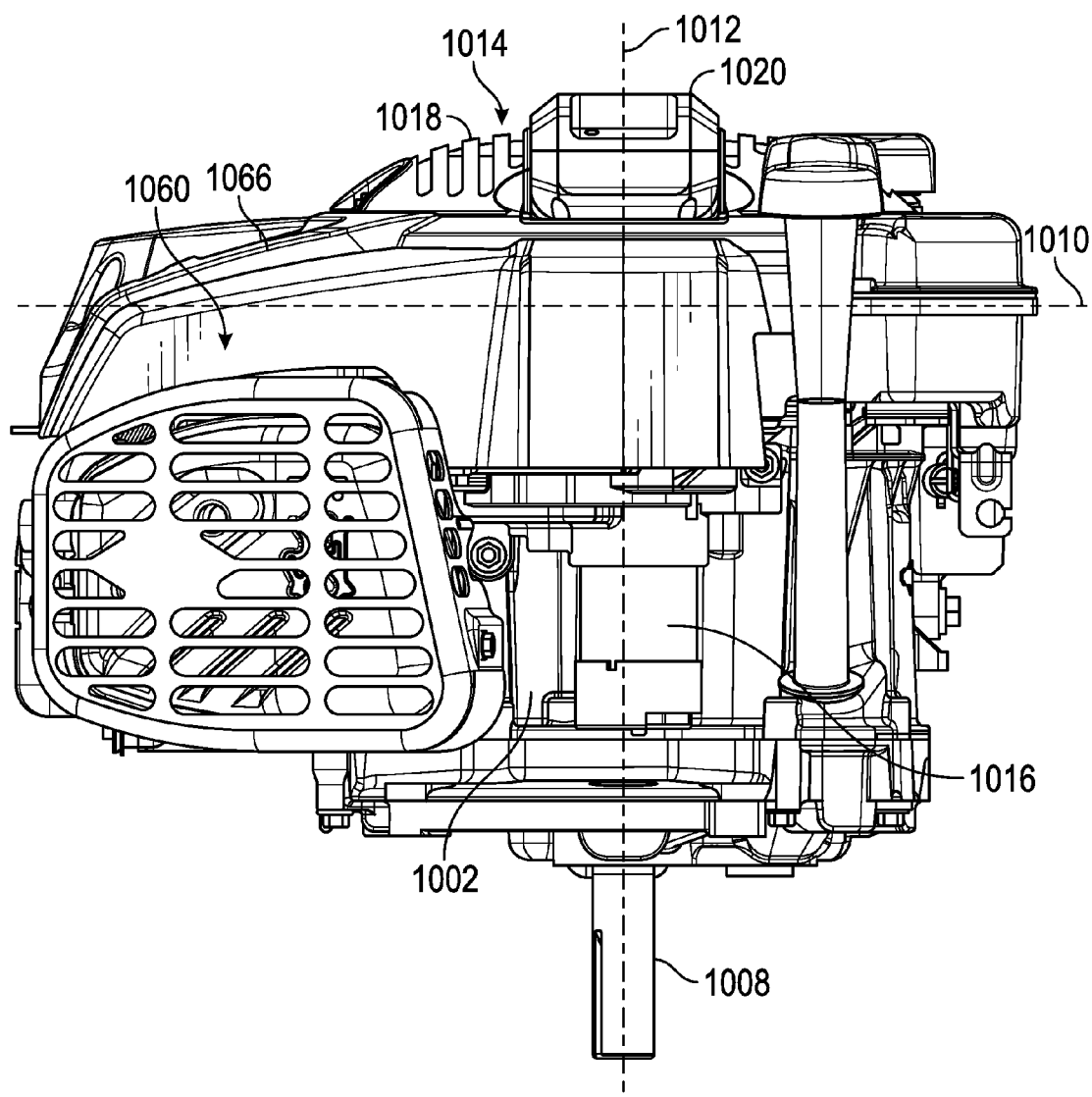
FIG. 4 is a right-side view of the engine of FIG. 1.
Figure 5:
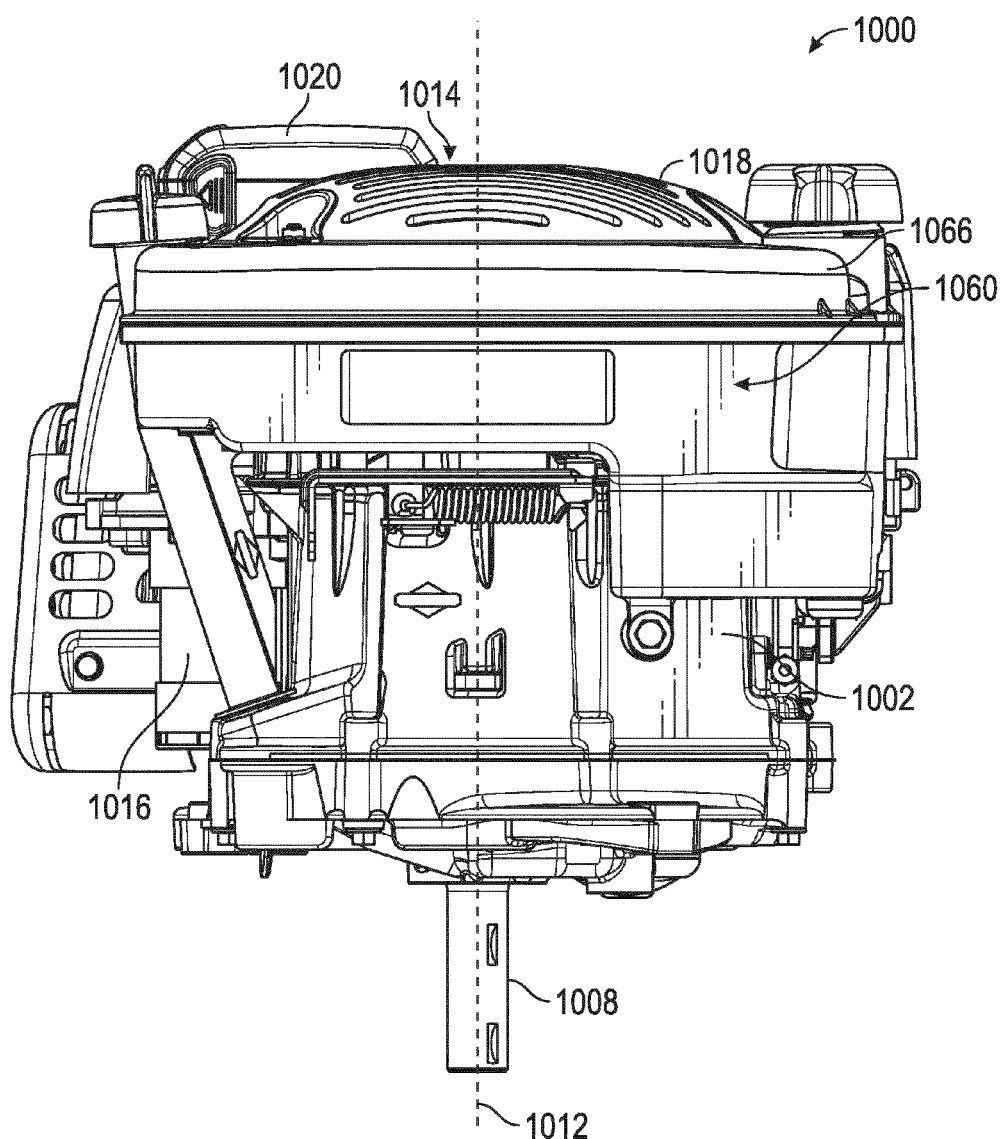
FIG. 5 is a rear view of the engine of FIG. 1.
Figure 6:
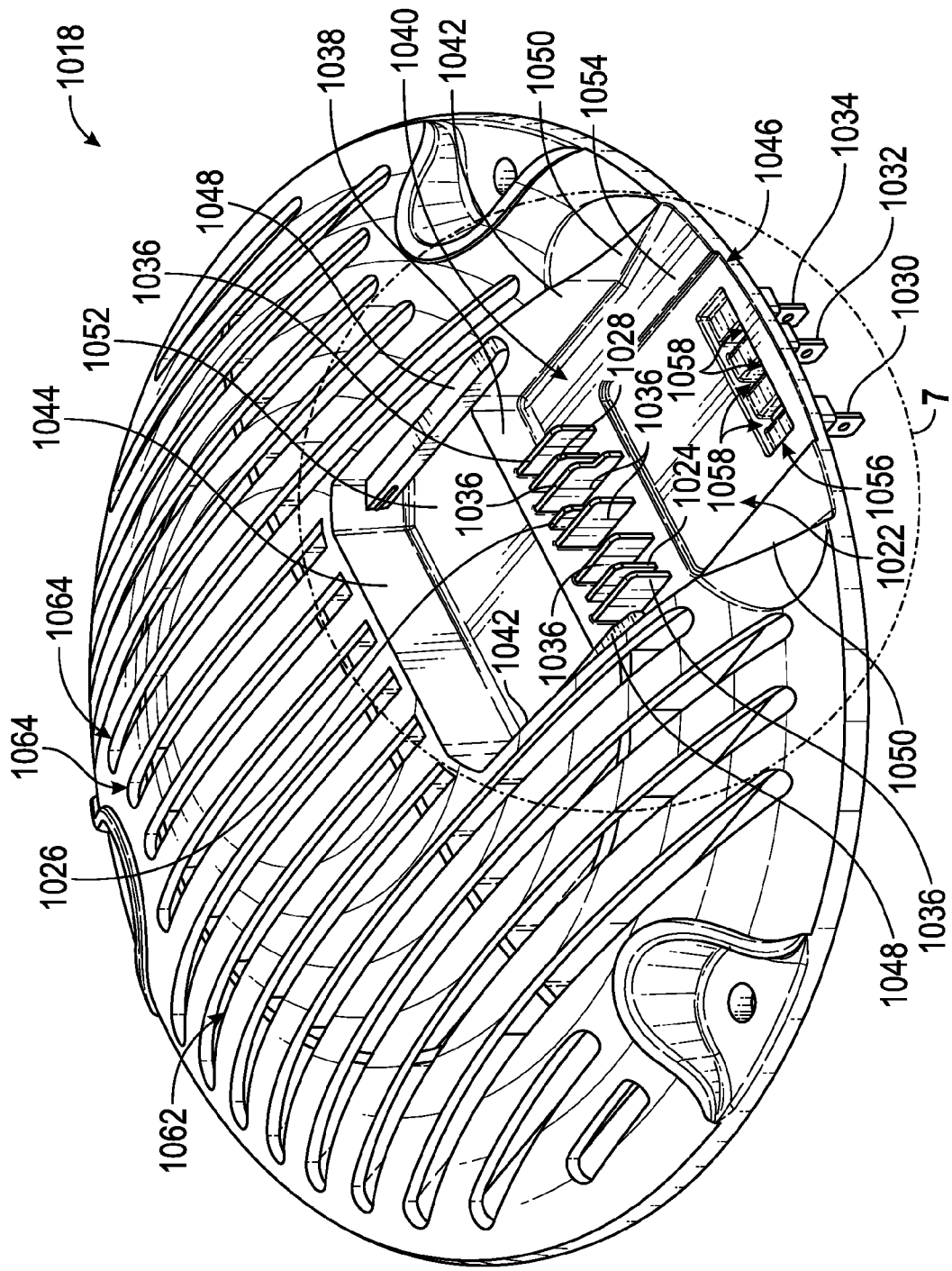
FIG. 6 is a perspective view of the battery receiver of the starting system of FIG. 1
Figure 7:
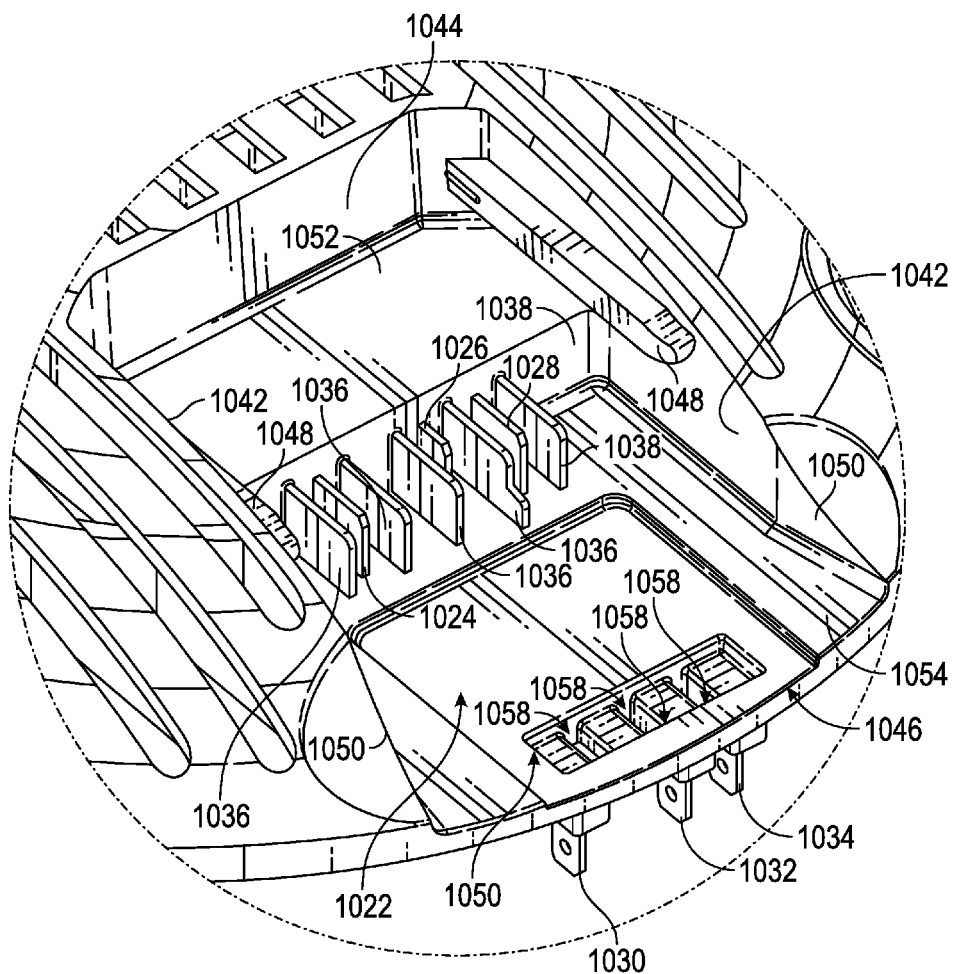
FIG. 7 is a detail view of a portion of the battery receiver of FIG. 6.
Figure 8:
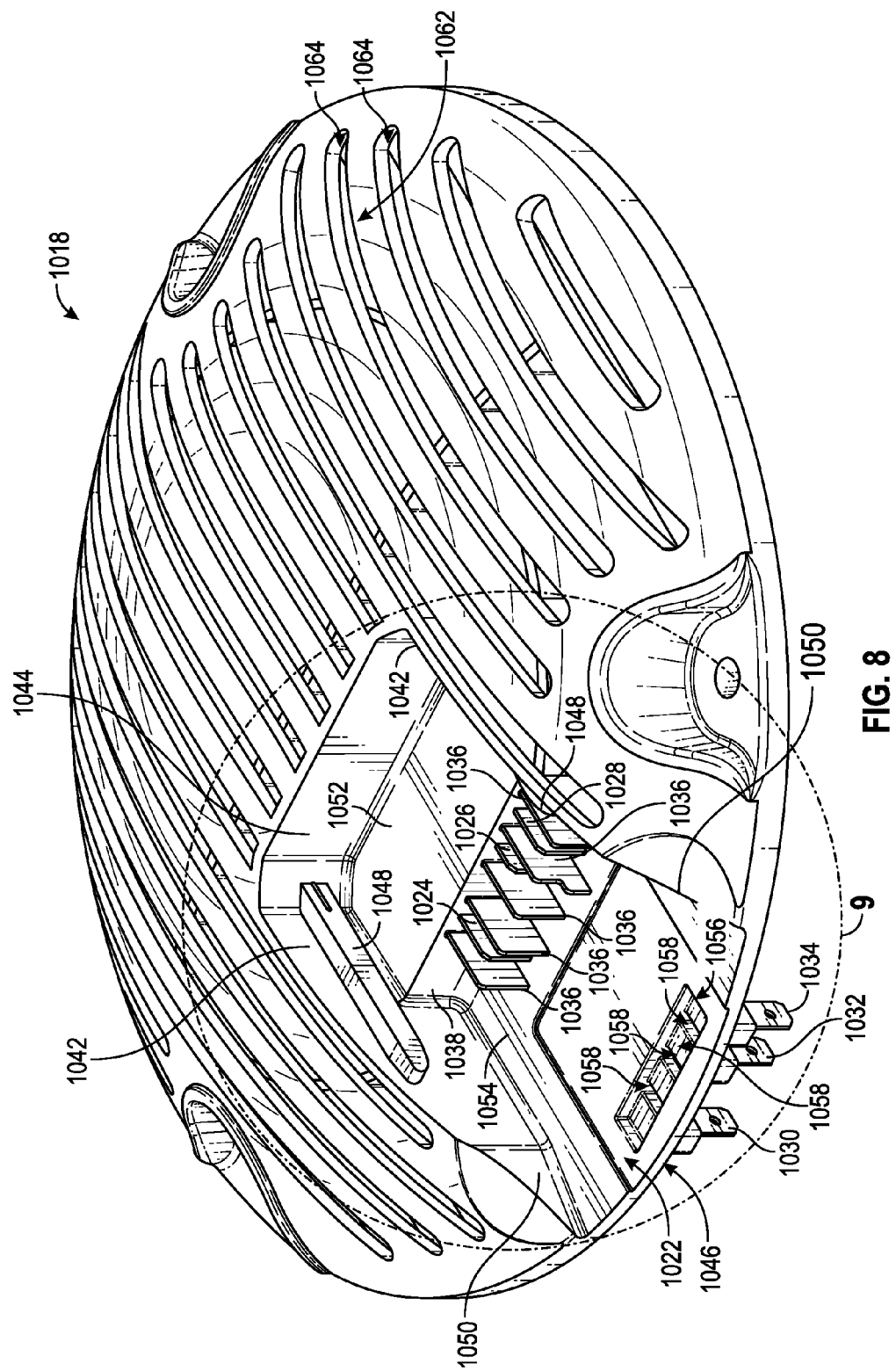
FIG. 8 is a perspective view of the battery receiver of FIG. 6.
Figure 9:
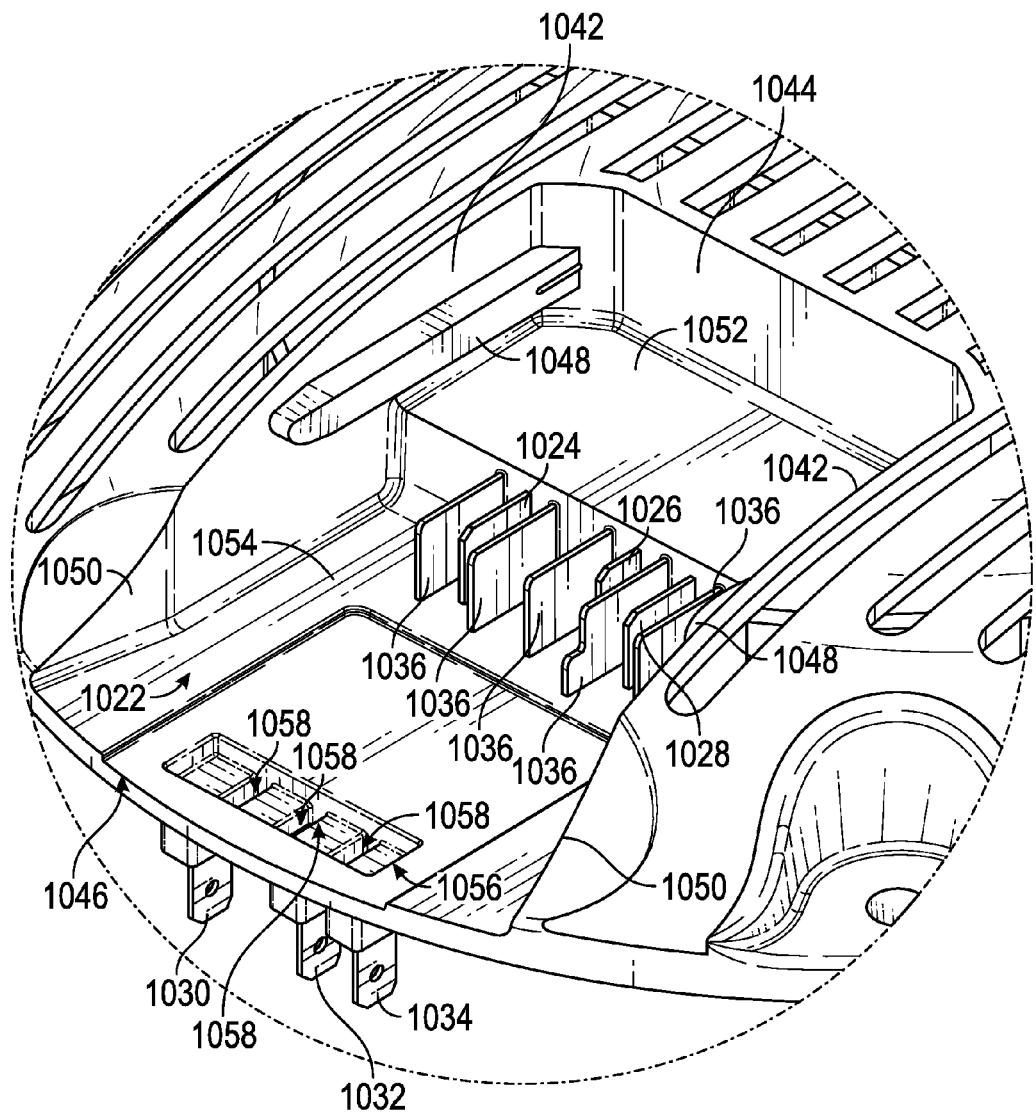
FIG. 9 is a detail view of a portion of the battery receiver of FIG. 8.
Figure 10:
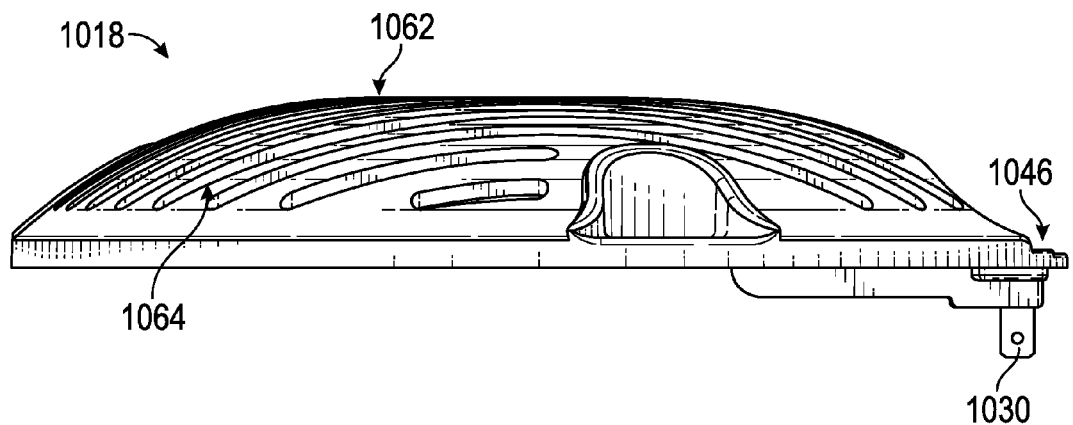
FIG. 10 is a left-side view of the battery receiver of FIG. 6.
Figure 11:
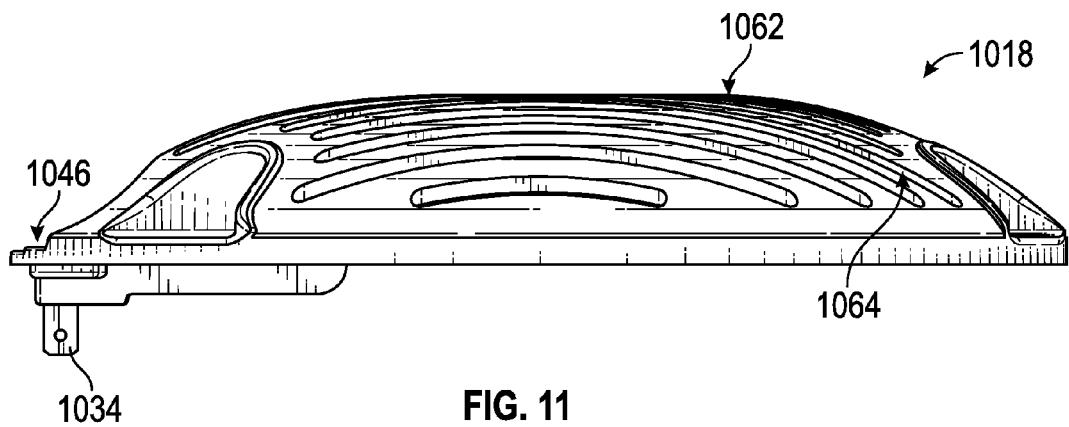
FIG. 11 is a right-side view of the battery receiver of FIG. 6.
Figure 12:
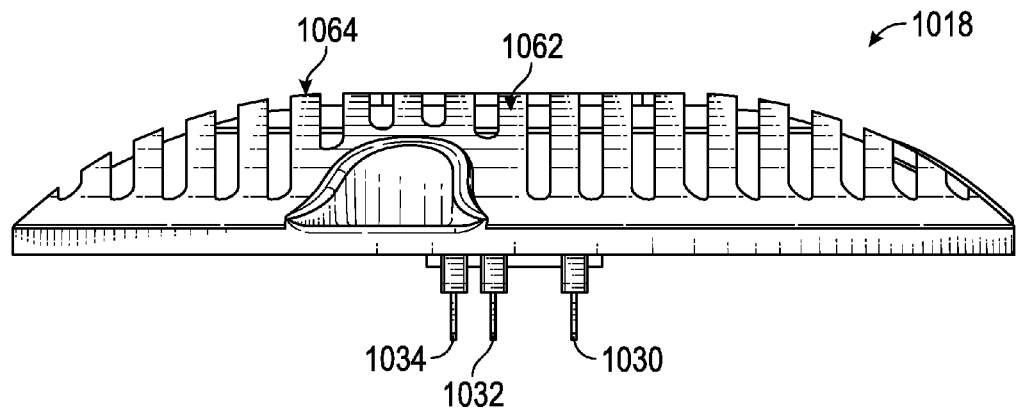
FIG. 12 is a rear view of the battery receiver of FIG. 6.
Figure 13:
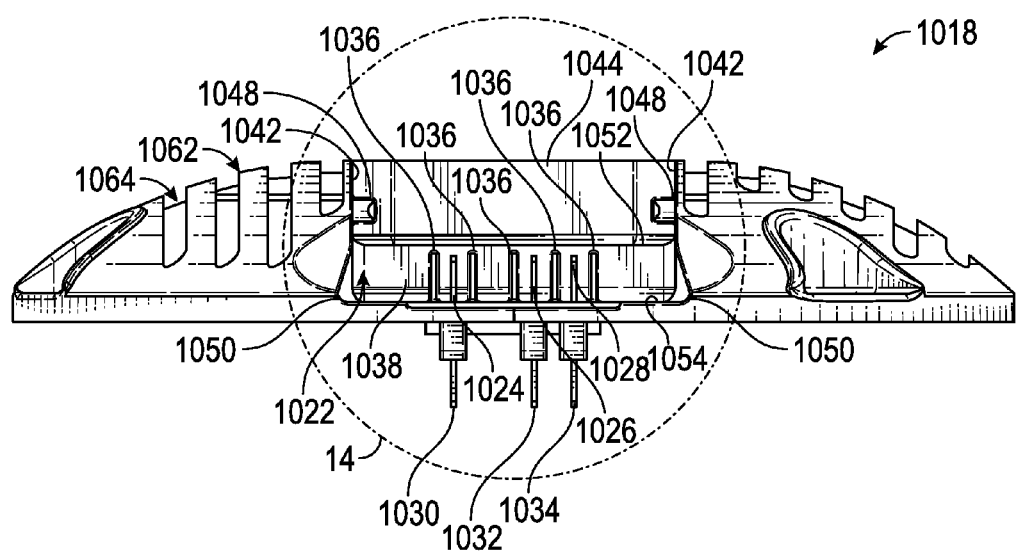
FIG. 13 is a front view of the battery receiver of FIG. 6.
Figure 14:
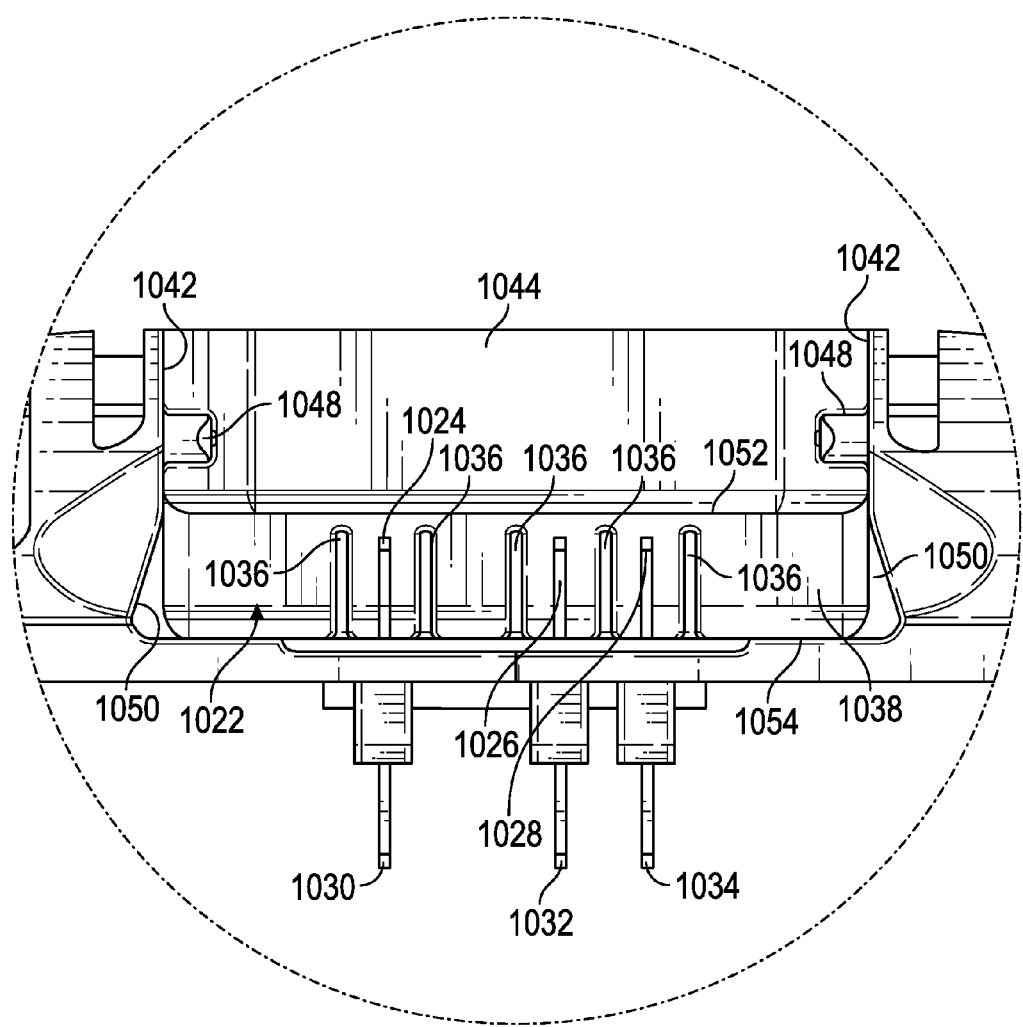
FIG. 14 is a detail view of a portion of the battery receiver of FIG. 13.
Figure 15:
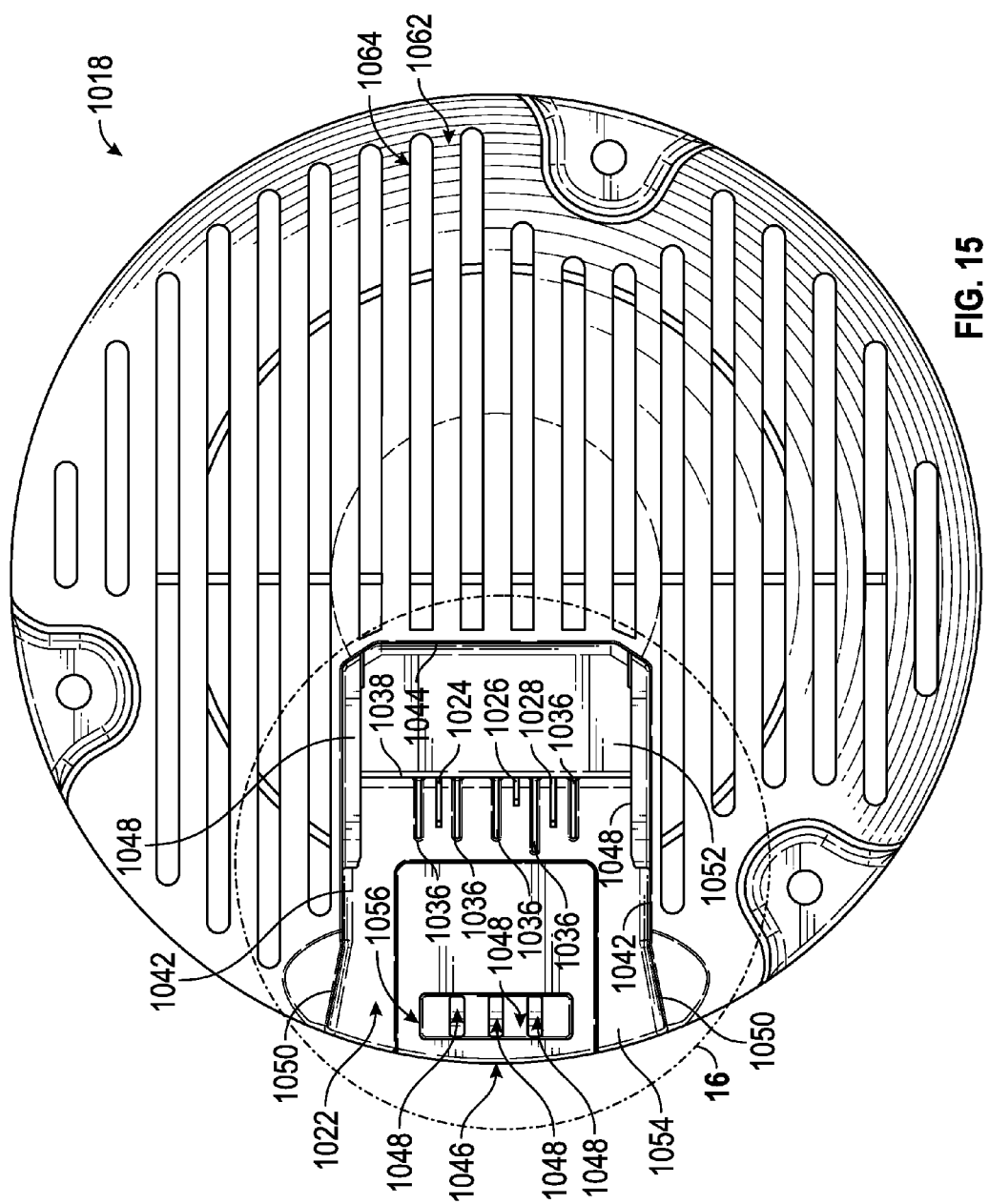
FIG. 15 is a top view of the battery receiver of FIG. 6.
Figure 59:
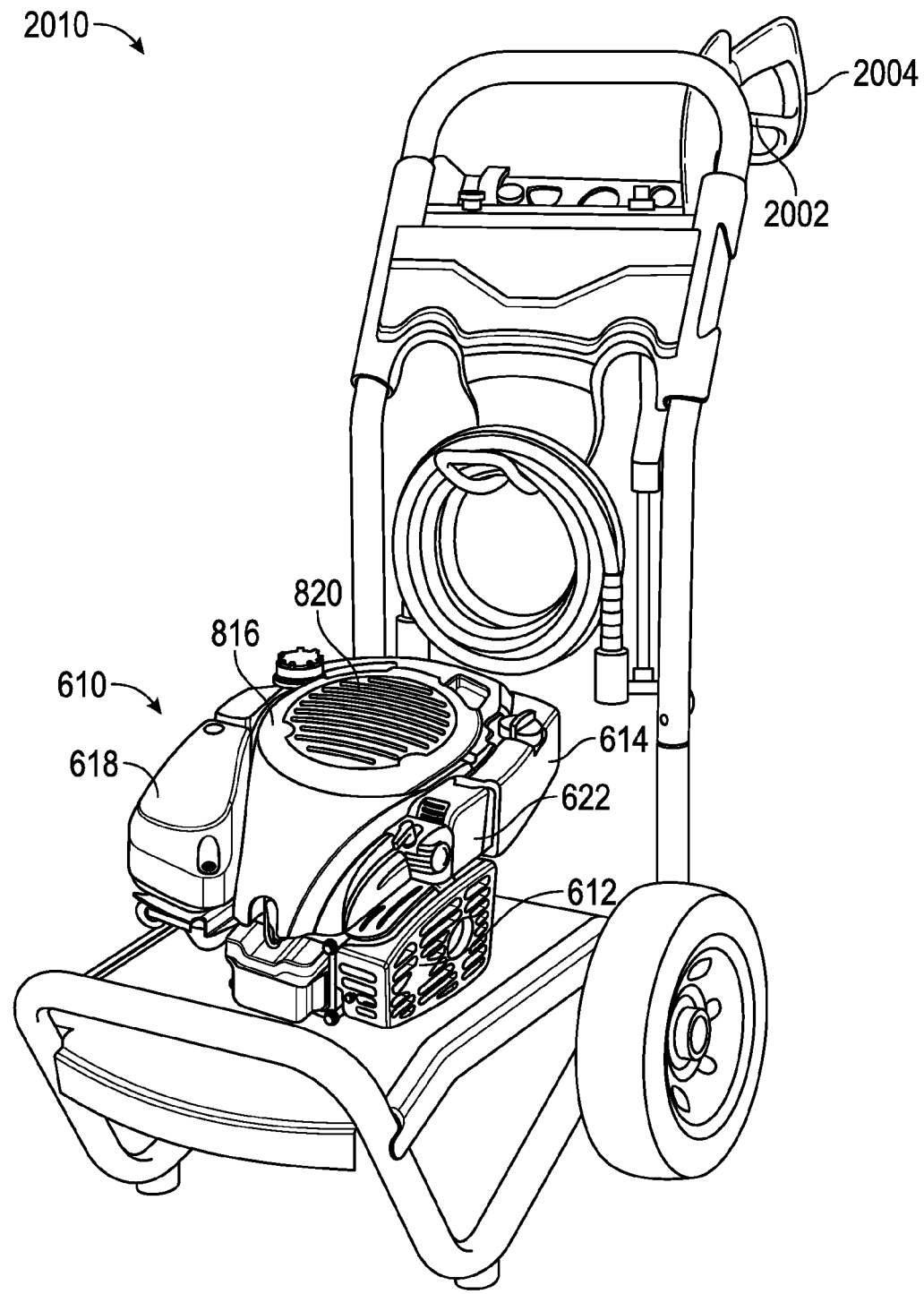
FIG. 59 is a perspective view of a pressure washer according to an exemplary embodiment of the invention.

Referring now to FIG. 59, a pressure washer system 2010 includes the engine 610 of FIG. 4. To start the engine 610, an operator may press the button 634 shown in FIGS. 46-47. In some such embodiments, braking of the system may occur via an ignition interrupt that prevents sparks from igniting fuel and air in a combustion chamber of the engine 610. Resistance provided by the water pump of the pressure washer system 2010 then slows (i.e., brakes) the engine 610. In other contemplated embodiments, an engine of a portable generator may use a similar starter system and battery 622, as well as a similar braking system. Power provided by the generator may be used to charge the battery 622 of the starter system.

As pressure washer system 2010 does not have a bail similar to bails 126, 212, 312 shown in FIG. 41, the switch that makes up push button 634 of the pressure washer system 2010 may be more complex than that used in lawnmower applications utilizing a bail. That is, in lawnmower configurations shown above, a single-pole-single-throw switch is used to send 12 V to power up and start the engine when the user pulls the bail, and then removes the 12 V and shorts the ignition to ground when the user releases the bail, thus stopping the engine. However, on non-mower applications that do not use a bail, a double-pole-double-throw switch may be used, which grounds the ignition on one pole when in the OFF position, and sends 12 V to the second pole when in the ON position. In this way, one position removes the 12 V and shorts the ignition (OFF), while the other position un-shorts the ignition and applies the 12 V (ON).

Figure 60:
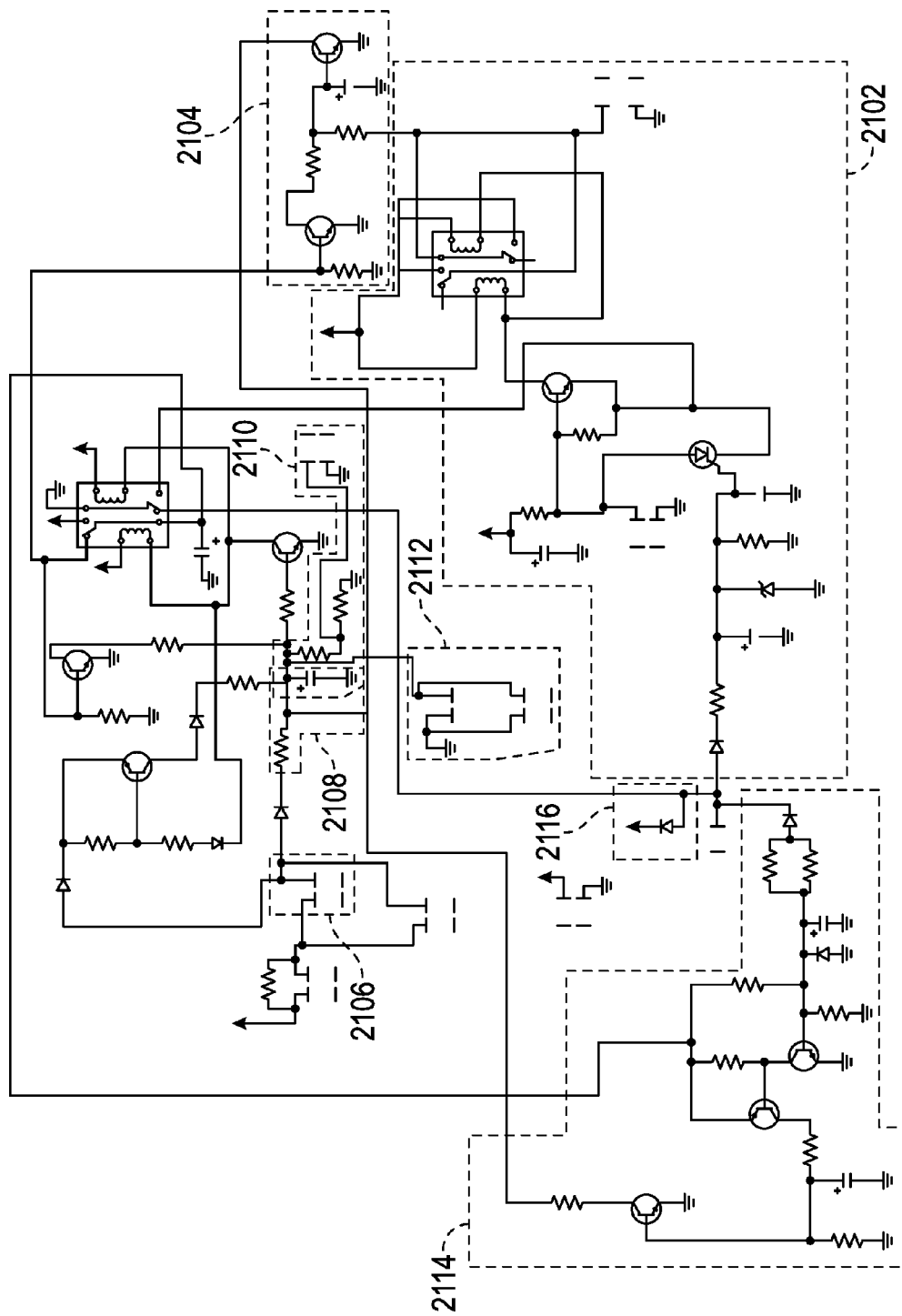
FIG. 60 is a circuit diagram for a starter system of an engine according to another exemplary embodiment of the invention.

As an alternative to the push-button starter systems described above, and in accordance with another exemplary embodiment, engine 610 of the pressure washer system 2010 may be started via actuation of a trigger 2002 on a spray wand 2004. An example circuitry schematic in accordance with the proposed embodiment is illustrated in FIG. 60. Block 2102 shown in FIG. 60 represents starter system circuitry. The present embodiment related to pressure washer system 2010 requires additional circuitry to function effectively. For instance, block 2104 acts as a starter motor cranking limiter, which limits the amount of time the starter motor can crank without the engine starting. Block 2106 represents a flow switch, which senses water flow through the system, as will be discussed further herein. Block 2108 represents an ON time delay circuit, which detects the amount of time that a user has actuated trigger 2012 and prevents starting of the engine if a predetermined time period has not elapsed (e.g., during incidental user contact with trigger 2002). Block 2110, on the other hand, represents an OFF time delay circuit, which allows the engine to continue running for a predetermined period of time after the user has released trigger 2002. Block 2110 may contain an output to a device (e.g., a potentiometer) which allows for user customization of the OFF time delay. Block 2112 represents a manual stop override input (e.g., via an enable key insert) for the OFF time delay, which allows a user to entirely deactivate the OFF time delay and allow the engine to continue running beyond any predetermined time limit after the user has released trigger 2002. Finally, block 2114 represents circuitry that senses if the starter motor pinion gear has disengaged from the engine's flywheel gear while the starter motor is cranking so as to prevent the starter motor from stopping the cranking operation prior to the engine being started. The overall operation of the starter system represented by the circuitry shown in FIG. 60 will be discussed herein.

Prior to operation of pressure washer system 2010, spray wand 2004 must be connected to a water pump via a hose, wherein the water pump is also connected to a water source via another hose. With the water source connected to the water pump, actuation of trigger 2002 causes at least a small amount of water to flow through the water pump, regardless of whether or not engine 610 is operating. A flow switch and/or pressure switch is used to sense the flow of water or pressure change when trigger 2002 is actuated. A flow switch, either self-contained or integrated within the pump, may be placed between the water source and the pump inlet (i.e., the low pressure side) or between the pump outlet and the spray wand (i.e., the high pressure side). If pressure sensing is used, pressure switches may be located at both the pump inlet and the outlet. Alternatively, a single pressure differential switch may be used. From the sensed flow or pressure change, engine 610 can be started using the same logic as the push-button starter system described in previous embodiments. Alternatively, a sensor or switch could be directly engaged by actuation of trigger 2002 to start engine 610, wherein the electrical connection between such a sensor or switch may run between trigger 2002 and engine 610 along or through the spray wand hose. Alternatively, a sensor or switch could be directly engaged by actuation of trigger 2002 to start engine 610, wherein wireless communication is used between trigger 2002 and engine 610 via radio frequency (RF) or Infrared (IR).

During connection of the water source to the pump and subsequent filling of the pump, a flow switch and/or pressure switch may sense a short-duration flow of water or a pressure change before the trigger 2002 is actuated. Therefore, it may not be desirable for engine 610 to start immediately upon sensing inlet flow or pressure change. Instead, a timed delay start (e.g., 1-3 seconds) could be provided by the starter system circuitry described above, wherein the timed delay could be established via resistor—capacitor circuit (RC circuit) or equivalent. The start timed delay would eliminate the possibility of unintentional engine starting.

Similarly, it may not be desirable for engine 610 to stop (i.e., turn off) immediately upon user release of trigger 2002. Instead, a timed delay (e.g., 1-2 minutes) could be provided by the starter system circuitry described above, wherein the timed delay could be determined by counting engine ignition pulses after release of trigger 2002 or established via a resistor—capacitor circuit (RC circuit) or equivalent. If an RC circuit is used, a user-adjustable timed delay stop could be provided if a variable resistor (i.e., rheostat) is used. In this way, engine 610 is not unnecessarily shut down when the user only briefly releases trigger 2002, thereby avoiding overly-frequent restarts of engine 610 during operation. Such a timed delay stop could also be used in combination with an automatic throttle control mechanism to lower engine speed and reduce noise and fuel consumption during the timed delay. If the user wishes to shut down engine 610 before the timed delay period expires, it is also envisioned that a manual stop switch (not shown) could be added to engine 610. Similarly, a manual start switch (not shown) could also be added to engine 610 to serve as an optional or back-up start system to the trigger-actuated engine starting system.

An additional advantage of the timed delay stop feature is potential elimination of the need for a thermal bypass system in the pump. In conventional pressure washer systems, when the trigger is released while the engine is running, the water in the pump recirculates under pressure. This condition causes the recirculating water in the pump to become increasingly hot over time. Excessively hot water may cause permanent damage to the pump components. To resolve this problem, most conventional pressure washers are equipped with a thermal bypass system. When the water temperature reaches a critical temperature (typically 140 degrees Fahrenheit (60 degrees Celsius)), the thermal bypass system bleeds the high temperature water out of the pump and to the ground. After cool water enters the pump and reduces the recirculating water temperature, the thermal bypass system halts the hot water bleed-off. If the timed delay stop described above is set shorter than the time required for the recirculating water in the pump to reach critical bleed-off temperature (typically 90 seconds), then a thermal bypass system would not necessarily be required.

Another advantage of the trigger-actuated engine starting system described above may be a decreased reliance on a pressure-relieving unloader valve during engine start-up. In conventional pressure washer systems, the water source is provided to the water pump prior to engine start-up and before the spray wand's trigger is actuated, creating a pressure within the water pump that must be relieved by an unloader valve in order to ease engine starting. However, with the trigger-actuated engine system described above, this unloader valve could be downsized or entirely eliminated, as the trigger actuation itself relieves the water pressure built up within the water pump (via initiating water flow) prior to the engine being started.

Yet another advantage of the trigger-actuated engine starting system described above may be decreased pump damage caused by a user manually starting the pump without the water source connected to the pump inlet. In conventional pressure washer systems, the engine can be manually started regardless of whether or not the operator has connected the water source to the pump inlet. If the pump is run without a water supply, the pump will be permanently damaged in a short period of time (typically 30 sec) due to high internal friction and temperatures. Using the trigger-actuated starting system described above, the engine cannot be started unless a water source is connected to the pump inlet, as water flow must be sensed by a flow or pressure switch to enable starting.

In accordance with the embodiment described above, a trigger-actuated engine starting system may reduce fuel consumption and eliminate noise generated by a gas pressure washer system when not in use, as needless engine operation can be avoided when the user is not directly activating the trigger 2002 to spray water.

The various control systems and circuits described herein (including in the related applications incorporated by reference) may be implemented as "non-programmable circuitry" that consists of analog or digital hard circuitry that does not utilize a microcontroller or software or as a controller, microcontroller, computer, or other programmable device. It is believed that embodiments in which the controls are implemented as non-programmable circuitry including discrete components may be less expensive than embodiments implemented with microcontrollers or using software. Such non-programmable circuitry embodiments do not include a microcontroller. The various control systems and circuits described herein (including in the related applications incorporated by reference) may be implanted as a component of a battery, as a component of a battery receiver or receiving port, as a component of the engine, as a component of a starter module separate from the engine, and/or as a component of the outdoor power equipment.

The construction and arrangements of the starter system for an engine, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A starting battery for use with an electric starting system including a starter motor and a battery receiver, comprising:
   a lithium-ion battery cell;
   two voltage output terminals; and
   an enable terminal;
   wherein the voltage output terminals are configured to connect to two voltage output terminals of the battery receiver to complete a circuit between the lithium-ion battery cell and the starter motor when the starting battery is attached to the battery receiver; and
   wherein the enable terminal is configured to connect to an enable terminal of the battery receiver to receive an enable signal to the starting battery to allow the lithium-ion battery cell to provide power to the starter motor to start an internal combustion engine.

2. The starting battery of claim 1, wherein the voltage output terminals of the starting battery are configured to connect to the voltage output terminals of the battery receiver before the enable terminal of the starting battery connects to the enable terminal of the battery receiver.

3. The starting battery of claim 1, wherein if the enable terminal of the starting battery is not connected to the enable terminal of the battery receiver, the lithium-ion battery cell does not provide power to the starter motor.

4. The starting battery of claim 1, wherein the terminals of the starting battery comprise female terminals.

5. The starting battery of claim 1, further comprising:
   a latch configured to engage a latching region of the battery receiver to secure the starting battery to the battery receiver.

6. The starting battery of claim 1, further comprising:
   a bottom side including a wall that separates a lower portion of the bottom side from an upper portion of the bottom side, wherein the wall is configured to contact a wall of the battery receiver to limit the travel of the starting battery relative to the battery receiver when attaching the starting battery to the battery receiver.

7. The starting battery of claim 6, further comprising:
   a plurality of apertures formed in the bottom side, wherein each aperture is sized and positioned to receive a guide of the battery receiver to guide the starting battery into the battery receptacle.

8. The starting battery of claim 1, further comprising:
   a display for providing information to a user.

9. The starting battery of claim 1, wherein the lithium-ion battery cell is one of a plurality of lithium-ion battery cells.

10. An electric starting system for an internal combustion engine, comprising:
    a rechargeable lithium-ion battery including two voltage output terminals and an enable terminal;
    a battery receiver including a battery receptacle configured to receive the lithium-ion battery, two voltage output terminals, and an enable terminal; and
    a starter motor configured to start the internal combustion engine;
    wherein the voltage output terminals of the lithium-ion battery and the battery receiver are configured to connect to complete a circuit between the lithium-ion battery cell and the starter motor when the lithium-ion battery is attached to the battery receptacle; and
    wherein the enable terminal of the lithium-ion battery must be connected with the enable terminal of the battery receiver to receive an enable signal to the lithium-ion battery to allow the lithium-ion battery to provide power to the starter motor to start the internal combustion engine.

11. The electric starting system of claim 10, wherein the battery receptacle is defined at least in part by a wall; and
    wherein the voltage output terminals and the enable terminal of the battery receiver extend outward from the wall and the enable terminal of the battery receiver extends to a distance less than the voltage output terminals of the battery receiver.

12. The electric starting system of claim 10, wherein the voltage output terminals of the battery receiver are configured to connect to the voltage output terminals of the lithium-ion-battery before the enable terminal of the battery receiver connects to the enable terminal of the lithium-ion battery.

13. The electric starting system of claim 10, wherein if the enable terminal of the lithium-ion battery is not connected to the enable terminal of the battery receiver, the lithium-ion battery does not provide power to the starter motor.

14. The electric starting system of claim 10, wherein the terminals of the lithium-ion battery comprise female terminals and the terminals of the battery receiver comprise male terminals.

15. The electric starting system of claim 10, wherein the lithium-ion battery further includes a latch and the battery receptacle further includes a latching region; and
    wherein the latch engages the latching region to secure the lithium-ion battery to the battery receiver.

16. The electric starting system of claim 10, wherein the lithium-ion battery is configured to be selectively attached to and removed from the battery receiver without tools.

17. The electric starting system of claim 10, wherein the battery receptacle is defined at least in part by a floor including a wall that separates a lower portion of the floor from an upper portion of the floor;
- wherein the lithium-ion battery includes a bottom side including a wall that separates a lower portion of the bottom side from an upper portion of the bottom side; and
- wherein the wall of the battery receptacle contacts the wall of the lithium-ion battery to limit the travel of the lithium-ion battery relative to the battery receiver when attaching the lithium-ion battery to the battery receiver.

18. The electric starting system of claim 17, wherein the battery receiver further includes a plurality of guides that extend outward from the wall of the battery receptacle to a distance greater than that of the terminals of the battery receiver; and
- wherein the lithium-ion battery further includes a plurality of apertures formed in the bottom side;
- wherein each aperture is sized and positioned to receive one of the guides of the battery receiver to guide the lithium-ion battery into the battery receptacle.

19. The electric starting system of claim 17, wherein the voltage output terminals and the enable terminal of the battery receiver extend outward from the wall of the battery receptacle and the enable terminal of the battery receiver extends to a distance less than the voltage output terminals of the battery receiver.

20. The electric starting system of claim 10, wherein the lithium-ion battery further includes a display for providing information to a user.

* * * * *